(12) United States Patent
Xiong

(10) Patent No.: US 12,323,885 B2
(45) Date of Patent: Jun. 3, 2025

(54) COMMUNICATION METHOD AND APPARATUS FOR MULTICAST BROADCAST SERVICE, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 343 days.

(21) Appl. No.: 17/894,624

(22) Filed: Aug. 24, 2022

(65) Prior Publication Data

US 2022/0408228 A1  Dec. 22, 2022

Related U.S. Application Data

(63) Continuation of application No. PCT/CN2021/100093, filed on Jun. 15, 2021.

(30) Foreign Application Priority Data

Jul. 17, 2020 (CN) .......................... 202010694090.4

(51) Int. Cl.
*H04W 4/08* (2009.01)
*H04W 76/40* (2018.01)

(52) U.S. Cl.
CPC ............. *H04W 4/08* (2013.01); *H04W 76/40* (2018.02)

(58) Field of Classification Search
CPC ... H04W 4/08; H04W 76/40; H04W 36/0007; H04W 4/06; H04W 76/11; H04W 76/12
See application file for complete search history.

(56) References Cited

U.S. PATENT DOCUMENTS

2011/0280173 A1  11/2011  Ha et al.
2021/0014152 A1* 1/2021  Li .......................... H04L 12/185
(Continued)

FOREIGN PATENT DOCUMENTS

CN  101394577 A  3/2009
CN  102083006 A  6/2011
(Continued)

OTHER PUBLICATIONS

Written Opinion dated Sep. 13, 2021 issued in International Application No. PCT/CN2021/100093.
(Continued)

*Primary Examiner* — Justin T Van Roie
(74) *Attorney, Agent, or Firm* — Sughrue Mion, PLLC

(57) ABSTRACT

A communication method and apparatus for a multicast broadcast service, a computer-readable storage medium, and an electronic device. The method includes: transmitting a first user plane multicast broadcast service (MBS) session establishment request to a first user plane node corresponding to an $i^{th}$ level control plane node, and receiving a first user plane MBS session establishment response fed back by the first user plane node, i=1, ..., N; transmitting a second user plane MBS session establishment request to a second user plane node, and receiving a second user plane MBS session establishment response fed back by the second user plane node; and transmitting a first MBS session start request to a son control plane node of the $i^{th}$ level control plane node.

20 Claims, 20 Drawing Sheets

(56) References Cited

U.S. PATENT DOCUMENTS

2022/0417907 A1* 12/2022 Xiong .................. H04W 72/30
2023/0025793 A1*  1/2023 Xiong ............... H04W 36/0007

FOREIGN PATENT DOCUMENTS

| CN | 111866755 A | 10/2020 |
| CN | 111866756 A | 10/2020 |
| CN | 111866757 A | 10/2020 |
| CN | 111866758 A | 10/2020 |
| WO | 2019/192445 A1 | 10/2019 |

OTHER PUBLICATIONS

Extended European Search Report issued Aug. 10, 2023 in European Application No. 21843090.8.
"3rd Generation Partnership Project; Technical Specification Group Services and System Aspects; Study on architectural enhancements for 5G multicast-broadcast services (Release 17)" 3GPP TR 23.757 v0.3.0, Jan. 2020, pp. 1-37.
International Search Report for PCT/CN2021/100093 dated Sep. 13, 2021 [PCT/ISA/210].

* cited by examiner

Class A address:
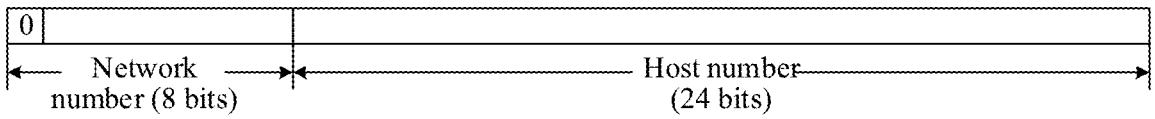
Class B address:
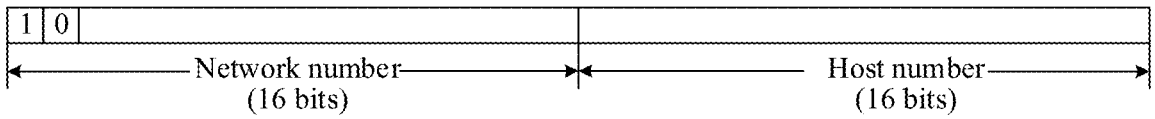
Class C address:
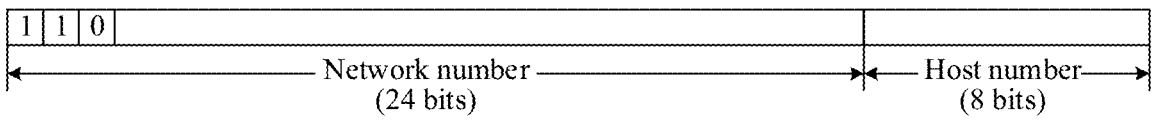
Class D address:
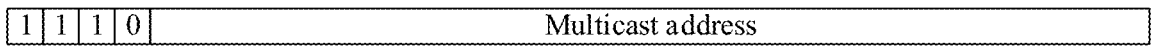
Class E address:
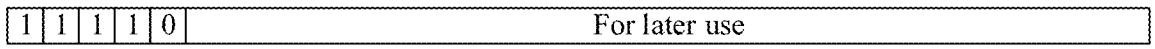
FIG. 3
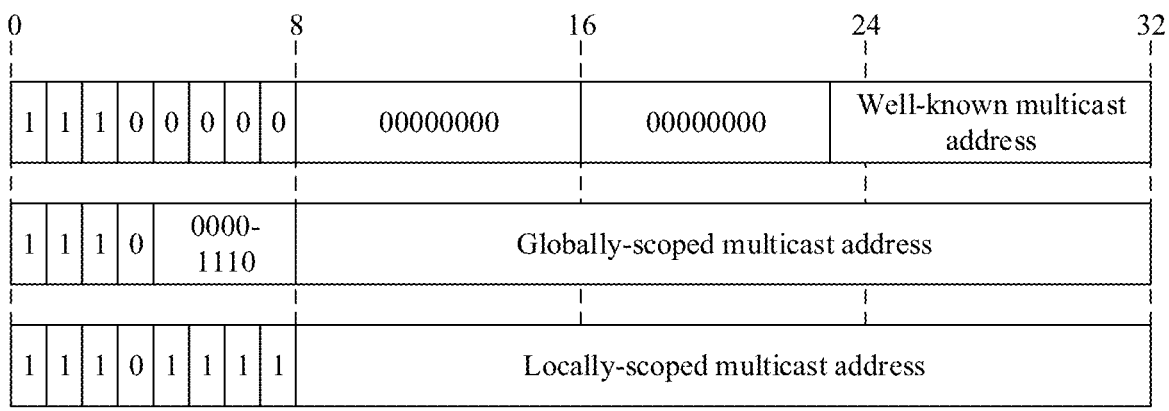
FIG. 4

IGMPv1 protocol header format

| 0 | 3 | 7 | 15 | 31 |
|---|---|---|---|---|
| Version (4 bits) | Type (4 bits) | Unused (8 bits) | | Checksum (16 bits) |
| Group address (32 bits) | | | | |

IGMPv2 protocol header format

| 0 | 7 | 15 | 31 |
|---|---|---|---|
| Type (8 bits) | Maximum response time (8 bits) | | Checksum (16 bits) |
| Group address (32 bits) | | | |

IGMPv3 membership report message format

| 0 | 7 | 15 | 31 |
|---|---|---|---|
| Type=0x22 | Reserved field | | Checksum |
| Reserved field | | Group record number (M) | |
| Group record [1] | | | |
| Group record [2] | | | |
| ⋮ | | | |
| Group record [M] | | | |

FIG. 7

| Transmit a first user plane MBS session establishment request to a first user plane node corresponding to an $i^{th}$ level control plane node, and receive a first user plane MBS session establishment response fed back by the first user plane node, the $i^{th}$ level control plane node being any level control plane node other than a last level control plane node in an MBS session transmission tree, i=1, ..., N, N being a positive integer | S1210 |

| Transmit a second user plane MBS session establishment request to a second user plane node corresponding to the $i^{th}$ level control plane node, and receive a second user plane MBS session establishment response fed back by the second user plane node, the second user plane MBS session establishment request including a first MBS IP multicast transmission address and a first C-TEID used for transmitting MBS data through multicast that are allocated by the first user plane node, the first MBS IP multicast transmission address being used for instructing the second user plane node to join a multicast transmission group corresponding to the first MBS IP multicast transmission address to receive MBS data transmitted by the first user plane node through multicast | S1220 |

| Transmit a first MBS session start request to a son control plane node of the $i^{th}$ level control plane node, so that the son control plane node allocates son user plane nodes to the second user plane node, the first MBS session start request including identification information of the second user plane node and a second MBS IP multicast transmission address and a second C-TEID that are allocated by the second user plane node, and the second MBS IP multicast transmission address being used for instructing the son user plane node to join a multicast transmission group corresponding to the second MBS IP multicast transmission address to receive MBS data transmitted by the second user plane node through multicast | S1230 |

FIG. 12

COMMUNICATION METHOD AND APPARATUS FOR MULTICAST BROADCAST SERVICE, STORAGE MEDIUM, AND ELECTRONIC DEVICE

CROSS-REFERENCE TO RELATED APPLICATION(S)

This application is a continuation application of International Application No. PCT/CN2021/100093, filed on Jun. 15, 2021 which claims priority to Chinese Patent Application No. 202010694090.4, filed with the China National Intellectual Property Administration on Jul. 17, 2020, the disclosures of which are incorporated by reference in their entireties.

FIELD

The present disclosure relates to the field of computer and communication technologies, and in particular, to a communication method and apparatus for a multicast broadcast service, a storage medium, and an electronic device.

BACKGROUND

In 5G multicast broadcast service (MBS) systems, the control plane is separated from the user plane, that is, the control plane node and the user plane node are no longer the same network node. In this case, many problems will be encountered during the establishment of a user plane MBS session transmission tree.

SUMMARY

Embodiments of the disclosure provide a communication method and apparatus for a multicast broadcast service, a storage medium, and an electronic device, for establishing at least a user plane MBS session transmission tree under a communication system architecture in which a control plane is separated from a user plane to a certain extent and also improving transmission efficiency of MBS data.

Other features and advantages of the disclosure become obvious through the following detailed descriptions, or may be partially learned through the practice of the disclosure.

According to an aspect of the embodiments, a communication method for a multicast broadcast service, performed by a computer device, may be provided, the method including: transmitting a first user plane multicast broadcast service (MBS) session establishment request to a first user plane node corresponding to an $i^{th}$ level control plane node, and receiving a first user plane MBS session establishment response fed back by the first user plane node, the $i^{th}$ level control plane node being any level control plane node other than a last level control plane node in an MBS session transmission tree, i=1, . . . , N, N being a positive integer; transmitting a second user plane MBS session establishment request to a second user plane node corresponding to the $i^{th}$ level control plane node, and receiving a second user plane MBS session establishment response fed back by the second user plane node, the second user plane MBS session establishment request including a first MBS Internet Protocol (IP) multicast transmission address and a first common-tunnel endpoint identifier (C-TEID) used for transmitting MBS data through multicast that are allocated by the first user plane node, the first MBS IP multicast transmission address being used for instructing the second user plane node to join a multicast transmission group corresponding to the first MBS IP multicast transmission address to receive the MBS data transmitted by the first user plane node through multicast; and transmitting a first MBS session start request to a son control plane node of the $i^{th}$ level control plane node, so that the son control plane node allocates son user plane nodes to the second user plane node, the first MBS session start request including identification information of the second user plane node, and a second MBS IP multicast transmission address and a second C-TEID that are allocated by the second user plane node, and the second MBS IP multicast transmission address being used for instructing the son user plane nodes to join a multicast transmission group corresponding to the second MBS IP multicast transmission address to receive MBS data transmitted by the second user plane node through multicast.

According to an aspect of the embodiments, a communication method for a multicast broadcast service, performed by a computer device, may be provided, including: receiving a first user plane multicast broadcast service (MBS) session establishment request transmitted by an $i^{th}$ level control plane node in an MBS session transmission tree, the $i^{th}$ level control plane node being any level control plane node other than a last level control plane node in the MBS session transmission tree, i=1, . . . , N, N being a positive integer, the first user plane MBS session establishment request including MBS Internet Protocol (IP) multicast distribution information, the MBS IP multicast distribution information being from a father control plane node of the $i^{th}$ level control plane node, and the MBS IP multicast distribution information including a third MBS IP multicast transmission address and a third C-TEID that are allocated by a parent user plane node of a first user plane node; feeding back a first user plane MBS session establishment response to the $i^{th}$ level control plane node, the first user plane MBS session establishment response including a first MBS IP multicast transmission address and a first C-TEID that are allocated by the first user plane node, and the first MBS IP multicast transmission address being used for instructing a second user plane node corresponding to the $i^{th}$ level control plane node to join a multicast transmission group corresponding to the first MBS IP multicast transmission address to receive MBS data transmitted by the first user plane node through multicast; and joining a multicast transmission group corresponding to the third MBS IP multicast transmission address in a case that the first user plane node supports receiving MBS data of the father user plane node of the first user plane node through multicast, to receive the MBS data transmitted by the father user plane node of the first user plane node through multicast.

According to an aspect of the embodiments, a communication method for a multicast broadcast service, performed by a computer device, may be provided, including: receiving a second user plane multicast broadcast service (MBS) session establishment request transmitted by an $i^{th}$ level control plane node in an MBS session transmission tree, the $i^{th}$ level control plane node being any control plane node other than a last level control plane node in the MBS session transmission tree, i=1, . . . , N, N being a positive integer, and the second user plane MBS session establishment request including a first MBS Internet Protocol (IP) multicast transmission address and a first common-tunnel endpoint identifier (C-TEID) that are allocated by a first user plane node; feeding back a second user plane MBS session establishment response to the $i^{th}$ level control plane node, the second user plane MBS session establishment response including a second MBS IP multicast transmission address and a second C-TEID that are allocated by a second user plane node, and the second MBS IP multicast transmission address being used for instructing a son user plane node of the second user plane node to join a multicast transmission group corresponding to the second MBS IP multicast transmission address to receive MBS data transmitted by the second user plane node through multicast; and joining a multicast transmission group corresponding to the first MBS IP multicast transmission address in a case that the second user plane node supports receiving MBS data of the first user plane node through multicast, to receive the MBS data transmitted by the first user plane node through multicast.

According to an aspect of the embodiments, a communication apparatus for a multicast broadcast service may be provided, including: a first interaction unit, configured to transmit a first user plane multicast broadcast service (MBS) session establishment request to a first user plane node corresponding to an $i^{th}$ level control plane node, and receive a first user plane MBS session establishment response fed back by the first user plane node, the $i^{th}$ level control plane node being any level control plane node other than a last level control plane node in an MBS session transmission tree, i=1, ..., N, N being a positive integer; a second interaction unit, configured to transmit a second user plane MBS session establishment request to a second user plane node corresponding to the $i^{th}$ level control plane node, and receive a second user plane MBS session establishment response fed back by the second user plane node, the second user plane MBS session establishment request including a first MBS Internet Protocol (IP) multicast transmission address and a first common-tunnel endpoint identifier (C-TEID) used for transmitting MBS data through multicast that are allocated by the first user plane node, the first MBS IP multicast transmission address being used for instructing the second user plane node to join a multicast transmission group corresponding to the first MBS IP multicast transmission address to receive the MBS data transmitted by the first user plane node through multicast; and a third interaction unit, configured to transmit a first MBS session start request to a son control plane node of the $i^{th}$ level control plane node, so that the son control plane node allocates son user plane nodes to the second user plane node, the first MBS session start request including identification information of the second user plane node, and a second MBS IP multicast transmission address and a second C-TEID that are allocated by the second user plane node, and the second MBS IP multicast transmission address being used for instructing the son user plane nodes to join a multicast transmission group corresponding to the second MBS IP multicast transmission address to receive MBS data transmitted by the second user plane node through multicast.

According to an aspect of the embodiments, a communication apparatus for a multicast broadcast service may be provided, including: a first receiving unit, configured to receive a first user plane multicast broadcast service (MBS) session establishment request transmitted by an $i^{th}$ level control plane node in an MBS session transmission tree, the $i^{th}$ level control plane node being any level control plane node other than a last level control plane node in the MBS session transmission tree, i=1, ..., N, N being a positive integer, the first user plane MBS session establishment request including MBS Internet Protocol (IP) multicast distribution information, the MBS IP multicast distribution information being from a father control plane node of the $i^{th}$ level control plane node, and the MBS IP multicast distribution information including a third MBS IP multicast transmission address and a third C-TEID that are allocated by a parent user plane node of a first user plane node; a first transmitting unit, configured to feed back a first user plane MBS session establishment response to the $i^{th}$ level control plane node, the first user plane MBS session establishment response including a first MBS IP multicast transmission address and a first C-TEID that are allocated by the first user plane node, and the first MBS IP multicast transmission address being used for instructing a second user plane node corresponding to the $i^{th}$ level control plane node to join a multicast transmission group corresponding to the first MBS IP multicast transmission address to receive MBS data transmitted by the first user plane node through multicast; and a first processing unit, configured to join a multicast transmission group corresponding to the third MBS IP multicast transmission address in a case that the first user plane node supports receiving MBS data of the father user plane node of the first user plane node through multicast, to receive the MBS data transmitted by the father user plane node of the first user plane node through multicast.

According to an aspect of the embodiments, a communication apparatus for a multicast broadcast service may be provided, including: a second receiving unit, configured to receive a second user plane multicast broadcast service (MBS) session establishment request transmitted by an $i^{th}$ level control plane node in an MBS session transmission tree, the $i^{th}$ level control plane node being any control plane node other than a last level control plane node in the MBS session transmission tree, i=1, ..., N, N being a positive integer, and the second user plane MBS session establishment request including a first MBS Internet Protocol (IP) multicast transmission address and a first common-tunnel endpoint identifier (C-TEID) that are allocated by a first user plane node; a second transmitting unit, configured to feed back a second user plane MBS session establishment response to the $i^{th}$ level control plane node, the second user plane MBS session establishment response including a second MBS IP multicast transmission address and a second C-TEID that are allocated by a second user plane node, and the second MBS IP multicast transmission address being used for instructing a son user plane node of the second user plane node to join a multicast transmission group corresponding to the second MBS IP multicast transmission address to receive MBS data transmitted by the second user plane node through multicast; and a second processing unit, configured to join a multicast transmission group corresponding to the first MBS IP multicast transmission address in a case that the second user plane node supports receiving MBS data of the first user plane node through multicast, to receive the MBS data transmitted by the first user plane node through multicast.

According to an aspect of the embodiments, a non-transitory computer-readable medium may be provided, storing a computer program, the computer program, when executed by a processor, implementing the communication method for a multicast broadcast service according to the foregoing embodiments.

According to an aspect of the embodiments, an electronic device may be provided, including: one or more processors; and a storage apparatus, configured to store one or more programs, the one or more programs, when executed by the one or more processors, causing the one or more processors to implement the communication method for a multicast broadcast service according to the foregoing embodiments.

According to an aspect of the embodiments, a computer program product or a computer program may be provided, the computer program product or the computer program including computer instructions, the computer instructions being stored in a computer-readable storage medium. A processor of the computer device reads the computer instructions from the computer-readable storage medium and executes the computer instructions to cause the computer device to perform the communication method for a multicast broadcast service provided in the foregoing optional embodiments.

In the technical solution provided by some embodiments, an $i^{th}$ level control plane node first selects a first user plane node and a second user plane node and then respectively establishes user plane MBS sessions with the first user plane node and the second user plane node. After that, the second user plane node may join a multicast transmission group corresponding to a first MBS IP multicast transmission address allocated by the first user plane node to receive MBS data transmitted by the first user plane node through multicast. In addition, the $i^{th}$ level control plane node transmits a first MBS session start request to a son control plane node of the $i^{th}$ level control plane node, the son control plane node of the $i^{th}$ level control plane node allocates son user plane nodes to the second user plane node based on the first MBS session start request, and the son user plane nodes may join a multicast transmission group corresponding to a second MBS IP multicast transmission address allocated by the second user plane node to receive MBS data transmitted by the second user plane node through multicast. It can be learned that in the technical solution of the embodiments of this application, under a communication system architecture in which a control plane is separated from a user plane, a user plane MBS session transmission tree is established, and because the second user plane node may join the multicast transmission group corresponding to the first MBS IP multicast transmission address allocated by the first user plane node to receive the MBS data transmitted by the first user plane node through multicast, and the son user plane nodes of the second user plane node may join the multicast transmission group corresponding to the second MBS IP multicast transmission address allocated by the second user plane node to receive the MBS data transmitted by the second user plane node through multicast, the transmission efficiency of the MBS data may be improved.

It is to be understood that, the foregoing general descriptions and the following detailed descriptions are merely for illustration and explanation purposes and are not limit herein.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 3 is a schematic diagram showing classes of an IPv4 network address.

FIG. 4 is a schematic structural diagram of an IPv4 multicast address.

FIG. 7 is a schematic diagram of a protocol header format of IGMPv1, a protocol header format of IGMPv2, and a format of a membership report message in IGMPv3.

FIG. 12 is a flowchart of a communication method for a multicast broadcast service according to some embodiments.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In addition, the described features, structures, or characteristics may be combined in one or more embodiments in any appropriate manner. In the following descriptions, a lot of specific details are provided to give a comprehensive understanding of the embodiments. However, a person skilled in the art is to be aware that, the technical solutions may be implemented without one or more of the particular details, or another method, unit, code, apparatus, or operation/step may be used. In other cases, well-known methods, apparatuses, implementations, or operations are not shown or described in detail, to avoid obscuring the aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

A "plurality of" mentioned herein means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

2G (2nd generation mobile communications), 3G (3rd generation mobile communications), and 4G (4th generation mobile communications) wireless communication systems support multimedia broadcast multicast services (MBMS), which includes broadcast and multicast services. However, only the 2G and 3G systems support the multicast service, the 4G system does not support the multicast service in standards, and all the 2G, 3G, and 4G systems support the broadcast service.

Figure 1:
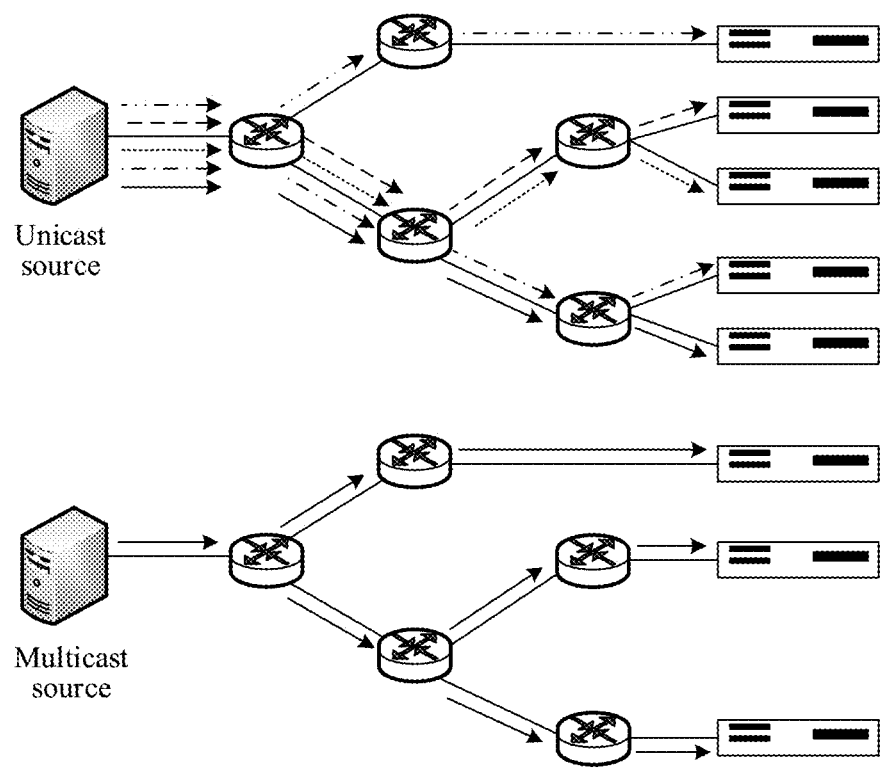
FIG. 1 is a schematic flowchart showing data transmission in a unicast communication system and a multicast communication system.

In addition to the broadcast and multicast services, a communication mode between network nodes also includes unicast. "Unicast" is one-to-one communication, and is advantageous in that a transmitter may transmit different content to different recipients. However, if the transmitter needs to transmit the same content to a plurality of recipients, the transmitter needs to transmit a plurality of copies of the same data to the plurality of recipients in an end-to-end manner, which is inefficient. Specifically, as shown in FIG. 1, when a unicast source transmits data to a plurality of recipients in a unicast mode, the unicast source needs to transmit a plurality of copies of the same data in an end-to-end manner (where different line types in FIG. 1 represent different data flows).

"Multicast" means that a transmitter transmits the same content to a plurality of recipients. Multicast is especially suitable for online video conferencing and online video-on-demand. This is because that if the unicast mode is used, there will be as many transmissions as there are recipients, which is obviously very inefficient. If the broadcast mode that does not distinguish targets but transmits data to all the targets is adopted, although the data may be transmitted at a time, the purpose of distinguishing specific data recipients cannot be achieved. As can be seen, using the multicast mode not only can realize the transmission of the same data to a plurality of recipients at a time, but also can achieve the purpose of transmitting data to only a specific object. Specifically, as shown in FIG. 1, a multicast source may transmit the same data to a plurality of recipients at a time.

"Broadcasting" also transmits the same content to a plurality of recipients, but does not allow for selection of recipients during transmission. Therefore, the data may be unnecessarily transmitted to some devices, resulting in a waste of network resources. In addition, some recipients may not be "interested" in the broadcast content, so after receiving the broadcast content, these recipients have to discard the received data packets, which also results in a waste of terminal resources.

The fundamental difference between the broadcast service and the multicast service lies in that all user equipments (UEs) in a system may participate in the broadcast service without subscription, but cannot participate in the multicast service without subscription and authentication. Moreover, there are many types of multicast services and broadcast services. For a multicast service, a UE joins a multicast group of a corresponding service based on an IP multicast address. A broadcast service corresponding to a broadcast group has a specific service area.

Figure 2:
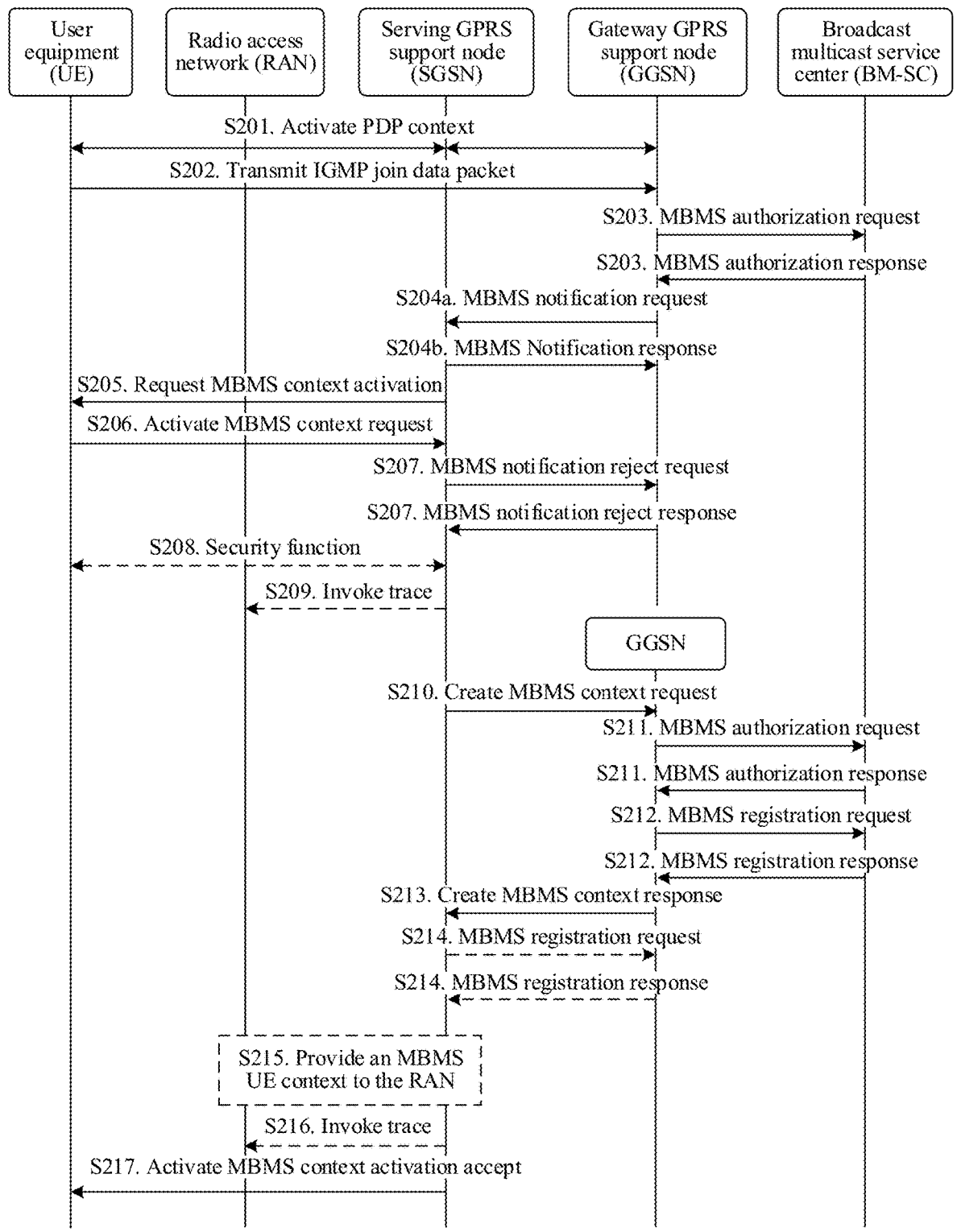
FIG. 2 is a schematic diagram of a multicast context activation process of MBMS.

An MBMS multicast context activation process is defined in clause 8.2 in 3rd Generation Partnership Project (3GPP) TS 23.246, which, as shown in FIG. 2, includes the following operations:

Operation S201. A UE selects an access point name (APN) to establish a packet data protocol (PDP) context, and then an Internet protocol (IP) address is allocated to the UE. For the convenience of subsequent description, the APN selected by the UE in this operation is identified by APN0.

Operation S202. The UE selects an IP multicast address (where the IP multicast address is used for identifying a multicast service), and then transmits an IGMP join data packet to a gateway GPRS support node (GGSN) to indicate that the UE wants to join this multicast group.

Operation S203. The GGSN transmits an MBMS authorization request to a broadcast multicast service center (BM-SC), and receives an MBMS authorization response fed back by the BM-SC. The BM-SC verifies whether the UE may join the multicast group according to subscription data of the UE, and if determining that the UE may join the multicast group, the BM-SC adds an APN to be used by the UE to join the multicast group to the MBMS authorization response (where the APN is identified by APN1), and then transmits the APN1 to be used by the UE to the UE in operations S204a, S204b, and S205.

Operation S206. The UE initiates a new MBMS session according to the APN1 provided by the BM-SC, that is, transmits an MBMS context activation request, the MBMS context activation request including the IP multicast address, the APN1, and an MBMS capability of the UE. The MBMS capability may be, for example, a quality of service (QoS) capability.

Operation S207. A serving GPRS support node (SGSN) checks whether the UE has subscribed to the APN1. If the check fails, the SGSN transmits an MBMS notification reject request to the GGSN, and the GGSN transmits an MBMS notification reject response to the SGSN. The subscription data of the UE is stored in a home subscriber server (HSS), and an interaction process between the SGSN and the HSS is not shown in FIG. 2. In addition, for specific processes of operation S208 and operation S209 in FIG. 2, refer to the MBMS context activation process defined in clause 8.2 in TS 23.246.

Operation S210. If the check on the UE by the SGSN succeeds, the SGSN selects another GGSN (that is, a GGSN supporting the multicast service) according to the APN1, and transmits a create MBMS context request message to the GGSN, the message including an ID of the UE, a UE location ID, the IP multicast address, the APN1, and access information (for example, 2G or 3G) of the UE.

The ID of the UE may be an international mobile subscriber identity (IMSI) or a mobile station international integrated service digital network number (MSISDN). The UE location ID may be a radio access technology (RAT) ID, a common gateway interface (CGI), a service area identity (SAI), or the like.

Operation S211. The GGSN transmits an MBMS authorization request to the BM-SC, and the BM-SC authorizes the UE according to subscription information of the UE and feeds back an MBMS authorization response to the GGSN.

Operation S212. If access of the UE is authorized and there is no context of the UE indicated by the IP multicast address on the GGSN, that is, the UE is the first to access the multicast service identified by the IP multicast address on the GGSN, the UE registers with the upstream node BM-SC to indicate that multicast service data to be transmitted to the IP multicast address needs to be transmitted to this GGSN. (Note: Different GGSNs may be selected for different UEs, so when the BM-SC transmits multicast data downward, the same multicast data needs to be transmitted to these GGSNs at the same time).

Operation S213. The GGSN creates an MBMS UE context of the UE corresponding to the IP multicast address, and then transmits a create MBMS context response to the SGSN to indicate that the MBMS context is successfully created.

Operation S214. Similar to S212, if there is no context of the UE indicated by the IP multicast address on the SGSN, that is, the UE is the first to access the multicast service identified by the IP multicast address on the SGSN, the UE registers with the upstream node GGSN to indicate that multicast service data to be transmitted to the IP multicast address needs to be transmitted to this SGSN. (Note: Different SGSNs may be selected for different UEs, so when the GGSN transmits multicast data downward, the same multicast data needs to be transmitted to these SGSNs at the same time).

For specific processes of operations S215 to S217 in FIG. 2, refer to the MBMS context activation process defined in clause 8.2 in TS 23.246.

It can be learned from the process shown in FIG. 2 that a UE in 2G or 3G first establishes a PDP context by using an APN0, and an IP address is allocated to the UE, and then the UE transmits an IGMP join data packet indicating that the UE joins a multicast group to a network with this IP address; the GGSN needs to intercept this IGMP join data packet, and then transmit a signaling (that is, an MBMS authorization request) to a BM-SC; the BM-SC allocates an APN1 to the UE; then the UE transmits a request MBMS context activation message with this APN1, thus activating an MBMS context.

The IP multicast address may be an IPv4 multicast address or an IPv6 multicast address. As shown in FIG. 3, the IPv4 network address is classified as a class A address, a class B address, a class C address, a class D address, and a class E address. In the class A address, the first byte (8 bits) is network number, and the other three bytes (24 bits) is host number. The range of the class A address is: 0.0.0.0 to 127.255.255.255. In the class B address, the first byte and the second byte are network number, and the other two bytes are host number. The range of the class B address is: 128.0.0.0 to 191.255.255.255. In the class C address, the first three bytes are network number, and the fourth byte is host number. The range of the class C address is: 192.0.0.0 to 223.255.255.255. The class D address is a multicast address. The first four bits of the class D address are "1110". The range of the class D address is: 224.0.0.0 to 239.255.255.255. The class E address is a reserved address. The first five bits of the class E address are "11110". The range of the class E address is: 240.0.0.0 to 247.255.255.255.

As shown in FIG. 4, the IPv4 multicast address may have three structures, which are respectively applicable to a well-known multicast address, a globally-scoped multicast address, and a locally-scoped multicast address.

Figure 5:
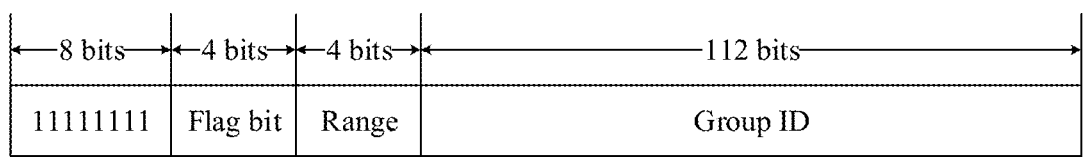
FIG. 5 is a schematic structural diagram of an IPv6 multicast address.

A structure of an IPv6 multicast address is shown in FIG. 5, where the first byte (8 bits) indicates that the address is a multicast address, the next four bits are a flag field, and the next four bits are a scope field, and the last 112 bits are a group ID.

The first bit of the flag field is 0, which is reserved for future use. The second bit of the flag field indicates whether the multicast address is embedded with a rendezvous point (RP). The RP is a distribution point for a specified multicast stream in a multicast network. For example, when the second bit value is 0, it indicates that no rendezvous point is embedded and when the second bit value is 1, it indicates that a rendezvous point is embedded. The third bit of the flag field indicates whether prefix information is embedded in the multicast address. For example, when the third bit value is 0, it indicates that no prefix information is embedded, and when the third bit value is 1, it indicates that prefix information is embedded. The last bit of the flag field indicates whether the multicast address is a permanently assigned multicast address or a transient multicast address. For example, when the last bit value is 0, it indicates that the multicast address is the permanently assigned multicast address and when the last bit value is 1, it indicates that the multicast address is the transient multicast address.

The function of the scope field is to limit the scope of the multicast address. The values and descriptions of the scope field are as shown in Table 1:

TABLE 1

| Value | Description |
| --- | --- |
| 0 | Reserved |
| 1 | Interface-local scope, called a node-local scope in earlier specification |
| 2 | Link-local scope |
| 3 | Reserve |
| 4 | Admin-local scope |
| 5 | Site-local scope |
| 6 and 7 | Not allocated |
| 8 | Organization-local scope |
| 9, A, B, C, and D | Not allocated |
| E | Global scope |
| F | Reserved |

In multicast communication, the multicast address can be used as only a destination IP address (that is, the destination IP address in an IP header), and cannot be used as a source IP address. In multicast services of MBMS (2G, 3G) and MBS (5G), multicast data packets are all transmitted downward by the network side to UEs, that is, the multicast data packets are all downlink (DL) data packets, and the UEs cannot transmit data to the network side through corresponding multicast addresses. That is, the UE cannot use the multicast address as the destination IP address to transmit an uplink IP packet, that is, there is no uplink (UL) multicast data.

Figure 6:
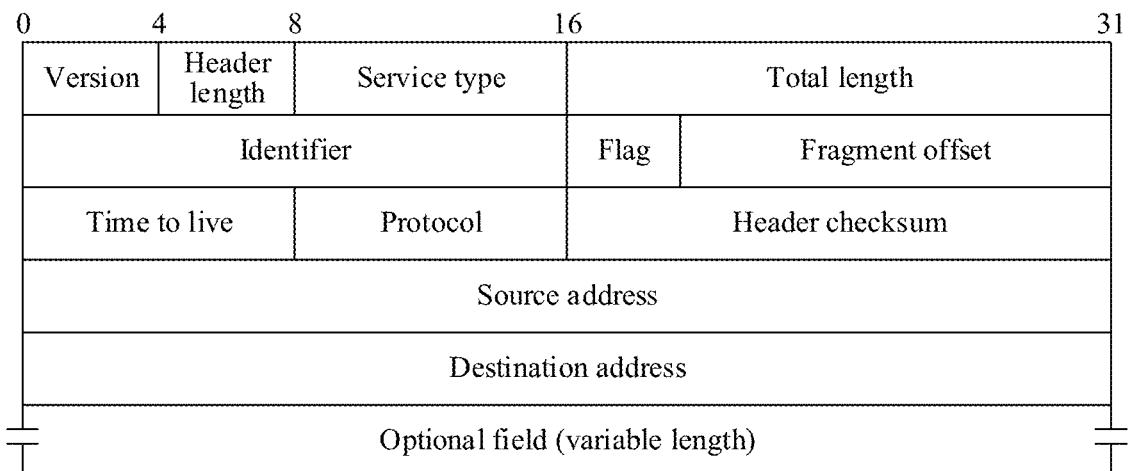
FIG. 6 is a schematic structural diagram of an IPv4 header.

An IP packet transmitted in a network is formed by two parts: an IP header and data. As shown in FIG. 6, a structure of an IPv4 header mainly includes: a "version" field, a "header length" field, a "service type" field, a "total length" field, an "identifier" field, a "flag" field, a "fragment offset" field, a "time to live" field, a "protocol" field, a "header checksum" field, a "source address" field, a "destination address" field, and an "optional field".

The "version" field occupies 4 bits and refers to the version of the IP protocol, for example, a version number is 4 (i.e., IPv4). The "header length" field occupies 4 bits. The "service type" field occupies 8 bits and is used to obtain a better service. The "total length" field occupies 16 bits and refers to a length of a sum of the header and data. The "identifier" field occupies 16 bits and is a counter configured to generate an identifier of a datagram. The "flag" field occupies 3 bits. The least significant bit of the "flag" field is more fragment (MF). If MF=1, it indicates that there are "more fragments" later. If MF=0, it indicates that it is the last fragment. The middle bit of the "flag" field is don't fragment (DF), and fragmentation is allowed only when DF=0. The "fragment offset" field occupies 12 bits, and refers to the relative position of a certain fragment obtained by fragmenting a relatively long packet in the original packet. The "time to live" field is time to live (TTL), which occupies 8 bits. The TTL field is a field initially set by the transmitter. The "protocol" field occupies 8 bits and is used for indicating which protocol the data carried in this datagram uses, where a value of "1" indicates an Internet control message protocol (ICMP); a value of "2" indicates an IGMP; a value of "6" indicates a transmission control protocol (TCP); a value of "17" indicates a user datagram protocol (UDP); a value of "50" indicates an encapsulating security payload (ESP) protocol; and a value of "51" indicates an authentication header (AH) protocol. The "header checksum" field occupies 16 bits, where only the header of the datagram is checked, and the data part is not checked. The "source address" field and the "destination address" field each occupy 4 bytes, and are used for recording a source address and a destination address respectively.

For the IGMP protocol mentioned above, there are three protocol versions, namely, IGMPv1, IGMPv2, and IGMPv3, and corresponding standards are RFC1054, RFC2236, and RFC3376 respectively. A protocol header format of IGMPv1 and a protocol header format of IGMPv2 are shown in FIG. 7. A protocol header of IGMPv1 includes a 4-bit IGMP version field, a 4-bit IGMP packet type field (where a field value of 1 indicates a host membership query type; and a value of 2 indicates a host membership report type), an 8-bit unused field (where this field is filled with 0 when being transmitted and is ignored when being received), a 16-bit IGMP checksum field (when transmitting a packet, the check word is calculated and inserted into this field; when a packet is received, this field is checked before the packet is processed), and a 32-bit multicast address field.

A protocol header of IGMPv2 includes an 8-bit packet type field, an 8-bit maximum response time field, a 16-bit IGMP checksum field, and a 32-bit multicast address field.

The packet type field in the protocol header of IGMPv2 indicates the following types: 0x11=Membership Query, indicating an IGMP membership query message; 0x12=Version 1 Membership Report, indicating a membership report message of IGMPv1; and 0x16=Version 2 Membership Report, indicating a membership report message of IGMPv2; and 0x17=Leave Group, indicating a leave message. In IGMPv2, the old 4-bit version field and the old 4-bit type field are combined into a new 8-bit type field. The type codes of the membership query message (version 1 and version 2) and the membership report message of version 1 are set to 0x11 and 0x12 respectively to maintain backward compatibility with the IGMP version 1 and version 2 packet formats.

The maximum response time field in the protocol header of IGMPv2 is used for indicating a maximum time (in units of 1/10 second) before a response report is transmitted, and has a default value of 10 seconds. Similar to IGMPv1, when a packet is transmitted, a checksum is calculated and filled in a checksum field in the protocol header of IGMPv2. When a packet is received, a checksum is checked before the packet is processed, to determine whether an error occurs during transmission of the IGMP message.

Still referring to FIG. 7, a format of a membership report message in IGMPv3 includes a type field (because it is a membership report message, type=0x22), a reserved field, a checksum field, a group record number field, and a group record field. The IGMP join data packet shown in FIG. 2 is implemented by an IGMP membership report message. For IGMPv3, the destination IP address in the IP packet of the IGMP join message is not the IP multicast address to be joined, but the IP multicast address to be joined is included in the parameters of the message.

Figure 8:
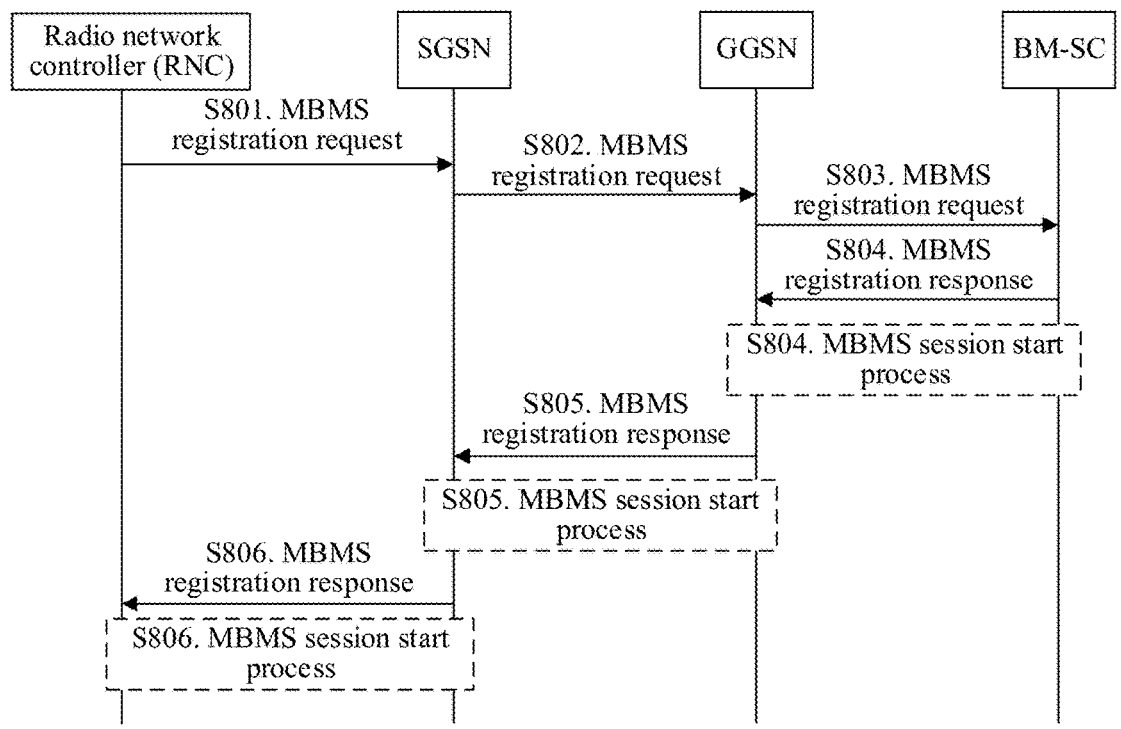
FIG. 8 is a schematic diagram of an MBMS registration process of an MBMS multicast service.

An MBMS registration process applicable to an MBMS multicast service is defined in clause 8.4 in the standard TS23.246. Specifically, as shown in FIG. 8, the following operations are included: operation S801. A radio network controller (RNC) transmits an MBMS registration request to an SGSN. Operation S802. The SGSN transmits the MBMS registration request to a GGSN. Operation S803. The GGSN transmits the MBMS registration request to a BM-SC. Operation S804. The BM-SC feeds back an MBMS registration response to the GGSN and performs an MBMS session start process. Operation S805. The GGSN feeds back the MBMS registration response to the SGSN and performs the MBMS session start process. Operation S806. The SGSN feeds back the MBMS registration response to the RNC and performs the MBMS session start process. It can be learned that a main function of the MBMS registration process is to form a signaling tree for controlling establishment of a bearer plane (an MBMS bearer context) from top to bottom. Because in the 2G or 3G standard, a control plane is not separated from a user plane, the formation of a transmission tree of an MBMS bearer control plane on the control plane is equivalent to the subsequent establishment of an MBMS bearer transmission tree from top to bottom (Note: the MBMS bearer transmission tree is established in the MBMS session start process). In addition, because 4G does not support a multicast service, there is no MBMS registration process in the 4G standard.

Figure 9:
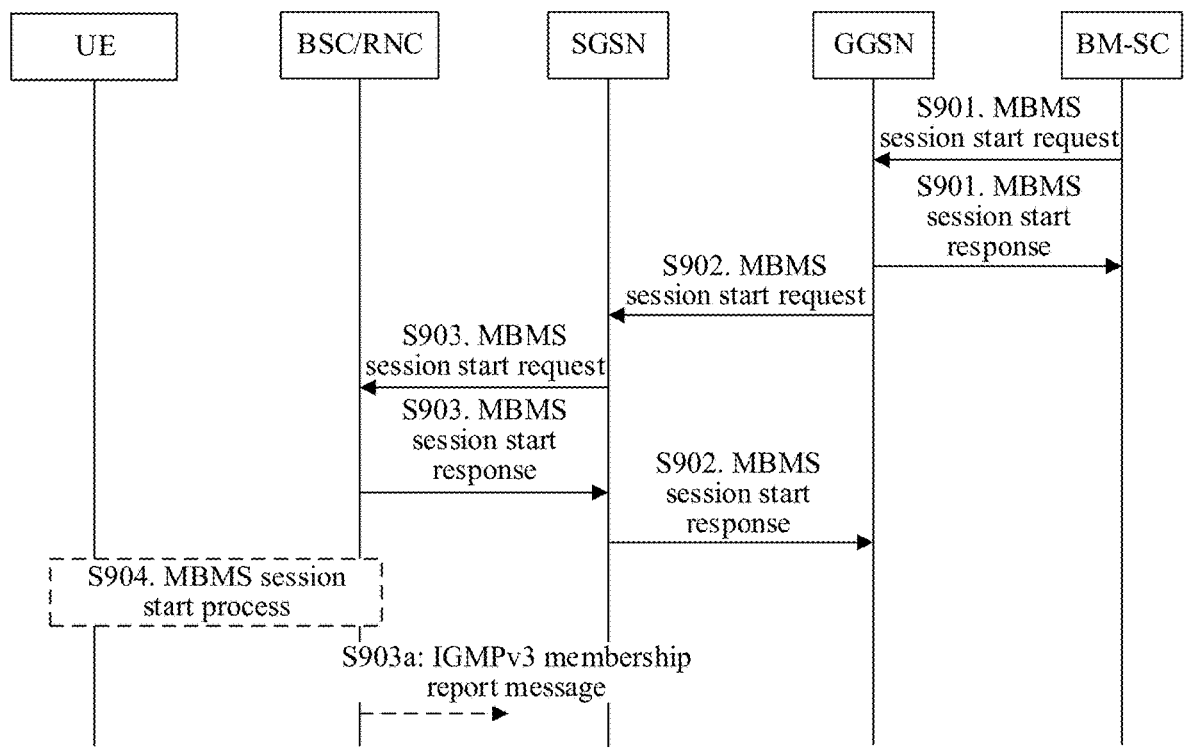
FIG. 9 is a schematic diagram of an MBMS session start process.

The MBMS session start process is defined in clause 8.3 in the standard TS23.246. Specifically, as shown in FIG. 9, the following operations are included: operation S901. A BM-SC transmits an MBMS session start request to a GGSN, and the GGSN feeds back an MBMS session start response to the BM-SC. Operation S902. The GGSN transmits an MBMS session start request to an SGSN, and then the SGSN feeds back an MBMS session start response to the GGSN. Operation S903. The SGSN transmits an MBMS session start request to a base station controller (BSC)/RNC, and then the BSC/RNC feeds back an MBMS session start response to the SGSN. Operation S904. A UE performs an MBMS session start process with the RSC/RNC. Operation S903a. The BSC/RNC transmits an IGMPv3 membership report message.

For the MBMS multicast service, both the MBMS registration process and the MBS session start process are per IP multicast (each IP multicast) process for establishing the signaling tree of the MBMS bearer context of the control plane from top to bottom and the MBMS bearer transmission tree from top to bottom for this IP multicast rather than per UE per IP multicast. For the MBMS broadcast service, there is no MBMS registration process, and the MBS session start process is a per IP broadcast process for establishing the signaling tree of the MBMS bearer context of the control plane from top to bottom and the MBMS bearer transmission tree from top to bottom for this IP broadcast rather than per UE per IP broadcast.

However, for the MBMS multicast service, in order to optimize the registration process, the UE may perform a part of the MBMS registration process when performing the MBMS UE context activation process, for example, operation S212 and operation S214 shown in FIG. 2, but this is only performed when the first UE in the SGSN and the GGSN activates the IP multicast service. When a second UE activates this IP multicast on the same SGSN and GGSN, operation S212 and operation S214 shown in FIG. 2 are no longer performed.

For the MBMS multicast service and broadcast service, an important function is to form a user plane transmission tree of the multicast service and the broadcast service, to prevent the formation of a user plane transmission ring (that is, there are a plurality of different transmission paths for reaching a node), and also prevent the occurrence of MBMS broken branches (that is, there is no downstream node in a node).

In the 2G and 3G systems, a plurality of SGSNs may form a pool. Although the GGSN does not define the pool in the standard, there is a GGSN pool to provide high reliability of the system during actual deployment. In this way, when different UEs access the same BSC/RNC and activate the same MBMS IP multicast, the UEs may be selected by the BSC/RNC to different SGSNs in the same SGSN pool. However, because APNs used by the UEs are the same, different SGSNs in the same SGSN pool will be selected to different GGSNs, but the SGSNs may be connected to the same GGSN. The standard of 3GPP stipulates that the RNC is allowed to use the SGSN pool when using an Iu interface. For MBMS, the GGSN needs to be directly connected to the RNC by using a GPRS tunneling protocol-user plane (GTP-U), and the user plane is not allowed to pass through the SGSN. In this way, even if different users on the same RNC select different SGSNs by using a same APN and IP multicast, but user planes thereof are the same finally, and a plurality of different user planes do not exist.

However, a plurality of SGSNs transmit MBMS session start request messages to the BSC. For this case, that the MBMS session start request messages of other SGSNs are rejected by using the BSC/RNC to implement only one user plane is defined in the standard TS23.236. Similarly, when a plurality of GGSNs transmit MBMS session start request messages to one SGSN, the SGSN can select only one GGSN to establish a bearer plane, to prevent occurrence of the MBMS transmission ring.

When the BSC/RNS rejects establishment of a bearer plane of one SGSN, it may cause the SGSN to have no downstream node. In this case, the SGSN can only delete itself from downstream nodes of the GGSN through a deregistration technology (for details, reference may be made to clause 8.6.0 in the standard TS23.236), to avoid a problem that the GGSN transmits MBMS multicast data to the SGSN, but the SGSN cannot transmit the MBMS multicast data downward, thereby avoiding an MBMS transmission broken branch. Similarly, when the SGSN rejects establishment of a bearer plane of a GGSN, it may cause the GGSN to have no downstream node. In this case, the GGSN can only delete itself from downstream nodes of the BM-SC by using the deregistration technology, to prevent the BM-SC from transmitting MBMS multicast data to the GGSN, thereby avoiding the MBMS transmission broken branch.

That is, for the MBMS multicast service, except the final transmission point UE, any node has a downstream node. If one node has no downstream node, the node is to leave the transmission tree (which corresponds to a deregistration process). For example, when all MBMS UEs under a base station move to another base station, the base station needs to perform a deregistration operation on the SGSN. When all MBMS connection base stations under one SGSN perform the deregistration operations, the SGSN needs to perform the deregistration operation on the GGSN. When all MBMS connection SGSNs under one GGSN perform the deregistration operations, the GGSN needs to perform the deregistration operation on the BM-SC.

In addition, because a transmission path of MBMS services (which include a broadcast service and a multicast service) is a tree-like structure, one or more son nodes is below each father node, and a bearer between the father node and the son node may be a GTP tunnel between the father and the son. However, when there are a relatively large quantity of son nodes, the father node needs to transmit same IP multicast data to a plurality of son nodes simultaneously, and the efficiency is obviously very low in a GTP tunnel transmission manner. To improve the transmission efficiency between the father node and the son node on a network side, the father node may allocate a local IP multicast address (the address is not a multicast address in the MBMS multicast service). The IP multicast address in the transmission layer is used for efficiently transmitting the MBMS service data between the son node (for example, the base station) and the father node (for example, the MBMS GW or the GGSN). In this case, the father node only needs to transmit out the MBMS service data by using the multicast address of the transmission layer, and all the son nodes may receive the MBMS service data, to greatly reduce a data processing volume of the father node.

By using the multicast-based bearer transmission optimization technology, the father node needs to allocate a local IP multicast transmission layer address, and after receiving the IP multicast transmission layer address allocated by the father node, the son node needs to join a multicast group of the transmission layer through an IGMP join process. Because some son nodes do not support multicast, some son nodes receive the MBMS service data in a transmission layer multicast manner, some other son nodes use a peer-to-peer GTP tunnel manner. In this case, the son node allocates an IP address and a TEID of the downlink GTP-U. Certainly, if the father node finds that a quantity of son nodes is relatively small, the father node may also decide not to adopt multicast transmission.

Because in the MBMS system, the control plane is not separated from the user plane, that is, the network node includes functions of both the user plane and the control plane, when a network node does not support a multicast transmission technology, the network node directly replies an IP address and a TEID of a GTP-U, the father node may learn that the node does not support multicast transmission.

However, in 5G multicast broadcast service (MBS) systems, the control plane is separated from the user plane, that is, the control plane node and the user plane node are no longer a same network node. In this case, many problems will be encountered during the establishment of an MBS session transmission tree.

Figure 10:
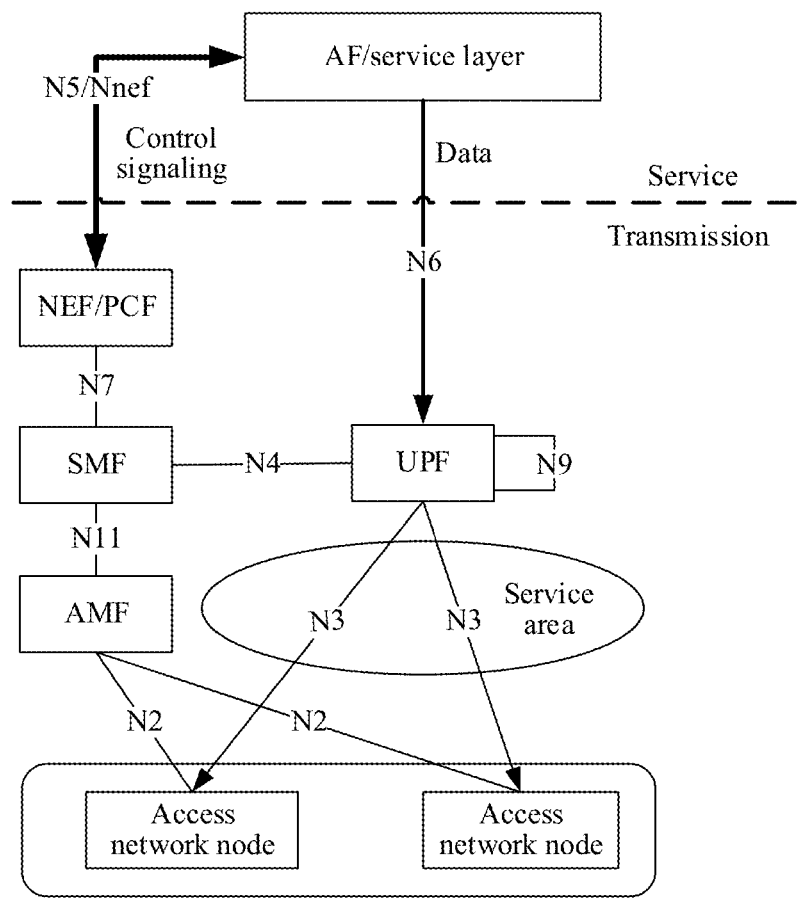
FIG. 10 is a schematic diagram of an MBS system architecture.
Figure 11:
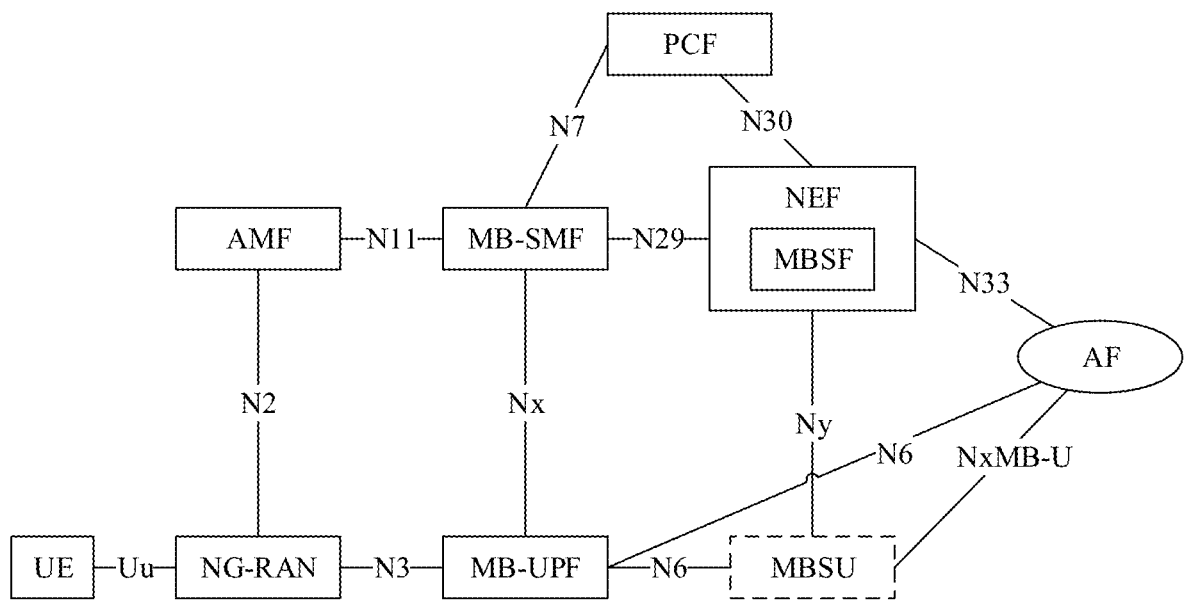
FIG. 11 is a schematic diagram of an MBS system architecture.

In addition, two system architectures shown in FIG. 10 and FIG. 11 are defined in the latest 5G MBS research reports. The system architecture shown in FIG. 10 is obtained by adding functions to an existing 5G architecture, that is, supporting 5G MBS services by enhancing the functions and interfaces of the 5G architecture without modifying the existing 5G architecture. The advantage of this architecture is that it can support 5G MBS through software upgrade. The system architecture shown in FIG. 11 is a brand-new architecture, which is obtained by adding some new network function nodes while keeping the existing 5G architecture unchanged. This architecture can minimize the impact on the existing 5G architecture, but some network function nodes may still need to be enhanced, such as a next generation radio access network (NG-RAN), an access and mobility management function (AMF), a unified data management (UDM), a user data repository (UDR), a network exposure function (NEF), and a PCF.

In FIG. 10, SMF represents session management function; UPF represents a user plane function; and AF represents application function. In FIG. 11, MB-UPF represents multicast/broadcast-UPF; MB-SMF represents multicast/broadcast-SMF; MBSU represents multicast/broadcast service user plane; and MBSF represents multicast/broadcast service user plane.

Related technical content of a user plane MBS session transmission tree of a 5G MBS system is described in the following embodiments. Detailed descriptions are as follows.

FIG. 12 is a flowchart of a communication method for a multicast broadcast service according to some embodiments. The communication method for a multicast broadcast service may be performed by an $i^{th}$ level control plane node such as the SMF in FIG. 10 or the MB-SMF in FIG. 11. The communication method for a multicast broadcast service includes at least operation S1210 to operation S1230. Detailed descriptions are as follows.

Operation S1210. Transmit a first user plane MBS session establishment request to a first user plane node corresponding to an $i^{th}$ level control plane node, and receive a first user plane MBS session establishment response fed back by the first user plane node, the $i^{th}$ level control plane node being any level control plane node other than a last level control plane node in an MBS session transmission tree, i=1, . . . , N, N being a positive integer.

In an embodiment, both the first user plane node corresponding to the $i^{th}$ level control plane node and a second user plane node mentioned below are user plane nodes that can be managed by the $i^{th}$ level control plane node. For example, the first user plane node is used as a user plane function entity of a protocol data unit (PDU) session anchor (PSA), and the second user plane node is used as a user plane function entity of a non-PSA. An objective of selecting the second user plane node is that: it is assumed that distances between the first user plane node and downstream user plane nodes (the downstream user plane nodes are user plane nodes below the first user plane node in the user plane MBS session transmission tree) are relatively long and there are a relatively large quantity of downstream user plane nodes, data transmission efficiency between the first user plane node and the downstream user plane nodes is affected. Therefore, the second user plane node is selected to transmit MBS data transmitted by the first user plane node to the downstream user plane nodes to improve the data transmission efficiency.

In some embodiments, if the $i^{th}$ level control plane node is not a first level control plane node in the MBS session transmission tree, and the first user plane node supports receiving MBS data of a father user plane node of the first user plane node through multicast, the first user plane MBS session establishment request transmitted by the $i^{th}$ level control plane node to the first user plane node includes MBS IP multicast distribution information. The MBS IP multicast distribution information includes a third MBS IP multicast transmission address and a third C-TEID that are allocated by the father user plane node of the first user plane node (the father user plane node of the first user plane node is a user plane node having a same level as the $i^{th}$ level control plane node in the MBS session transmission tree). The third MBS IP multicast transmission address is used for instructing the first user plane node to join a multicast transmission group corresponding to the third MBS IP multicast transmission address to receive the MBS data transmitted by the father user plane node of the first user plane node through multicast.

In some embodiments, the MBS IP multicast distribution information included in the first user plane MBS session establishment request transmitted by the $i^{th}$ level control plane node to the first user plane node is from a second MBS session start request transmitted by a father control plane node of the $i^{th}$ level control plane node.

In some embodiments, if the first user plane node supports receiving the MBS data of the father user plane node of the first user plane node through peer to peer rather than through multicast, the first user plane MBS session establishment request includes indication information requesting to allocate an F-TEID to the first user plane node, the first user plane MBS session establishment response includes an F-TEID allocated by the first user plane node, and the F-TEID allocated to the first user plane node is used for causing the first user plane node to receive, through peer to peer, the MBS data transmitted by the father user plane node of the first user plane node.

In some embodiments, if the $i^{th}$ level control plane node cannot learn whether the first user plane node does not support receiving data transmitted through multicast or even though the $i^{th}$ level control plane node learns that the first user plane node does not support receiving data transmitted through multicast but does not make a decision, the first user plane node may indicate, by using the first user plane MBS session establishment response, that the first user plane node supports receiving the MBS data of the father user plane node of the first user plane node through peer to peer rather than through multicast, and the first user plane MBS session establishment response includes the F-TEID allocated to the first user plane node.

In some embodiments, the first user plane MBS session establishment request further includes indication information for instructing the first user plane node to allocate new MBS IP multicast distribution information. In this case, the first user plane MBS session establishment response fed back by the first user plane node includes a first MBS IP multicast transmission address and a first C-TEID that are allocated by the first user plane node. The first MBS IP multicast transmission address is used for causing the second user plane node to join a multicast transmission group corresponding to the first MBS IP multicast transmission address to receive the MBS data transmitted by the first user plane node.

In some embodiments, if at least two first user plane nodes corresponding to the $i^{th}$ level control plane node are selected, the $i^{th}$ level control plane node needs to transmit a first user plane MBS session establishment request to each first user plane node and receive a first user plane MBS session establishment response fed back by each first user plane node.

Operation S1220. Transmit a second user plane MBS session establishment request to a second user plane node corresponding to the $i^{th}$ level control plane node, and receive a second user plane MBS session establishment response fed back by the second user plane node, the second user plane MBS session establishment request including a first MBS IP multicast transmission address and a first C-TEID used for transmitting MBS data through multicast that are allocated by the first user plane node, the first MBS IP multicast transmission address being used for instructing the second user plane node to join a multicast transmission group corresponding to the first MBS IP multicast transmission address to receive MBS data transmitted by the first user plane node through multicast.

In some embodiments, the second user plane MBS session establishment request includes indication information for instructing the second user plane node to allocate new MBS IP multicast distribution information. In this case, the second user plane MBS session establishment response fed back by the second user plane node includes a second MBS IP multicast transmission address and a second C-TEID that are allocated by the second user plane node. The second MBS IP multicast transmission address is used for instructing a son user plane node of the second user plane node to join a multicast transmission group corresponding to the second MBS IP multicast transmission address to receive MBS data transmitted by the second user plane node through multicast.

In some embodiments, if the second user plane node supports receiving the MBS data transmitted by the first user plane node through peer to peer rather than through multicast, the second user plane MBS session establishment request includes indication information requesting to allocate an F-TEID to the second user plane node, the second user plane MBS session establishment response includes the F-TEID allocated by the second user plane node, and the F-TEID allocated by the second user plane node is used for causing the second user plane node to receive, through peer to peer, the MBS data transmitted by the first user plane node.

In some embodiments, if the $i^{th}$ level control plane node cannot learn whether the second user plane node does not support receiving data transmitted through multicast or even though the $i^{th}$ level control plane node learns that the second user plane node does not support receiving data transmitted through multicast but does not make a decision, the second user plane node may indicate, by using the second user plane MBS session establishment response, that the second user plane node supports receiving the MBS data of the first user plane node through peer to peer rather than through multicast, and the second user plane MBS session establishment response includes the F-TEID allocated by the second user plane node.

In some embodiments, after receiving the second user plane MBS session establishment response fed back by the second user plane node, the $i^{th}$ level control plane node transmits a user plane MBS session modification request to the first user plane node in a case of determining that there is a second user plane node that supports receiving, through peer to peer rather than through multicast, the MBS data transmitted by the first user plane node. The user plane MBS session modification request includes an F-TEID allocated to the second user plane node that supports receiving, through peer to peer rather than through multicast, the MBS data transmitted by the first user plane node, so that the first user plane node transmits, through peer to peer, the MBS data to the second user plane node that supports receiving, through peer to peer rather than through multicast, the MBS data transmitted by the first user plane node. In this case, if the $i^{th}$ level control plane node determines that there is also a second user plane node that supports receiving, through multicast, the MBS data transmitted by the first user plane node, the user plane MBS session modification request further includes a field for starting multicast transmission, to instruct the first user plane node to transmit the MBS data to the second user plane node through multicast transmission simultaneously.

In some embodiments, if the $i^{th}$ level control plane node selects at least two first user plane nodes and at least two second user plane nodes, the $i^{th}$ level control plane node needs to transmit a second user plane MBS session establishment request to each selected second user plane node. The second user plane MBS session establishment request transmitted to each second user plane node includes a first MBS IP multicast transmission address and a first C-TEID that are allocated by a corresponding first user plane node. First MBS IP multicast transmission addresses allocated by different first user plane nodes are different.

In some embodiments, if all the second user plane nodes selected by the $i^{th}$ level control plane node cannot establish communication with a first user plane node, the first user plane node does not have downstream nodes. In this case, the user plane MBS session transmission tree has a broken branch. Therefore, the $i^{th}$ level control plane node needs to transmit a user plane MBS session deletion request to the first user plane node. In addition, if all user equipments served by a first user plane node move to another region, that is, the first user plane node does not need to provide services to the user equipments, the $i^{th}$ level control plane node may also transmit the user plane MBS session deletion request to the first user plane node.

Operation S1230. Transmit a first MBS session start request to a son control plane node of the $i^{th}$ level control plane node, so that the son control plane node allocates son user plane nodes to the second user plane node, the first MBS session start request including identification information of the second user plane node, and a second MBS IP multicast transmission address and a second C-TEID that are allocated by the second user plane node, and the second MBS IP multicast transmission address being used for instructing the son user plane nodes to join a multicast transmission group corresponding to the second MBS IP multicast transmission address to receive MBS data transmitted by the second user plane node through multicast.

In some embodiments, if the $i^{th}$ level control plane node selects at least two second user plane nodes, son user plane nodes respectively allocated by a son control plane node of the $i^{th}$ level control plane node to the at least two second user plane nodes are different, and each son user plane node allocated to the second user plane nodes is not allocated as a son node of another user plane node. That is, in some embodiments, in the MBS session transmission tree, one user plane node can have only one father user plane node.

In some embodiments, if the $i^{th}$ level control plane node selects at least two second user plane nodes, the first MBS session start request transmitted by the $i^{th}$ level control plane node to the son control plane node of the $i^{th}$ level control plane node includes identification information of each second user plane node selected by the $i^{th}$ level control plane node and a second MBS IP multicast transmission address and a second C-TEID that are allocated by each second user plane node. Second MBS IP multicast transmission addresses allocated by different second user plane nodes are different.

In some embodiments, after transmitting the first MBS session start request to the son control plane node of the $i^{th}$ level control plane node, the $i^{th}$ level control plane node receives a first MBS session start response fed back by the son control plane node of the $i^{th}$ level control plane node. The first MBS session start response includes indication information. Content included in the indication information may have the following cases.

Case 1: in an embodiment, the indication information includes the identification information of the second user plane node, first F-TEID list information, and first field information used for indicating that multicast transmission is started. The first field information indicates that a son user plane node that supports receiving, through multicast, the MBS data transmitted by the second user plane node exists in the son user plane nodes allocated by the son control plane node of the $i^{th}$ level control plane node to the second user plane node, the first F-TEID list information includes F-TEIDs allocated by son user plane nodes that support receiving, through peer to peer rather than through multicast, the MBS data transmitted by the second user plane node in the son user plane nodes allocated by the son control plane node of the $i^{th}$ level control plane node to the second user plane node, and the F-TEID is used for causing the son user plane node of the second user plane node to receive, through peer to peer, the MBS data transmitted by the second user plane node.

Case 2: in an embodiment, the indication information includes the identification information of the second user plane node and does not include the first F-TEID list information and the first field information. The indication information is used for indicating that all the son user plane nodes allocated by the son control plane node of the $i^{th}$ level control plane node to the second user plane node support receiving, through multicast, the MBS data transmitted by the second user plane node.

Case 3: in an embodiment, the indication information includes the identification information of the second user plane node and the first F-TEID list information and does not include the first field information. The indication information is used for indicating that all the son user plane nodes allocated by the son control plane node of the $i^{th}$ level control plane node to the second user plane node support receiving, through peer to peer rather than through multicast, the MBS data transmitted by the second user plane node.

Case 4: in an embodiment, the indication information includes the identification information of the second user plane node and field information indicating that multicast transmission is stopped and does not include the first F-TEID list information. In this case, the indication information is used for indicating that the son control plane node of the $i^{th}$ level control plane node does not allocate the son user plane nodes to the second user plane node. Optionally, the field information indicating that multicast transmission is stopped may be that a value of multicast enable is set to disable.

In some embodiments, if the $i^{th}$ level control plane node selects at least two second user plane nodes, the first MBS session start response fed back by the son control plane node of the $i^{th}$ level control plane node includes an indication information list. The indication information list includes indication information respectively corresponding to all the second user plane nodes selected by the $i^{th}$ level control plane node.

In some embodiments, the first MBS session start response fed back by the son control plane node of the $i^{th}$ level control plane node may further include a failed identification information list. The failed identification information list is used for indicating a target second user plane node to which son user plane nodes are not allocated.

In some embodiments, if the $i^{th}$ level control plane node determines, according to the first MBS session start response fed back by the son control plane node of the $i^{th}$ level control plane node, that a target second user plane node to which son user plane nodes are not allocated exists, the $i^{th}$ level control plane node may transmit a user plane MBS session deletion request to the target second user plane node. The technical solution of this embodiment is that a broken branch in the user plane MBS session transmission tree is deleted.

In some embodiments, after transmitting the user plane MBS session deletion request to the target second user plane node to which the son user plane nodes are not allocated, the $i^{th}$ level control plane node may further receive a user plane MBS session deletion response fed back by the target second user plane node. The user plane MBS session deletion response is transmitted by the target second user plane node after receiving the user plane MBS session deletion request. If the target second user plane node has joined the multicast transmission group corresponding to the first MBS IP multicast transmission address, the target second user plane node exits the multicast transmission group corresponding to the first MBS IP multicast transmission address after receiving the user plane MBS session deletion request.

In some embodiments, if the $i^{th}$ level control plane node includes at least two son control plane nodes, after receiving first MBS session start responses respectively fed back by all the son control plane nodes of the $i^{th}$ level control plane node, the $i^{th}$ level control plane node determines whether a target second user plane node to which son user plane nodes are not allocated exists, to prevent an error from occurring in the determining of whether the target second user plane node to which the son user plane nodes are not allocated exists according to the received first MBS session start responses fed back by some son control plane nodes.

In some embodiments, after receiving the first MBS session start response fed back by the son control plane node of the $i^{th}$ level control plane node, the $i^{th}$ level control plane node may determine, according to the first MBS session start response, that the second user plane node respectively transmits the MBS data to the son user plane nodes of the second user plane node in which manner.

Specifically, if the indication information in the first MBS session start response includes the first F-TEID list information, the $i^{th}$ level control plane node may transmit a user plane MBS session modification request to the second user plane node according to the identification information of the second user plane node included in the indication information, to instruct the second user plane node to respectively transmit, through peer to peer, the MBS data to son user plane nodes corresponding to the F-TEIDs included in the first F-TEID list information. In a case that the indication information further includes the first field information, the user plane MBS session modification request is further used for instructing the second user plane node to transmit the MBS data to the son user plane nodes of the second user plane node through multicast transmission simultaneously. In a case that the indication information does not include the first field information, the user plane MBS session modification request is further used for instructing the second user plane node to transmit the MBS data to the son user plane nodes of the second user plane node without using multicast transmission.

If the indication information in the first MBS session start response does not include the first F-TEID list information and the first field information, it indicates that all the son user plane nodes of the second user plane node support multicast transmission. Therefore, the second user plane node may transmit the MBS data to all the son user plane nodes of the second user plane node through multicast transmission.

In some embodiments, if the $i^{th}$ level control plane node selects at least two second user plane nodes, the $i^{th}$ level control plane node may transmit, according to indication information corresponding to each second user plane node included in the first MBS session start response fed back by the son control plane node of the $i^{th}$ level control plane node, a user plane MBS session modification request to a second user plane node to which the user plane MBS session modification request needs to be transmitted. Specifically, if it is determined, according to the first MBS session start response fed back by the son control plane node of the $i^{th}$ level control plane node, that some of son user plane nodes of a second user plane node support receiving MBS data of the second user plane node through peer to peer rather than through multicast, it indicates that the second user plane node is a second user plane node to which a user plane MBS session modification request needs to be transmitted.

In some embodiments, if the $i^{th}$ level control plane node is not the first level control plane node in the MBS session transmission tree, after receiving the first MBS session start response fed back by the son control plane node of the $i^{th}$ level control plane node, the $i^{th}$ level control plane node feeds back a second MBS session start response to a father control plane node of the $i^{th}$ level control plane node according to the first MBS session start response. The second MBS session start response fed back by the $i^{th}$ level control plane node to the father control plane node of the $i^{th}$ level control plane node includes identification information of the father user plane node of the first user plane node. Certainly, if the $i^{th}$ level control plane node includes at least two son control plane nodes, after receiving first MBS session start responses respectively fed back by all the son control plane nodes of the $i^{th}$ level control plane node, the $i^{th}$ level control plane node feeds back the second MBS session start response to the father control plane node of the $i^{th}$ level control plane node.

Similar to the first MBS session start response fed back by the son control plane node of the $i^{th}$ level control plane node, in an embodiment, the second MBS session start response fed back by the $i^{th}$ level control plane node to the father control plane node of the $i^{th}$ level control plane node includes second F-TEID list information and second field information used for indicating that multicast transmission is started. The second field information indicates that a user plane node that supports receiving the MBS data of the father user plane node of the first user plane node through multicast exists in the first user plane node, and the second F-TEID list information includes F-TEIDs of user plane nodes that support receiving the MBS data of the father user plane node of the first user plane node through peer to peer rather than through multicast in the first user plane node.

In some embodiments, in a case that the second MBS session start response fed back by the $i^{th}$ level control plane node to the father control plane node of the $i^{th}$ level control plane node does not include the second F-TEID list information and the second field information, the second MBS session start response fed back by the $i^{th}$ level control plane node to the father control plane node of the $i^{th}$ level control plane node is used for indicating that the first user plane node supports receiving the MBS data of the father user plane node of the first user plane node through multicast.

In some embodiments, in a case that the second MBS session start response fed back by the $i^{th}$ level control plane node to the father control plane node of the $i^{th}$ level control plane node includes the second F-TEID list information and does not include the second field information, the second MBS session start response fed back by the $i^{th}$ level control plane node to the father control plane node of the $i^{th}$ level control plane node is used for indicating that the first user plane node supports receiving the MBS data of the father user plane node of the first user plane node through peer to peer rather than through multicast.

In some embodiments, in a case that the second MBS session start response fed back by the $i^{th}$ level control plane node to the father control plane node of the $i^{th}$ level control plane node does not include the second F-TEID list information and includes field information indicating that multicast transmission is stopped, the second MBS session start response fed back by the level control plane node to the father control plane node of the $i^{th}$ level control plane node is used for indicating that the first user plane node is not allocated.

In FIG. 12, the communication method for a multicast broadcast service is described from the perspective of the $i^{th}$ level control plane node. The communication method for a multicast broadcast service provided in this embodiment is further described below from the perspective of the first user plane node with reference to FIG. 13.

Figure 13:
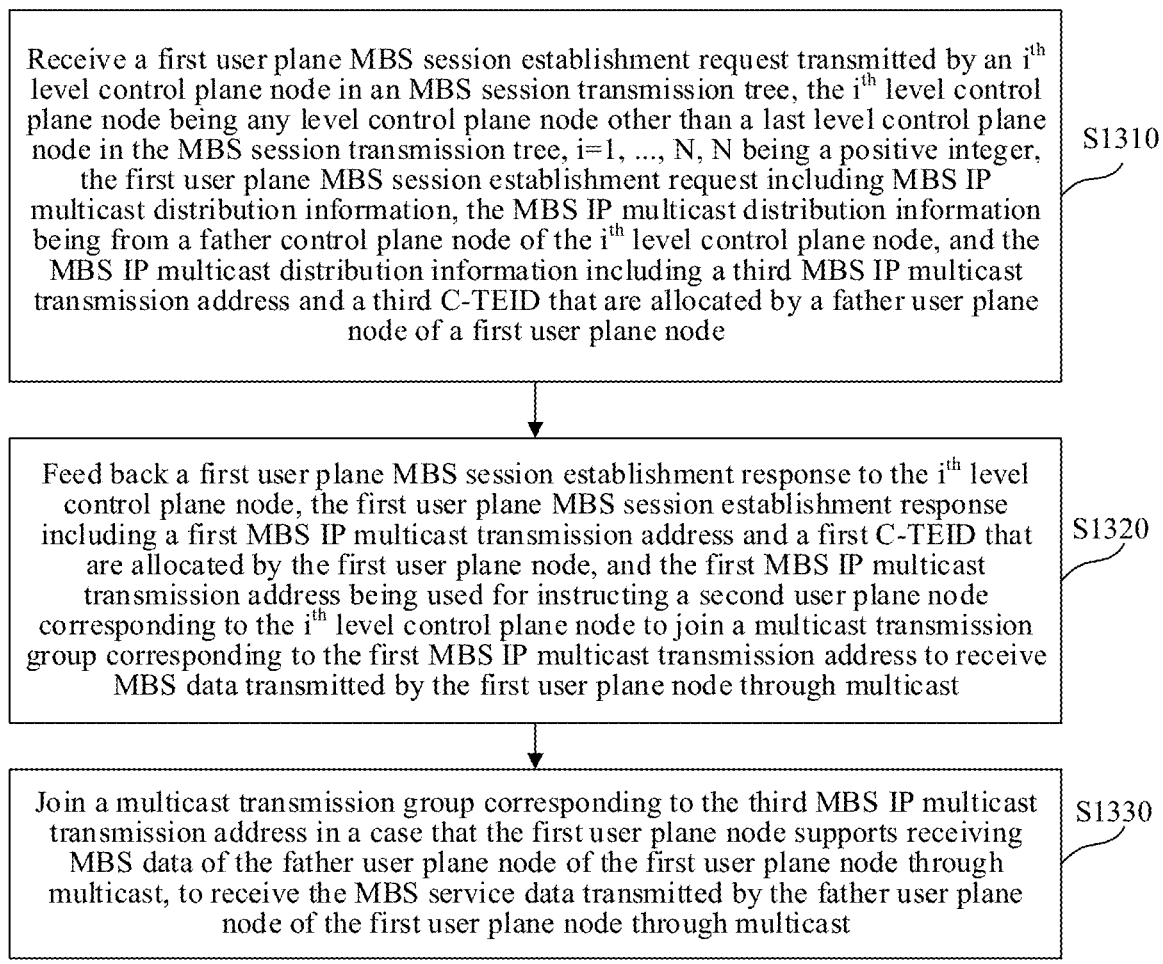
FIG. 13 is a flowchart of a communication method for a multicast broadcast service according to some embodiments.

FIG. 13 is a flowchart of a communication method for a multicast broadcast service according to some embodiments. The communication method for a multicast broadcast service may be performed by a first user plane node selected by an level control plane node such as the UPF in FIG. 10 or the MB-UPF in FIG. 11 as the user plane function entity of the PSA. The communication method for a multicast broadcast service includes at least operation S1310 to operation S1330. Detailed descriptions are as follows.

Operation S1310. Receive a first user plane MBS session establishment request transmitted by an level control plane node in an MBS session transmission tree, the $i^{th}$ level control plane node being any level control plane node other than a last level control plane node in the MBS session transmission tree, i=1, . . . , N, N being a positive integer, the first user plane MBS session establishment request including MBS IP multicast distribution information, the MBS IP multicast distribution information being from a father control plane node of the $i^{th}$ level control plane node, and the MBS IP multicast distribution information including a third MBS IP multicast transmission address and a third C-TEID that are allocated by a father user plane node of a first user plane node.

Operation S1320. Feed back a first user plane MBS session establishment response to the level control plane node, the first user plane MBS session establishment response including a first MBS IP multicast transmission address and a first C-TEID that are allocated by the first user plane node, and the first MBS IP multicast transmission address being used for instructing a second user plane node corresponding to the level control plane node to join a multicast transmission group corresponding to the first MBS IP multicast transmission address to receive MBS data transmitted by the first user plane node through multicast.

In some embodiments, the second user plane node corresponding to the level control plane node is selected by the level control plane node for the first user plane node, and different second user plane nodes are selected for different first user plane nodes. For details, reference is made to the technical solution of the foregoing embodiments.

Operation S1330. Join a multicast transmission group corresponding to the third MBS IP multicast transmission address in a case that the first user plane node supports receiving MBS data of the father user plane node of the first user plane node through multicast, to receive the MBS service data transmitted by the father user plane node of the first user plane node through multicast.

In some embodiments, if the first user plane node supports receiving, through peer to peer rather than through multicast, the MBS data transmitted by the father user plane node of the first user plane node, the first user plane node may allocate an F-TEID for receiving, through peer to peer, the MBS data transmitted by the father user plane node of the first user plane node.

In some embodiments, after feeding back the first user plane MBS session establishment response to the $i^{th}$ level control plane node, the first user plane node may further receive a user plane MBS session modification request transmitted by the $i^{th}$ level control plane node. The user plane MBS session modification request includes an F-TEID of a second user plane node that supports receiving, through peer to peer rather than through multicast, the MBS data transmitted by the first user plane node. Then, the first user plane node may transmit, through peer to peer, the MBS data based on the F-TEID of the second user plane node that supports receiving, through peer to peer rather than through multicast, the MBS data transmitted by the first user plane node to the second user plane node that supports receiving, through peer to peer rather than through multicast, the MBS data transmitted by the first user plane node and determines, according to the user plane MBS session modification request, whether to transmit the MBS data to another second user plane node through multicast transmission simultaneously.

In some embodiments, if the second user plane node supports receiving, through peer to peer rather than through multicast, the MBS data transmitted by the first user plane node, when the second user plane node establishes a user plane MBS session with the $i^{th}$ level control plane node, the second user plane node that supports receiving, through peer to peer rather than through multicast, the MBS data transmitted by the first user plane node allocates an F-TEID, and then feeds back the F-TEID to the $i^{th}$ level control plane node by using the second user plane MBS session establishment response.

In some embodiments, if the user plane MBS session modification request transmitted by the $i^{th}$ level control plane node to the first user plane node includes second field information used for indicating that multicast transmission is started, the user plane MBS session modification request is further used for indicating that the first user plane node transmits the MBS data to the second user plane node through multicast transmission simultaneously. If the user plane MBS session modification request transmitted by the $i^{th}$ level control plane node to the first user plane node does not include the second field information, the user plane MBS session modification request is further used for indicating that the first user plane node does not need to transmit the MBS data to the second user plane node through multicast transmission. For specific details, reference is made to the technical solution of the foregoing embodiments. Details are not described again.

In some embodiments, if the first user plane node receives a user plane MBS session deletion request transmitted by the $i^{th}$ level control plane node, the first user plane node transmits a user plane MBS session deletion response to the $i^{th}$ level control plane node. If the first user plane node has joined the multicast transmission group corresponding to the third MBS IP multicast transmission address allocated by the father user plane node of the first user plane node, the first user plane node exits the multicast transmission group corresponding to the third MBS IP multicast transmission address after receiving the user plane MBS session deletion request. The technical solution of this embodiment is that a broken branch in the user plane MBS session transmission tree is deleted.

In some embodiments, based on the foregoing solution, if the first user plane node receives the user plane MBS session deletion request transmitted by the $i^{th}$ level control plane node, the first user plane node transmits the user plane MBS session deletion response to the $i^{th}$ level control plane node. If the first user plane node has joined the multicast transmission group corresponding to the third MBS IP multicast transmission address, the first user plane node exits the multicast transmission group corresponding to the third MBS IP multicast transmission address after receiving the user plane MBS session deletion request. The technical solution of this embodiment is that a broken branch in the user plane MBS session transmission tree is deleted.

Additionally, in some embodiments, if the first user plane node receives a user plane MBS session establishment request transmitted by another control plane node after feeding back the first user plane MBS session establishment response to the $i^{th}$ level control plane node, the first user plane node feeds back a rejection message to the another control plane node, to indicate to the another control plane node that the user plane node has been selected. That is, one user plane node can be selected by only one control plane node as a son node of another user plane node but cannot be separately selected by a plurality of control plane nodes.

In some embodiments, if the first user plane node receives user plane MBS session establishment requests transmitted by a plurality of control plane nodes, the first user plane node feeds back a user plane MBS session establishment response to one control plane node selected from the plurality of control plane nodes and feeds back a rejection message to other control plane nodes in the plurality of control plane nodes, to indicate to the other control plane nodes that the user plane node has been selected. Similarly, one user plane node can be selected by only one control plane node as a son node of another user plane node. Therefore, if user plane MBS session establishment requests transmitted by a plurality of control plane nodes are received, only one of the plurality of control plane nodes can be selected, and a user plane MBS session establishment response is fed back to the one control plane node.

In FIG. 13, the communication method for a multicast broadcast service is described from the perspective of the first user plane node selected by the $i^{th}$ level control plane node. The communication method for a multicast broadcast service provided in some embodiments is further described below from the perspective of the second user plane node selected by the $i^{th}$ level control plane node with reference to FIG. 14.

Figure 14:
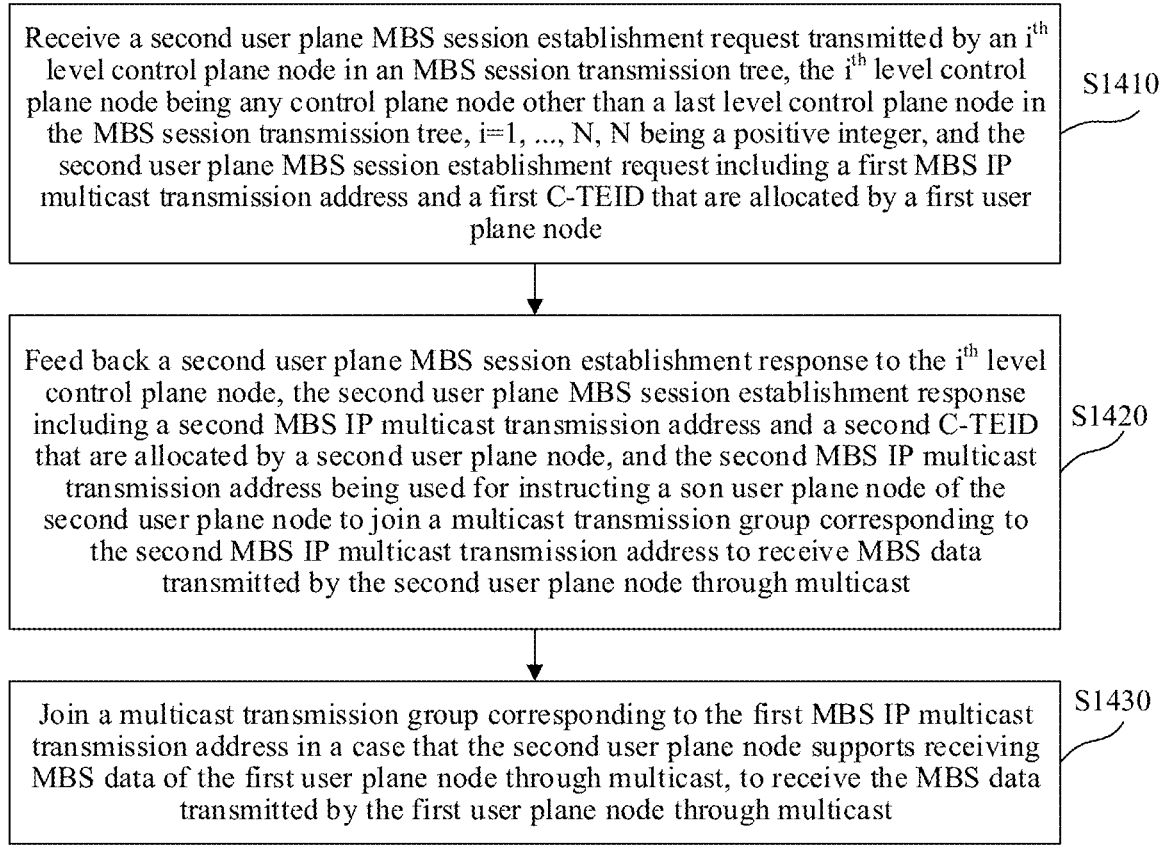
FIG. 14 is a flowchart of a communication method for a multicast broadcast service according to some embodiments.

FIG. 14 is a flowchart of a communication method for a multicast broadcast service according to some embodiments. The communication method for a multicast broadcast service may be performed by a second user plane node such as the UPF in FIG. 10 or the MB-UPF in FIG. 11 as the user plane function entity of the non-PSA selected by an $i^{th}$ level control plane node. The communication method for a multicast broadcast service includes at least operation S1410 to operation S1430. Detailed descriptions are as follows.

Operation S1410. Receive a second user plane MBS session establishment request transmitted by an $i^{th}$ level control plane node in an MBS session transmission tree, the $i^{th}$ level control plane node being any control plane node other than a last level control plane node in the MBS session transmission tree, i=1, ..., N, N being a positive integer, and the second user plane MBS session establishment request including a first MBS IP multicast transmission address and a first C-TEID that are allocated by a first user plane node.

In some embodiments, the first user plane node is selected by the $i^{th}$ level control plane node. For details, reference is made to the technical solution of the foregoing embodiments.

Operation S1420. Feed back a second user plane MBS session establishment response to the $i^{th}$ level control plane node, the second user plane MBS session establishment response including a second MBS IP multicast transmission address and a second C-TEID that are allocated by a second user plane node, and the second MBS IP multicast transmission address being used for instructing a son user plane node of the second user plane node to join a multicast transmission group corresponding to the second MBS IP multicast transmission address to receive MBS data transmitted by the second user plane node through multicast.

Operation S1430. Join a multicast transmission group corresponding to the first MBS IP multicast transmission address in a case that the second user plane node supports receiving MBS data of the first user plane node through multicast, to receive the MBS data transmitted by the first user plane node through multicast.

In some embodiments, if the second user plane node supports receiving, through peer to peer rather than multicast, the MBS data transmitted by the first user plane node, the second user plane node may allocate an F-TEID for receiving, through peer to peer, the MBS data transmitted by the first user plane node.

In some embodiments, after feeding back the second user plane MBS session establishment response to the $i^{th}$ level control plane node, the second user plane node may further receive a user plane MBS session modification request transmitted by the $i^{th}$ level control plane node. The user plane MBS session modification request includes first F-TEID list information. The first F-TEID list information includes F-TEIDs of son user plane nodes that support receiving, through peer to peer rather than multicast, the MBS data transmitted by the second user plane node. Subsequently, the second user plane node may respectively transmit, based on the first F-TEID list information through peer to peer, the MBS data to the son user plane nodes corresponding to the F-TEIDs included in the first F-TEID list information and determine, according to the user plane MBS session modification request, whether to transmit the MBS data to the son user plane node of the second user plane node through multicast transmission simultaneously.

In some embodiments, if the son user plane node of the second user plane node supports receiving, through peer to peer rather than multicast, the MBS data transmitted by the second user plane node, when son user plane node of the second user plane node establishes a user plane MBS session with a son control plane node of the $i^{th}$ level control plane node, the son user plane node that supports receiving, through peer to peer rather than multicast, the MBS data transmitted by the second user plane node allocates an F-TEID, and then feeds back the F-TEID to the son control plane node of the $i^{th}$ level control plane node.

In some embodiments, if the user plane MBS session modification request transmitted by the $i^{th}$ level control plane node to the second user plane node includes first field information used for indicating that multicast transmission is started, the user plane MBS session modification request is further used for indicating that the second user plane node transmits the MBS data to the son user plane node of the second user plane node through multicast transmission simultaneously. If the user plane MBS session modification request transmitted by the $i^{th}$ level control plane node to the second user plane node does not include the first field information, the user plane MBS session modification request is further used for indicating that the second user plane node does not need to transmit the MBS data to the son user plane node of the second user plane node through multicast transmission. For specific details, reference is made to the technical solution of the foregoing embodiments. Details are not described again.

In some embodiments, if the second user plane node receives a user plane MBS session deletion request transmitted by the $i^{th}$ level control plane node, the second user plane node transmits a user plane MBS session deletion response to the $i^{th}$ level control plane node. If the second user plane node has joined the multicast transmission group corresponding to the first MBS IP multicast transmission address, the second user plane node exits the multicast transmission group corresponding to the first MBS IP multicast transmission address after receiving the user plane MBS session deletion request. The technical solution of this embodiment is that a broken branch in the user plane MBS session transmission tree is deleted.

In some embodiments, if the second user plane node receives a user plane MBS session establishment request transmitted by another control plane node after feeding back the second user plane MBS session establishment response to the $i^{th}$ level control plane node, the second user plane node feeds back a rejection message to the another control plane node, to indicate to the another control plane node that the user plane node has been selected. That is, one user plane node can be selected by only one control plane node as a son node of another user plane node but cannot be separately selected by a plurality of control plane nodes.

In some embodiments, if the second user plane node receives user plane MBS session establishment requests transmitted by a plurality of control plane nodes, the second user plane node feeds back a user plane MBS session establishment response to one control plane node selected from the plurality of control plane nodes and feeds back a rejection message to other control plane nodes in the plurality of control plane nodes, to indicate to the other control plane nodes that the user plane node has been selected. Similarly, one user plane node can be selected by only one control plane node as a son node of another user plane node. Therefore, if user plane MBS session establishment requests transmitted by a plurality of control plane nodes are received, only one of the plurality of control plane nodes can be selected, and a user plane MBS session establishment response is fed back to the one control plane node.

The technical solutions of the embodiments have been described above from the perspectives of the $i^{th}$ level control plane node and the first user plane node and the second user plane node that are selected by the $i^{th}$ level control plane node respectively. The implementation details of the technical solution of the embodiments will be described in detail below from the perspective of interaction between entities.

In some embodiments, an MBS session transmission tree of 5G needs to ensure that there can be only one father user plane node of each user plane, but because the user plane is controlled by a control plane, there is not only one father control plane node of the control plane. In this case, son control plane nodes may respectively provide one or more different son user plane nodes to different father control plane nodes, that is, even though a same father control plane node corresponds to different father user plane nodes, son user plane node of the father user plane node are independent of each other.

If a plurality of son user plane nodes are allocated to one father control plane node, some son user plane nodes of the plurality of son user plane nodes support receiving data transmitted through multicast, and some other son user plane nodes do not support receiving the data transmitted through multicast but support receiving the MBS data through peer to peer. Therefore, the son user plane nodes that do not support receiving the data transmitted through multicast may allocate IP address+TEID (which is represented by F-TEID), to transmit the MBS data to the son user plane node through peer to peer.

Figure 15:
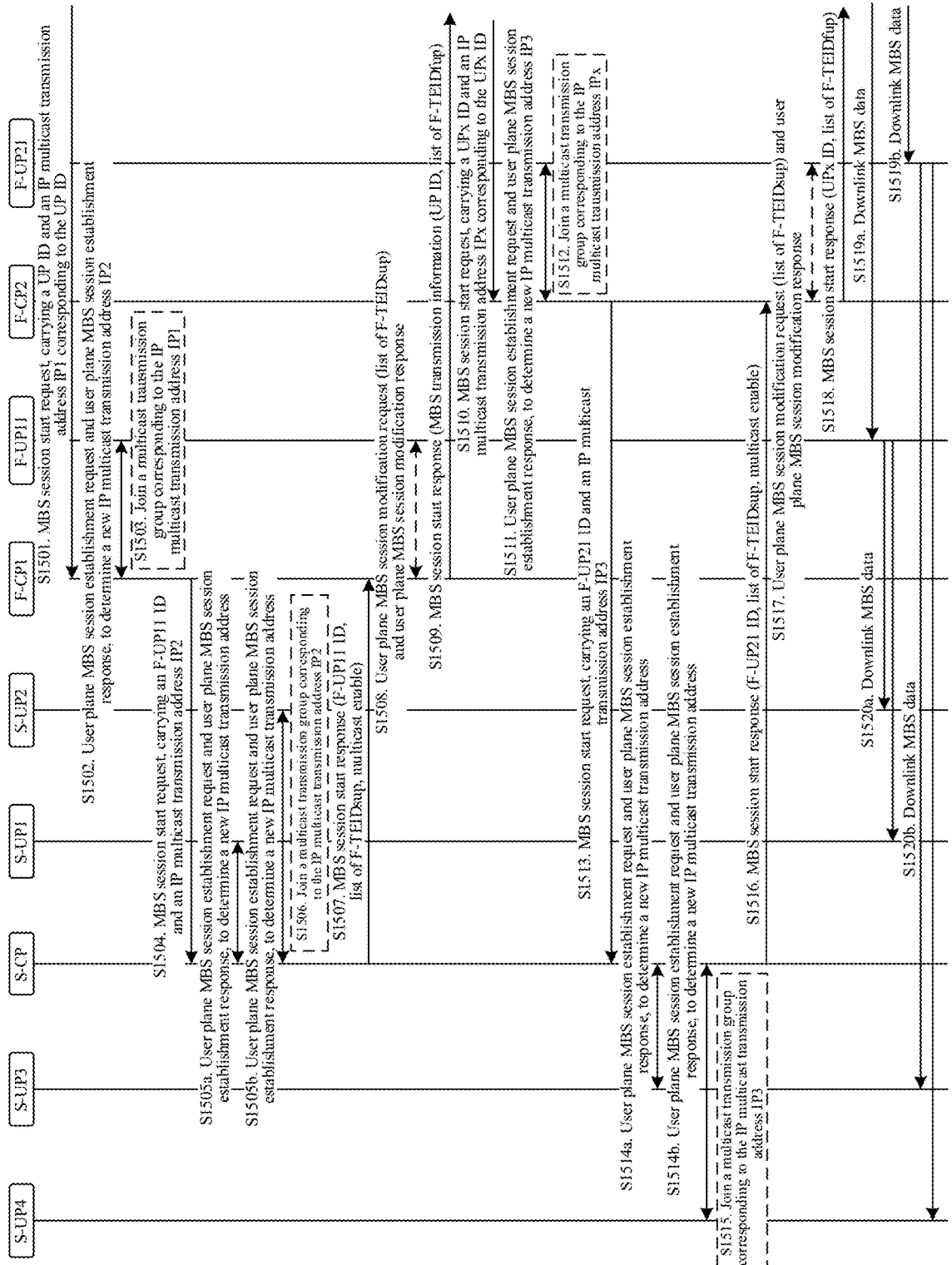
FIG. 15 is a flowchart of an MBS communication method in which a control plane is separated from a user plane according to some embodiments.

FIG. 15 shows an MBS communication method in which a control plane is separated from a user plane according to some embodiments. In the following content, F-CP represents a father-control plane, S-CP represents a son-control plane, F-UP represents a father-user plane, and S-UP represents a son-user plane.

The method shown in FIG. 15 includes the following operations.

Operation S1501. An F-CP1 receives an MBS session start request (that is, Nfcp_MBSSessionStart Request) transmitted by a father control plane node of the F-CP1, the MBS session start request including a temporary mobile group identity (TMGI), an MBS session duration, MBS QoS flow identifiers (QFIs), a QoS profile, a UP ID (the UP ID is an identifier of a user plane node having a same level as the father control plane node of the F-CP1), an MBS IP multicast distribution (MBS IP multicast distribution information), an MBS time to data transfer, and an MBS service area.

The TMGI represents a multicast or broadcast temporary group identity. The MBS session duration represents a time length of a current MBS session. The MBS time to data transfer represents a time when MBS data starts to be transmitted. The QoS profile includes a 5G QoS identifier (5QI), a maximum flow bit rate (MFBR), a guaranteed flow bit rate (GFBR), an allocation and retention priority (ARP), and the like. The MBS IP multicast distribution includes an IP multicast transmission address (the IP multicast transmission address is an IP multicast transmission address and a C-TEID that are allocated by a user plane node (that is, the user plane node identified by the UP ID) having a same level as the father control plane node of the F-CP1, and for ease of distinguishing, the IP multicast transmission address is denoted as IP1) (for simplification, father control plane nodes of the F-CP1 and an F-CP2 are not drawn in FIG. 15, and father user plane nodes of an F-UP11 and an F-UP21 are not drawn similarly). The MBS service area is a service area when the MBS is a broadcast service.

Operation S1502. The F-CP1 determines, according to information about a son control plane node of the F-CP1, that one or more F-UPFs are selected from a plurality of F-UPFs as user plane nodes having same levels as the F-CP1. In this embodiment, it is assumed that one user plane node (which is denoted as F-UP11) having a same level as the F-CP1 is selected, the F-CP1 transmits a user plane MBS session establishment request (that is, N4 MBSSessionEstablishment Request) to the F-UP11, and the F-UP11 feeds back a user plane MBS session establishment response (that is, N4 MBSSessionEstablishment Response) to the F-CP1.

In some embodiments, for an MBS multicast service, the information about the son control plane node of the F-CP1 is formed by MBS UE contexts. For an MBS broadcast service, the information about the son control plane node of the F-CP1 is provided by the father control plane node of the F-CP1 or configured by a network according to the service area. The information about the son control plane node of the F-CP1 includes a quantity of son-control plane nodes of the F-CP1 and position information thereof.

In some embodiments, the user plane MBS session establishment request transmitted by the F-CP1 to the selected F-UP11 may include a packet detection rule (PDR), a QoS enforcement rule (QER), a forwarding action rule (FAR), an MBS IP multicast distribution, an indication of allocate new MBS IP multicast distribution information for downlink node, and an indication of requesting to allocate an F-TEID. The user plane MBS session establishment response fed back by the F-UP11 includes the allocate MBS IP multicast distribution for downlink node and the F-TEID.

The PDR in the user plane MBS session establishment request includes one or more MBS IP multicast addresses+UDP ports to indicate one or more different MBS QoS flows. The QER includes the MFBR, the GFBR, and a downlink (DL) flow level marking that correspond to the PDR. The MBS IP multicast distribution is an MBS IP multicast distribution corresponding to the TMGI and is from the MBS session start request transmitted by the father control plane node of the F-CP1 and received by the F-CP1, and the MBS IP multicast transmission address included in the MBS IP multicast distribution is IP1.

The indication of allocate new MBS IP multicast distribution for downlink node in the user plane MBS session establishment request is used for indicating that a son user plane node exists in the F-UP11. Therefore, the F-UP11 needs to allocate a new MBS IP multicast distribution. The allocate MBS IP multicast distribution for downlink node in the user plane MBS session establishment response includes the new MBS IP multicast distribution allocated by the F-UP11, and the new MBS IP multicast distribution includes a new IP multicast transmission address (for ease of distinguishing, the new IP multicast transmission address is denoted as IP2) and a C-TEID.

The MBS IP multicast distribution is allocated by each father user plane node to all son user plane nodes of the each father user plane node. Different father user plane nodes allocate different MBS IP multicast distributions.

In addition, according to a network configuration, if the F-UP11 does not support receiving MBS data transmitted through multicast but supports receiving the MBS data through peer to peer, the user plane MBS session establishment request transmitted by the F-CP1 includes the indication of requesting to allocate an F-TEID, for requesting the F-UP11 to allocate an F-TEID for receiving, through peer to peer, MBS data transmitted by a father user plane node of the F-UP11. After the F-UP11 allocates the F-TEID, the user plane MBS session establishment response carries the allocated F-TEID.

If the user plane MBS session establishment request does not include the indication of requesting to allocate an F-TEID, that is, the F-CP1 does not make a decision, but the user plane node F-UP11 does not support receiving data transmitted through multicast, the F-UP11 also needs to allocate an F-TEID, and the user plane MBS session establishment response carries the allocated F-TEID.

Operation S1503. An F-UP 11 applies to join a multicast transmission group corresponding to an IP multicast transmission address IP1 in a case that the F-UP11 supports receiving data transmitted through multicast, to receive MBS data transmitted by a father user plane node of the F-UP11.

Operation S1504. The F-CP1 transmits the MBS session start request (that is, Nscp_MBSSessionStart Request) to each son control plane node according to the information about the son control plane node of the F-CP1, that is, operation S1504 to operation S1508 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: the TMGI, the MBS session duration, the MBS QFIs, the QoS profile, the F-UP11 ID, the MBS IP multicast distribution, the MBS time to data transfer, and the MBS service area. The MBS IP multicast distribution in the MBS session start request transmitted by the F-CP1 is allocated in operation S1502, and an IP multicast transmission address included in the MBS IP multicast distribution is IP2.

After the S-CP receives the MBS session start request transmitted by the F-CP1, similar to operation S1502, the S-CP selects one or more S-UPs of the F-UP11 from a plurality of S-UPs according to information about a son control plane node of the S-CP. In this embodiment, it is assumed that an S-UP1 and an S-UP2 are selected. Then, operation S1505a and operation S1505b are respectively performed.

Operation S1505a. The S-CP transmits a user plane MBS session establishment request to the selected S-UP1, and the S-UP1 feeds back a user plane MBS session establishment response to the S-CP.

In some embodiments, the user plane MBS session establishment request transmitted by the S-CP may also include a PDR, a QER, an FAR, an MBS IP multicast distribution, an F-UP11 ID, an indication of allocate new MBS IP multicast distribution for downlink node, an indication of requesting to allocate an F-TEID, and the like. The user plane MBS session establishment response fed back by the S-UP1 includes the allocate MBS IP multicast distribution for downlink node and the F-TEID.

The MBS IP multicast distribution in the user plane MBS session establishment request transmitted by the S-CP is from the MBS session start request received in operation S1504, and an IP multicast transmission address included in the MBS IP multicast distribution is IP2. The indication of allocate new MBS IP multicast distribution for downlink node in the user plane MBS session establishment request transmitted by the S-CP to the S-UP1 is used for instructing the S-UP1 to allocate a new MBS IP multicast distribution for transmitting the MBS data to a son user plane node of the S-UP1 through multicast transmission. For a specific allocation process of the S-UP1, reference is made to the description in operation S1502. Similarly, if the S-UP1 does not support multicast transmission, an F-TEID may be allocated by the S-UP1.

Operation S1505b. The S-CP transmits a user plane MBS session establishment request to the selected S-UP2, and the S-UP2 feeds back a user plane MBS session establishment response to the S-CP. A specific process is similar to operation S1505a. Details are not described again.

Operation S1506. The S-UP1 and the S-UP2 respectively join a multicast transmission group corresponding to an IP multicast transmission address (that is, an IP2) allocated by the F-UP11 in a case that the S-UP1 and the S-UP2 support receiving the data transmitted through multicast, to receive the MBS data transmitted by the F-UP11.

Operation S1507. The S-CP transmits an MBS session start response (that is, Nscp_MBSSessionStart Response) to the F-CP1, the MBS session start response including an F-UP11 ID.

If there is an S-UP that does not support receiving the data transmitted through multicast in the S-UP1 or the S-UP2, the MBS session start response transmitted by the S-CP to the F-CP1 includes a list of F-TEID (because the list of F-TEID is for the son user plane node, the list of F-TEID is denoted as a list of F-TEIDsup for ease of distinguishing), which corresponds to the F-UP11. The list of F-TEIDsup includes an F-TEID allocated to the S-UP that supports receiving MBS data through peer to peer rather than through multicast transmission in the S-UP1 and the S-UP2. If some S-UPs in the S-UP1 and the S-UP2 support the multicast transmission, it is necessary to include multicast enable in the MBS session start response to indicate that F-UP11 needs to use both multicast transmission and peer-to-peer transmission technologies to transmit MBS data to the son user plane node of F-UP11.

Specifically, if the MBS session start response transmitted by the S-CP to the F-CP1 does not include the list of F-TEIDsup, it indicates that all son user plane nodes selected by the S-CP support receiving the data transmitted through multicast. Therefore, the MBS session start response does not need to carry the identifier of multicast enable.

If the MBS session start response transmitted by the S-CP to the F-CP1 includes the list of F-TEIDsup, but does not include the identifier of multicast enable, it indicates that all son user plane nodes selected by the S-CP do not support receiving data transmitted through multicast, but support receiving the MBS data transmitted through peer to peer.

If the MBS session start response transmitted by the S-CP to the F-CP1 does not include the list of F-TEIDsup, and multicast enable is set to disable, it indicates that the son control plane node S-CP does not allocate a corresponding son user plane node to the F-UP11 (one possible reason is that son user plane nodes to be selected have been allocated to father user plane nodes, in this case, the son user plane nodes cannot be selected). In this case, the son control plane node S-CP may also return a failure code by using the MBS session start response for an indication.

If only one son user plane node of the sub user plane nodes selected by the S-CP does not support receiving data transmitted through multicast, the MBS session start response transmitted by the S-CP to the F-CP1 may not include the list of F-TEIDsup, but includes only the F-TEID allocated to the son user plane node.

Operation S1508. If the MBS session start response in operation S1507 includes an F-UP11 ID and an F-TEID parameter (for example, an F-TEID allocated to an S-UP or a list of F-TEIDsup corresponding to some S-UPs), the F-CP1 transmits a user plane MBS session modification request (that is, N4 MBSSessionModification Request) to the F-UP11, and the F-UP11 feeds back a user plane MBS session modification response to the F-CP1. The user plane MBS session modification request includes the list of F-TEIDsup corresponding to the S-UPs that support receiving the MBS data through peer to peer rather than through multicast transmission, to instruct the F-UP11 to respectively transmit, through peer to peer, the MBS service data to the S-UPs that support receiving the MBS data through peer to peer rather than through multicast transmission. If the MBS session start response in operation S1507 does not include an indication of multicast enable, it indicates that the F-UP11 no longer uses the multicast transmission manner. If the MBS session start response in operation S1507 includes the indication of multicast enable, it indicates that the F-UP11 uses both the multicast transmission manner and peer-to-peer transmission manner.

If the MBS session start response in operation S1507 includes only one F-TEID, and the F-UP11 does not learn a specific quantity of son user plane nodes of the F-UP11, the F-UP11 may transmit MBS data to an S-UP corresponding to the F-TEID only through peer to peer. The F-UP11 may simultaneously transmit the MBS data to other S-UPs by using the multicast transmission address (that is, the IP2) according to the user plane MBS session modification request in operation S1508.

If the MBS session start response in operation S1507 does not include the F-TEID, and multicast enable is not set to disable, it indicates that the F-UP11 continues to use the multicast transmission manner. In this case, operation S1508 does not need to be performed.

Operation S1509. After operation S1504 to operation S1508 are performed for each son control plane node, the F-CP1 transmits an MBS session start response (that is, Nfcp_MBSSessionStart Response) to the father control plane node of the F-CP1 according to MBS session start responses fed back by all the son control plane nodes.

Similar to operation S1507, the MBS session start response replied by the F-CP1 to the father control plane node of the F-CP1 includes a UP ID (the UP ID is an identifier of a user plane node having a same level as the father control plane node of the F-CP1), and may also include a list of F-TEID (which is denoted as a list of F-TEIDfup for ease of distinguishing). Because the F-CP1 selects only a same-level user plane node F-UP11, if the MBS session start response replied by the F-CP1 to the father control plane node of the F-CP1 includes the list of F-TEIDfup, the list of F-TEIDfup includes only an F-TEID allocated by the F-UP11.

Because the F-CP1 selects only the same-level user plane node F-UP11 in this embodiment, if the MBS session start response replied by the F-CP1 to the father control plane node of the F-CP1 does not include the F-TEID allocated by the F-UP11, in this case, it indicates that the F-UP11 supports receiving the data transmitted through multicast. In this case, the MBS session start response replied by the F-CP1 to the father control plane node of the F-CP1 does not need to include multicast enable. If the MBS session start response replied by the F-CP1 to the father control plane node of the F-CP1 includes the F-TEID allocated by the F-UP11, it indicates that the F-UP11 does not support receiving the data transmitted through multicast. In this case, because the F-CP1 has only one same-level user plane node F-UP11, the MBS session start response replied by the F-CP1 to the father control plane node of the F-CP1 does not need to include multicast enable.

Operation S1501 to operation S1509 are a processing process after the MBS session start request transmitted by the father control plane node of the F-C 1 is received by the F-CP1. In the processing process, the F-CP1 selects a same-level user plane node F-UP11, and the son control plane node S-CP of the F-CP1 selects two son user plane nodes S-UP1 and S-UP2 that have same levels as the S-CP.

Continuing to refer to FIG. 15, the method further includes the following operations.

Operation S1510. An F-CP2 receives an MBS session start request transmitted by a father control plane node of the F-CP2, the MBS session start request including a TMGI, an MBS session duration, MBS QFIs, a QoS profile, a UPx ID, an MBS IP multicast distribution, an MBS time to data transfer, and an MBS service area. For specific meanings of the parameters, reference is made to the descriptions in operation S1501. For ease of distinguishing, an IP multicast transmission address included in the MBS IP multicast distribution in the MBS session start request received by the F-CP2 may be denoted as IPx.

Operation S1511. The F-CP2 determines, according to information about a son control plane node of the F-CP2, that one or more F-UPFs are selected from a plurality of F-UPFs as user plane nodes having same levels as the F-CP2. In this embodiment, it is assumed that only one user plane node F-UP21 having a same level as the F-CP2 is selected, then the F-CP2 transmits a user plane MBS session establishment request to the F-UP21, and the F-UP21 feeds back a user plane MBS session establishment response to the F-CP2.

For a detailed description, reference is made to the related content in operation S1502. Similar to operation S1502, the F-CP2 interacts with the F-UP21 by using the user plane MBS session establishment request and the user plane MBS session establishment response, and the F-UP21 allocates a new IP multicast transmission address (which is denoted as IP3 for ease of distinguishing).

In addition, similarly, if the F-UP21 does not support receiving data transmitted through multicast, the F-UP21 allocates an F-TEID used for receiving the MBS data through peer to peer, and carries the allocated F-TEID in the user plane MBS session establishment response.

Operation S1512. An F-UP21 applies to join a multicast transmission group corresponding to an IP multicast transmission address IPx in a case that the F-UP21 supports receiving data transmitted through multicast, to receive MBS data transmitted by a father user plane node of the F-UP21.

Operation S1513. The F-CP2 transmits the MBS session start request to each son control plane node according to the information about the son control plane node of the F-CP2, that is, operation S1513 to operation S1517 are performed separately for each son control plane node. In this embodiment, a description is made by using an example in which the MBS session start request is transmitted to one son control plane node S-CP.

Similarly, the MBS session start request transmitted by the F-CP2 to the son control plane node S-CP of the F-CP2 also includes an MBS IP multicast distribution. The MBS IP multicast distribution is allocated in operation S1511, and a corresponding user plane node identifier is an F-UP21 ID, and an IP multicast transmission address included in the MBS IP multicast distribution is IP3.

There is no sequential relationship between operation S1513 and operation S1504, which may be operations performed in parallel by the F-CP2 and the F-CP1 respectively.

After the S-CP receives the MBS session start request transmitted by the F-CP2, similar to the foregoing operation, the S-CP selects one or more S-UPs for the F-UP21 from a plurality of S-UPs according to information about a son control plane node of the S-CP. In this embodiment, it is assumed that an S-UP3 and an S-UP4 are selected, and then operation S1514a and operation S1514b are performed respectively.

The S-UPs selected by the S-CP for the F-UP21 are different from the S-UPs selected by the S-CP for the F-UP11. In other words, in this embodiment, there may be a plurality of father control plane nodes for one son control plane node in a control plane. For example, a son control plane node S-CP has two father control plane nodes F-CP1 and F-CP2, but one son user plane node is not allowed to have a plurality of father user plane nodes. In this way, when one son user plane node already has one father user plane node, the son user plane node cannot participate in selection of a son user plane node. Therefore, the S-CP can select only the S-UP3 and the S-UP4 for the F-UP21, and the S-UP1 and the S-UP2 have been selected as son user plane nodes of the F-UP11. Therefore, the S-CP cannot select the S-UP1 and the S-UP2 as son user plane nodes of the F-UP21.

Operation S1514a. The S-CP transmits a user plane MBS session establishment request to the selected S-UP3, and the S-UP3 feeds back a user plane MBS session establishment response to the S-CP. Operation S1514b. The S-CP transmits a user plane MBS session establishment request to the selected S-UP4, and the S-UP4 feeds back a user plane MBS session establishment response to the S-CP. A specific process is similar to operation S1505a. Details are not described again.

Operation S1515. The S-UP3 and the S-UP4 respectively join a multicast transmission group corresponding to an IP multicast transmission address (that is, IP3) allocated by the F-UP21 in a case that the S-UP3 and the S-UP4 support receiving the data transmitted through multicast, to receive the MBS data transmitted by the F-UP21.

Operation S1516. The S-CP transmits an MBS session start response to the F-CP2, the MBS Session start response including an F-UP21 ID. A detailed description of the operation is similar to operation S1507, and details are not described herein again.

Operation S1517. The F-CP2 transmits a user plane MBS session modification request to the F-UP21, and the F-UP21 feeds back a user plane MBS session modification response to the F-CP2. A detailed description of the operation is similar to operation S1508, and details are not described herein again.

Operation S1518. After operation S1513 to operation S1517 are performed for each son control plane node, the F-CP2 transmits an MBS session start response to the father control plane node of the F-CP2 according to MBS session start responses fed back by all the son control plane nodes. A detailed description of the operation is similar to operation S1509, and details are not described herein again.

Operation S1510 to operation S1518 are a processing process after the MBS session start request transmitted by the father control plane node of the F-CP2 is received by the F-CP2. In the processing process, the F-CP2 selects a same-level user plane node F-UP21, and the son control plane node S-CP of the F-CP2 selects two son user plane nodes S-UP3 and S-UP4 that have same levels as the S-CP.

It can be learned from operation S1501 to operation S1518 that in the embodiments, the son control plane node S-CP has a plurality of father control plane nodes F-CP1 and F-CP2, and the son user plane node S-UP controlled by the S-CP has only one father user plane node.

In addition, the message in operation S1501 and the message in operation S1510 may be transmitted in parallel, and therefore, operations S1501 to S1509 and operations S1510 to S1518 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by taking two control plane nodes as an example), the user plane node may normally respond to the user plane MBS session establishment request transmitted by one of the control plane nodes in a user plane MBS session establishment response, and reject the other control plane node in another user plane MBS session establishment response, to indicate that the user plane node has been selected. If one user plane node already has a father user plane node by using one control plane node and then receives a user plane MBS session establishment request transmitted by another control plane node, the user plane node rejects the other control plane node in another user plane MBS session establishment response, to indicate that the user plane node has been selected.

After this MBS session transmission tree is established, the following operations may be performed.

Operation S1519a. The F-UP11 receives downlink MBS data transmitted by the father user plane node of the F-UP11. Subsequently, the received downlink MBS data is transmitted to the S-UP1 and the S-UP2 in operation S1520a.

For each user plane node having a father user plane node, MBS data needs to be received in a multicast transmission manner or a peer-to-peer transmission manner determined in the foregoing operations. For example, for the S-UP1 and the S-UP2, if it is determined that only the multicast transmission manner is adopted, the S-UP1 and the S-UP2 receive, in the multicast transmission manner, the MBS data transmitted by the F-UP11. If it is determined that only the peer-to-peer transmission manner is adopted, the S-UP1 and the S-UP2 respectively receive, in the peer-to-peer transmission manner, the MBS data transmitted by the F-UP11.

For each user plane node having son user plane nodes, MBS data needs to be transmitted to each son user plane node in a multicast transmission manner or a peer-to-peer transmission manner in the foregoing operations. For example, for the F-UP11, if it is determined that only the multicast transmission manner is adopted, the F-UP11 transmits the MBS data to all son user plane nodes (that is, the S-UP1 and the S-UP2 in this embodiment) of the F-UP11 in the multicast transmission manner. If it is determined that only the peer-to-peer transmission manner is adopted, the F-UP11 transmits the MBS data to each son user plane node (that is, the S-UP1 and the S-UP2 in this embodiment) of the F-UP11 in the peer-to-peer transmission manner.

Operation S1519b. The F-UP21 receives downlink MBS data transmitted by the father user plane node of the F-UP21. Subsequently, the received downlink MBS data is transmitted to the S-UP3 and the S-UP4 in operation S1520b. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

In the example embodiment shown in FIG. 15, the MBS session start request transmitted by the father control plane node to the son control plane node includes information about only one father user plane node. In some embodiments, that the MBS session start request transmitted by the father control plane node to the son control plane node may include information about a plurality of father user plane nodes is described with reference to FIG. 16.

Figure 16:
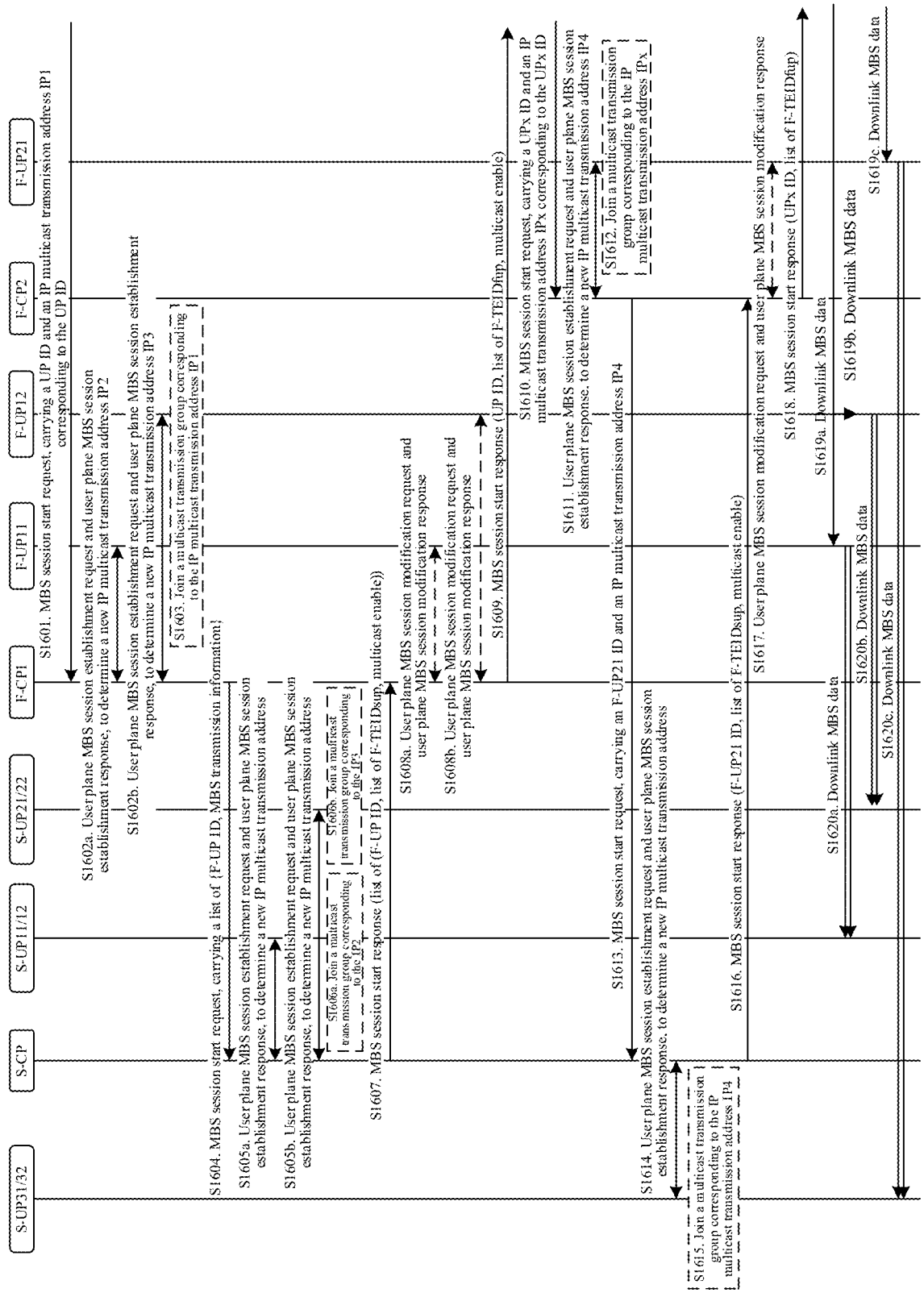
FIG. 16 is a flowchart of an MBS communication method in which a control plane is separated from a user plane according to some embodiments.

FIG. 16 shows an MBS communication method in which a control plane is separated from a user plane according to some embodiments. Similarly, in the following content, F-CP represents a father-control plane, S-CP represents a son-control plane, F-UP represents a father-user plane, and S-UP represents a son-user plane.

The method shown in FIG. 16 includes the following operations.

Operation S1601. An F-CP1 receives an MBS session start request transmitted by a father control plane node of the F-CP1. A specific process is similar to operation S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected and denoted as an F-UP11 and an F-UP12. Then, operation S1602a and operation S1602b are respectively performed.

Operation S1602a. The F-CP1 transmits a user plane MBS session establishment request to an F-UP11, and the F-UP11 feeds back a user plane MBS session establishment response to the F-CP1. The process is similar to the process of operation S1502 in the foregoing embodiment, and details are not described again. An IP multicast transmission address allocated by the F-UP11 in operation S1602a is denoted as IP2.

Operation S1602b. The F-CP1 transmits a user plane MBS session establishment request to an F-UP12, and the F-UP12 feeds back a user plane MBS session establishment response to the F-CP1. The process is similar to the process of operation S1502 in the foregoing embodiment, and details are not described again. An IP multicast transmission address allocated by the F-UP12 in operation S1602b is denoted as IP3.

Operation S1603. The F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

Operation S1604. The F-CP1 transmits the MBS session start request to each son control plane node according to the information about the son control plane node of the F-CP1, that is, operation S1604 to operation S1608 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: a TMGI, an MBS session duration, MBS QFIs, a QoS profile, an MBS time to data transfer, a list of {F-UP ID, MBS transmission information}, and an MBS service area. The MBS transmission information is an MBS IP multicast distribution (IP multicast transmission address, C-TEID). In this embodiment, because the F-CP1 selects two user plane nodes F-UP11 and F-UP12 that have same levels as the F-CP1, the list of {F-UP ID, MBS transmission information} includes an F-UP11 ID, an MBS IP multicast distribution corresponding to the F-UP11 ID, an F-UP12 ID, and an MBS IP multicast distribution corresponding to the F-UP12 ID. The MBS IP multicast distribution corresponding to the F-UP11 ID is allocated by the F-UP11, and the IP multicast transmission address included in the MBS IP multicast distribution is IP2. The MBS IP multicast distribution corresponding to the F-UP12 ID is allocated by the F-UP12, and the IP multicast transmission address included in the MBS IP multicast distribution is IP3.

The IP multicast transmission address IP3 allocated by the F-UP12 cannot be the same as the IP multicast transmission address IP2 allocated by the F-UP11, but the allocated C-TEIDs may be the same.

After receiving the MBS session start request transmitted by the F-CP1, similar to operation S1502, the S-CP selects one or more S-UPs for the F-UP11 from a plurality of S-UPs according to information about a son control plane node of the S-CP, and selects one or more S-UPs for the F-UP12. In this embodiment, it is assumed that an S-UP11 and an S-UP 12 are selected for the F-UP11, and an S-UP21 and an S-UP22 are selected for the F-UP12, that is, different son user plane nodes are selected for the F-UP11 and the F-UP12. Then, operation S1605a and operation S1605b are respectively performed.

Operation S1605a. The S-CP respectively transmits user plane MBS session establishment requests to the selected S-UP11 and S-UP12, the user plane MBS session establishment request including the IP multicast transmission address IP2 allocated by the F-UP11, and the S-UP11 and the S-UP12 respectively feed back user plane MBS session establishment responses to the S-CP (for saving layout, the S-UP11 and the S-UP12 are drawn together in FIG. 16). A specific process is similar to operation S1505a. Details are not described again.

Operation S1605b. The S-CP respectively transmits user plane MBS session establishment requests to the selected S-UP21 and S-UP22, the user plane MBS session establishment request including the IP multicast transmission address IP3 allocated by the F-UP12, and the S-UP21 and the S-UP22 respectively feed back user plane MBS session establishment responses to the S-CP (for saving layout, the S-UP21 and the S-UP22 are drawn together in FIG. 16). A specific process is similar to operation S1505a. Details are not described again.

Operation S1606a. The 5-UP11 and the 5-UP12 respectively join a multicast transmission group corresponding to the IP multicast transmission address (that is, the IP2) allocated by the F-UP11 in a case that the 5-UP11 and the 5-UP12 support receiving the data transmitted through multicast, to receive the MBS data transmitted by the F-UP11.

Operation S1606b. The S-UP21 and the S-UP22 respectively join a multicast transmission group corresponding to the IP multicast transmission address (that is, the IP3) allocated by the F-UP12 in a case that the S-UP21 and the S-UP22 support receiving the data transmitted through multicast, to receive the MBS data transmitted by the F-UP12.

Operation S1607. The S-CP transmits an MBS session start response to the F-CP1. If an S-UP does not support receiving the data transmitted through multicast, the MBS session start response includes an F-TEID allocated by the S-UP, and the F-TEID corresponds to the F-UP, to form a list of {F-UP ID, list of F-TEIDsup, multicast enable}. In this embodiment, the list of {F-UP ID, list of F-TEIDsup, multicast enable} includes the list of F-TEIDsup and the multicast enable for the F-UP11 and the list of F-TEIDsup and the multicast enable for the F-UP12.

Similar to operation S1507, because some S-UPs support receiving the data transmitted through multicast, and some other S-UPs do not support receiving the data transmitted through multicast, the list of F-TEIDsup corresponds to only the S-UPs that support receiving MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of operation S1507.

In addition, when the S-CP determines not to allocate any son user plane node to an/some F-UP IDs, multicast enable corresponding to this/these F-UP IDs may be set to Disable. Certainly, a failed list of {F-UP} may alternatively be used in the MBS session start response to indicate a father user plane node to which a son user plane node is not allocated.

Operation S1608a. The F-CP1 transmits a user plane MBS session modification request to the F-UP11 according to the list of {F-UP ID, list of F-TEIDsup, multicast enable} included in the MBS session start response, and the F-UP11 feeds back a user plane MBS session modification response to the F-CP1. A detailed description of the operation is similar to operation S1508, and details are not described herein again.

Operation S1608b. The F-CP1 transmits a user plane MBS session modification request to the F-UP12 according to the list of {F-UP ID, list of F-TEIDsup, multicast enable} included in the MBS session start response, and the F-UP12 feeds back a user plane MBS session modification response to the F-CP1. A detailed description of the operation is similar to operation S1508, and details are not described herein again.

Operation S1609. After operation S1604 to operation S1608 are performed for each son control plane node, the F-CP1 transmits an MBS session start response to the father control plane node of the F-CP1 according to MBS session start responses fed back by all the son control plane nodes.

Because the F-CP1 selects two user plane nodes F-UP11 and F-UP12 that have same levels as the F-CP1, if F-UPs that do not support receiving the data transmitted through multicast exists in the F-UP11 and the F-UP12, the MBS session start response replied by the F-CP1 to the father control plane node of the F-CP1 includes a list of F-TEID (because the list of F-TEID is for the father user plane node, the list of F-TEID is denoted as a list of F-TEIDfup for ease of distinguishing), and the list of F-TEIDfup corresponds to UP IDs of the father user plane nodes of the F-UP11 and the F-UP12. The list of F-TEIDfup includes F-TEIDs allocated by the F-UPs that support receiving MBS data through peer to peer rather than through multicast transmission in the F-UP11 and the F-UP12. If some F-UPs in the F-UP11 and the F-UP12 support receiving the data transmitted through multicast, the MBS session start response includes multicast enable to indicate that the father user plane nodes of the F-UP11 and the F-UP12 transmit the MBS data to the F-UP11 and the F-UP12 by using multicast transmission and peer-to-peer transmission technologies.

Specifically, if the MBS session start response replied by the F-CP1 to the father control plane node of the F-CP1 does not include the list of F-TEIDsup, it indicates that all user plane nodes that have same levels as the F-CP1 and are selected by the F-CP1 support receiving the data transmitted through multicast. Therefore, the MBS session start response does not need to carry an identifier of multicast enable.

If the MBS session start response replied by the F-CP1 to the father control plane node of the F-CP1 includes the list of F-TEIDsup, but does not include the identifier of multicast enable, it indicates that all the user plane nodes that have the same levels as the F-CP1 and are selected by the F-CP1 do not support receiving the data transmitted through multicast, but support receiving the MBS data transmitted through peer to peer.

If the MBS session start response replied by the F-CP1 to the father control plane node of the F-CP1 does not include the list of F-TEIDfup, and multicast enable is set to disable, it indicates that the F-CP1 does not select user plane nodes that have same levels as the F-CP1. In this case, the F-CP1 may also return a failure code by using the MBS session start response for an indication.

If only one user plane node of the user plane nodes that have the same levels as the F-CP1 and are selected by the F-CP1 does not support receiving the data transmitted through multicast, the MBS session start response may alternatively not include the list of F-TEIDfup, but include only an F-TEID allocated by the user plane node that supports receiving the MBS data through peer to peer rather than through multicast transmission.

Operation S1601 to operation S1609 are a processing process after the MBS session start request transmitted by the father control plane node of the F-CP1 is received by the F-CP1. In the processing process, the F-CP1 selects two user plane nodes F-UP11 and F-UP12 that have the same levels as the F-CP1, and a son control plane node S-CP of the F-CP1 selects two son user plane nodes S-UP11 and S-UP12 that have the same levels as the S-CP for the F-UP11, and selects two son user plane nodes S-UP21 and S-UP22 that have the same levels as the S-CP for the F-UP12.

Continuing to refer to FIG. 16, the method further includes the following operations.

Operation S1610. An F-CP2 receives an MBS session start request transmitted by a father control plane node of the F-CP2, the MBS session start request including a TMGI, an MBS session duration, MBS QFIs, a QoS profile, a UPx ID, an MBS IP multicast distribution, an MBS time to data transfer, and an MBS service area. For specific meanings of the parameters, reference is made to the descriptions in operation S1501. For ease of distinguishing, an IP multicast transmission address included in the MBS IP multicast distribution in the MBS session start request received by the F-CP2 may be denoted as IPx.

Operation S1611. The F-CP2 determines, according to information about a son control plane node of the F-CP2, that one or more F-UPFs are selected from a plurality of F-UPFs as user plane nodes having same levels as the F-CP2. In this embodiment, it is assumed that only one user plane node F-UP21 having a same level as the F-CP2 is selected, then the F-CP2 transmits a user plane MBS session establishment request to the F-UP21, and the F-UP21 feeds back a user plane MBS session establishment response to the F-CP2.

For a detailed description, reference is made to the related content in operation S1502. Similar to operation S1502, the F-CP2 interacts with the F-UP21 by using the user plane MBS session establishment request and the user plane MBS session establishment response, and the F-UP21 allocates a new IP multicast transmission address (which is denoted as IP4 for ease of distinguishing).

In addition, similarly, if the F-UP21 does not support receiving data transmitted through multicast, the F-UP21 allocates an F-TEID for receiving the MBS data through peer to peer, and carries the allocated F-TEID in the user plane MBS session establishment response.

Operation S1612. An F-UP21 applies to join a multicast transmission group corresponding to an IP multicast transmission address IPx in a case that the F-UP21 supports receiving data transmitted through multicast, to receive MBS data transmitted by a father user plane node of the F-UP21.

Operation S1613. The F-CP2 transmits the MBS session start request to each son control plane node according to the information about the son control plane node of the F-CP2, that is, operation S1613 to operation S1617 are performed separately for each son control plane node. In this embodiment, a description is made by using an example in which the MBS session start request is transmitted to one son control plane node S-CP.

Similarly, the MBS session start request transmitted by the F-CP2 to the son control plane node S-CP of the F-CP2 also includes an MBS IP multicast distribution. The MBS IP multicast distribution is allocated in operation S1611, and a corresponding user plane node identifier is an F-UP21 ID, and an IP multicast transmission address included in the MBS IP multicast distribution is IP4.

There is no sequential relationship between operation S1613 and operation S1604, which may be operations performed in parallel by the F-CP2 and the F-CP1 respectively.

After the S-CP receives the MBS session start request transmitted by the F-CP2, similar to the foregoing operation, the S-CP selects one or more S-Ups for the F-UP21 from a plurality of S-UPs according to information about a son control plane node of the S-CP. In this embodiment, it is assumed that an S-UP31 and an S-UP32 are selected, and then operation S1614 is performed.

The S-UPs selected by the S-CP for the F-UP21 are different from the S-UPs selected by the S-CP for the F-UP11 and the F-UP12. In other words, in this embodiment, there may be a plurality of father control plane nodes for one son control plane node in a control plane. For example, a son control plane node S-CP has two father control plane nodes F-CP1 and F-CP2, but one son user plane node is not allowed to have a plurality of father user plane nodes. In this way, when one son user plane node already has one father user plane node, the son user plane node cannot participate in selection of a son user plane node.

Operation S1614. The S-CP respectively transmits user plane MBS session establishment requests to the selected S-UP31 and S-UP32, and the S-UP31 and the S-UP32 respectively feed back user plane MBS session establishment responses to the S-CP. A specific process is similar to operation S1505a. Details are not described again.

Operation S1615. The S-UP31 and the S-UP32 respectively join a multicast transmission group corresponding to the IP multicast transmission address (that is, the IP4) allocated by the F-UP21 in a case that the S-UP31 and the S-UP32 support receiving the data transmitted through multicast, to receive MBS data transmitted by the F-UP21.

Operation S1616. The S-CP transmits an MBS session start response to the F-CP2, the MBS Session start response including an F-UP21 ID. A detailed description of the operation is similar to operation S1507, and details are not described herein again.

Operation S1617. The F-CP2 transmits a user plane MBS session modification request to the F-UP21, and the F-UP21 feeds back a user plane MBS session modification response to the F-CP2. A detailed description of the operation is similar to operation S1508, and details are not described herein again.

Operation S1618. After operation S1613 to operation S1617 are performed for each son control plane node, the F-CP2 transmits an MBS session start response to the father control plane node of the F-CP2 according to MBS session start responses fed back by all the son control plane nodes. A detailed description of the operation is similar to operation S1509, and details are not described herein again.

Operation S1610 to operation S1618 are a processing process after the MBS session start request transmitted by the father control plane node of the F-CP2 is received by the F-CP2. In the processing process, the F-CP2 selects a user plane node F-UP21 having a same level as the F-CP2, and the son control plane node S-CP of the F-CP2 selects two son user plane nodes S-UP31 and S-UP32 that have same levels as the S-CP.

It can be learned from operation S1601 to operation S1618 that in the embodiments, the son control plane node S-CP has a plurality of father control plane nodes F-CP1 and F-CP2, and the son user plane node S-UP controlled by the S-CP has only one father user plane node.

In addition, the message in operation S1601 and the message in operation S1610 may be transmitted in parallel, and therefore, operations S1601 to S1609 and operations S1610 to S1618 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by another control plane node. If one user plane node simultaneously receives user plane MBS session establishment requests transmitted by two control plane nodes (which may be more control plane nodes, herein a description is made by taking two control plane nodes as an example), the user plane node may normally respond to the user plane MBS session establishment request transmitted by one of the control plane nodes in a user plane MBS session establishment response, and reject the other control plane node in another user plane MBS session establishment response, to indicate that the user plane node has been selected. If one user plane node already has a father user plane node by using one control plane node and when receiving a user plane MBS session establishment request transmitted by another control plane node, the user plane node rejects the other control plane node in another user plane MBS session establishment response, to indicate that the user plane node has been selected.

After this MBS session transmission tree is established, the following operations may be performed.

Operation S1619a. The F-UP11 receives downlink MBS data transmitted by the father user plane node of the F-UP11. Subsequently, the received downlink MBS data is transmitted to the S-UP11 and the S-UP12 in operation S1620a. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Operation S1619b. The F-UP12 receives downlink MBS data transmitted by the father user plane node of the F-UP12. Subsequently, the received downlink MBS data is transmitted to the S-UP21 and the S-UP22 in operation S1620b. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Operation S1619c. The F-UP21 receives downlink MBS data transmitted by the father user plane node of the F-UP21. Subsequently, the received downlink MBS data is transmitted to the S-UP31 and the S-UP32 in operation S1620c. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Figure 17:
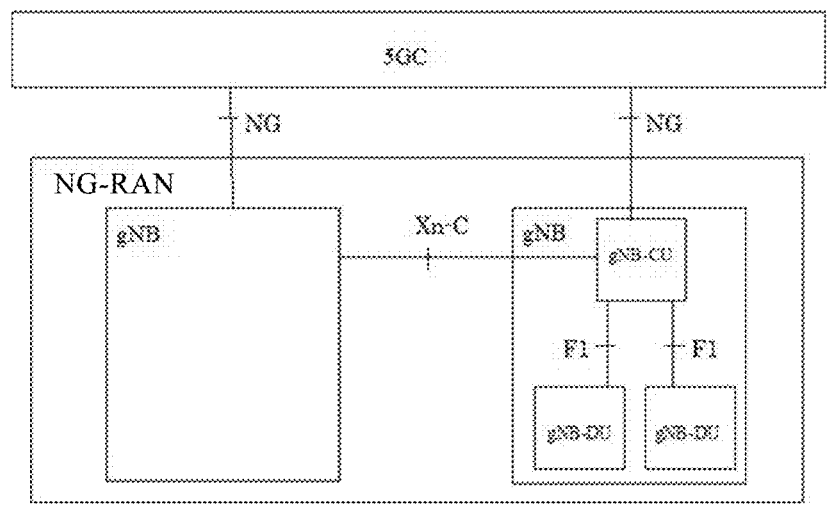
FIG. 17 is a schematic diagram of a connection relationship between a gNB and a 5GC in an NG-RAN.

In the example embodiment shown in FIG. 16, the MBS session start request transmitted by the father control plane node to the son control plane node includes information about a plurality of father user plane nodes. Optionally, in a 5G system, a control plane and a user plane are separated in a new radio (NR) base station (gNB), that is, a gNB-centralized unit (CU) may be used as a son control plane node, and a gNB-distributed unit (DU) may be used as a son user plane node. In addition, a control plane of one gNB may control user planes of one or more gNBs. Specifically, as shown in FIG. 17, a gNB in a next-generation radio access network (NG-RAN) is connected to a 5G core network (5GC) through an NG interface. A control plane and a user plane may be separated in the gNB in the NG-RAN. An interface between a base station control plane (that is, a gNB-CU) and a base station user plane (that is, a gNB-DU) may be an F1 interface, and an interface between gNBs may be an Xn-C interface.

Figure 18:
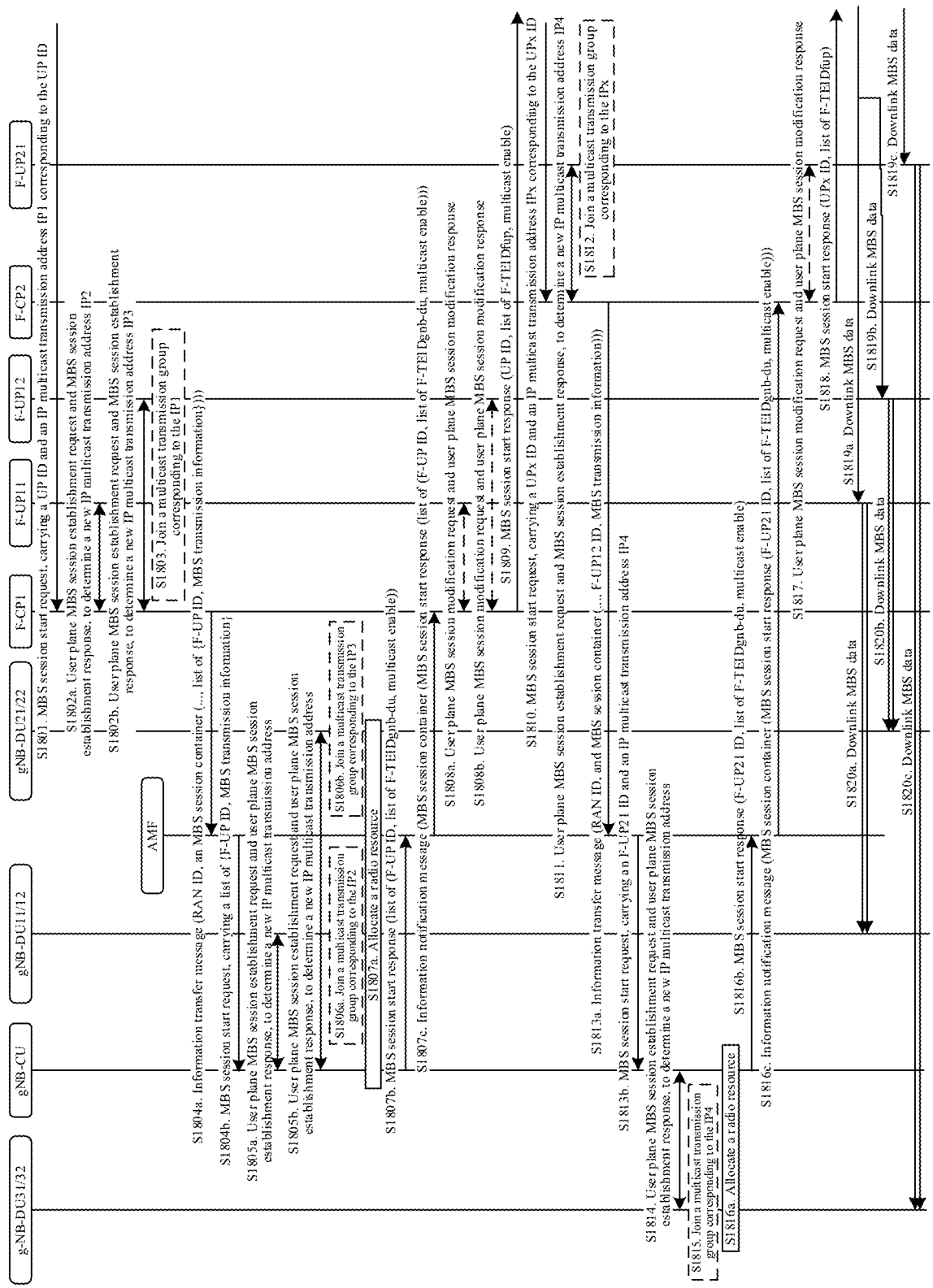
FIG. 18 is a flowchart of an MBS communication method in which a control plane is separated from a user plane according to some embodiments.

In some embodiments, after the gNB-CU and the gNB-DU are applied to the embodiment shown in FIG. 16, the embodiment shown in FIG. 18 may be obtained. Because a network node SMF or MB-SMF cannot directly communicate with an NR gNB, the AMF is introduced for interaction.

The method, as shown in FIG. 18, may include the following operations.

Operation S1801. An F-CP1 receives an MBS session start request transmitted by a father control plane node of the F-CP1. A specific process is similar to operation S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information (for example, a position and a quantity) about a gNB corresponding to the F-CP1), that one or more F-UPFs are selected from a plurality of F-UPFs as user plane nodes having same levels as the F-CP1. In this embodiment, it is assumed that two user plane nodes are selected and denoted as an F-UP11 and an F-UP12. Then, operation S1802a and operation S1802b are respectively performed.

Operation S1802a. The F-CP1 transmits a user plane MBS session establishment request to an F-UP11, and the F-UP11 feeds back a user plane MBS session establishment response to the F-CP1. The process is similar to the process of operation S1502 in the foregoing embodiment, and details are not described again. An IP multicast transmission address allocated by the F-UP11 in operation S1802a is denoted as IP2.

Operation S1802b. The F-CP1 transmits a user plane MBS session establishment request to an F-UP12, and the F-UP12 feeds back a user plane MBS session establishment response to the F-CP1. The process is similar to the process of operation S1502 in the foregoing embodiment, and details are not described again. An IP multicast transmission address allocated by the F-UP12 in operation S1802b is denoted as IP3.

Operation S1803. The F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

Operation S1804a. The F-CP1 transmits an information transfer message (that is, Namf_Communication_NonUeN2MessageTransfer) to an AMF.

The information transfer message transmitted by the F-CP1 to the AMF includes the following parameters: a RAN ID and an N2 MBS session container. The N2 MBS session container includes (an N2 MBS session start request (TMGI, MBS QFIs, QoS profile, list of {F-UP ID, MBS transmission information})). The MBS transmission information is an MBS IP multicast distribution (IP multicast transmission address, C-TEID). In this embodiment, because the F-CP1 selects two user plane nodes F-UP11 and F-UP12 that have same levels as the F-CP1, the list of {F-UP ID, MBS transmission information} includes an F-UP11 ID, an MBS IP multicast distribution corresponding to the F-UP11 ID, an F-UP12 ID, and an MBS IP multicast distribution corresponding to the F-UP12 ID. The MBS IP multicast distribution corresponding to the F-UP11 ID is allocated by the F-UP11, and the IP multicast transmission address included in the MBS IP multicast distribution is IP2. The MBS IP multicast distribution corresponding to the F-UP12 ID is allocated by the F-UP12, and the IP multicast transmission address included in the MBS IP multicast distribution is IP3.

The IP multicast transmission address IP3 allocated by the F-UP12 cannot be the same as the IP multicast transmission address IP2 allocated by the F-UP11, but the allocated C-TEIDs may be the same.

The MBS session container included in the information transfer message transmitted by the F-CP1 to the AMF indicates that the AMF transmits related content of the N2 MBS session start request (TMGI, MBS QFIs, QoS profile, list of {F-UP ID, MBS transmission information} to a gNB identified by the RAN ID. When a plurality of RAN IDs are recorded in an MBS session context in the F-CP1, subsequent operation S1804b to operation S1808b are performed for a gNB identified by each RAN ID.

Operation S1804b. The AMF transmits an MBS session start request to a corresponding gNB-CU according to a RAN ID included in the information transfer message in operation S1804a, the MBS session start request including the parameters in operation S1804a, that is, including the TMGI, the MBS QFIs, the QoS profile, and the list of {F-UP MBS transmission information}.

After the gNB-CU receives the MBS session start request transmitted by the AMF, the gNB-CU respectively selects one or more gNB-DUs for the F-UP11 and the F-UP12 from a plurality of gNB-DUs according to a quantity and positions of registered MBS multicast service UEs (for an MBS multicast service) or an MBS broadcast service area (for an MBS broadcast service). In this embodiment, it is assumed that a gNB-DU11 and a gNB-DU12 are selected for the F-UP11, and a gNB-DU21 and a gNB-DU22 are selected for the F-UP12, that is, different gNB-DUs are selected for the F-UP11 and the F-UP12. Then, operation S1805a and operation S1805b are respectively performed.

Operation S1805a. The gNB-CU respectively transmits user plane MBS session establishment requests (that is, F1 MBS Session Establishment Request) to the selected gNB-DU11 and gNB-DU12, the user plane MBS session establishment request including the IP multicast transmission address IP2 allocated by the F-UP11, and the gNB-DU11 and the gNB-DU12 respectively feed back user plane MBS session establishment responses to the gNB-CU (for saving layout, the gNB-DU11 and the gNB-DU12 are drawn together in FIG. 18). A specific process is similar to the interaction process between the S-CP and the S-UP in operation S1505a, and details are not described herein again.

Operation S1805b. The gNB-CU respectively transmits user plane MBS session establishment requests (that is, F1 MBS Session Establishment Request) to the selected gNB-DU21 and gNB-DU22, the user plane MBS session establishment request including the IP multicast transmission address IP3 allocated by the F-UP12, and the gNB-DU21 and the gNB-DU22 respectively feed back user plane MBS session establishment responses to the gNB-CU (for saving layout, the gNB-DU21 and the gNB-DU22 are drawn together in FIG. 18). A specific process is similar to the interaction process between the S-CP and the S-UP in operation S1505a, and details are not described herein again.

Operation S1806a. The gNB-DU11 and the gNB-DU12 respectively join a multicast transmission group corresponding to the IP multicast transmission address (that is, the IP2) allocated by the F-UP11 in a case that the gNB-DU11 and the gNB-DU12 support receiving the data transmitted through multicast, to receive MBS data transmitted by the F-UP11.

Operation S1806b. The gNB-DU21 and the gNB-DU22 respectively join a multicast transmission group corresponding to the IP multicast transmission address (that is, the IP3) allocated by the F-UP12 in a case that the gNB-DU21 and the gNB-DU22 support receiving the data transmitted through multicast, to receive MBS data transmitted by the F-UP12.

Similar to the foregoing embodiments, if the gNB-DU does not support receiving the data transmitted through multicast, but supports receiving MBS data through peer to peer according to a network configuration, a corresponding F-TEID needs to be allocated. The F-TEID is allocated by the gNB-CU, or is allocated by the gNB-DU.

Operation S1807a. The gNB allocates a radio air interface resource according to the QFIs and the QoS profile included in the information transfer message received in operation S1804a.

Operation S1807b. The gNB-CU transmits an MBS session start response to the AMF. If a gNB-DU does not support receiving the data transmitted through multicast, the MBS session start response includes an F-TEID (which is denoted as F-TEIDgnb-du for ease of distinguishing) allocated by the gNB-DU, and the F-TEID corresponds to the F-UP, to form a list of {F-UP ID, list of F-TEIDgnb-du, multicast enable}. In this embodiment, the list of {F-UP ID, list of F-TEIDgnb-du, multicast enable} includes the list of F-TEIDgnb-du and the multicast enable for the F-UP11 and the list of F-TEIDgnb-du and the multicast enable for the F-UP12.

Similar to operation S1507, because some gNB-DUs support receiving the data transmitted through multicast, and some other gNB-DUs do not support receiving the data transmitted through multicast, the list of F-TEIDgnb-du corresponds to only the gNB-DUs that support receiving MBS data through peer to peer rather than through multicast transmission. Therefore, when all gNB-DUs of one F-UP support receiving the data transmitted through multicast, there is no list of F-TEIDgnb-du corresponding to the F-UP. For another description, reference is made to the related content of operation S1507.

In addition, when the gNB-CU determines not to allocate any son user plane node to an/some F-UP IDs, multicast enable corresponding to this/these F-UP IDs may be set to disable. Certainly, a failed list of {F-UP} may alternatively be used in the MBS session start response to indicate a father user plane node to which a gNB-DU is not allocated.

Operation S1807c. The AMF transmits an information notification message Namf_Communication_NonUeN2InfoNotify to the F-CP1 according to the MBS session start response received in operation S1807b. The information notification message includes an N2 MBS session container (N2 MBS session start response (list of (F-UP ID, list of F-TEIDgnb-du, multicast enable))).

Operation S1808a. The F-CP1 transmits a user plane MBS session modification request to the F-UP11 according to the list of {F-UP ID, list of F-TEIDgnb-du, multicast enable} included in the received information notification message, and the F-UP11 feeds back a user plane MBS session modification response to the F-CP1. A detailed description of the operation is similar to operation S1508, and details are not described herein again.

Operation S1808b. The F-CP1 transmits a user plane MBS session modification request to the F-UP12 according to the list of {F-UP ID, list of F-TEIDgnb-du, multicast enable} included in the received information notification message, and the F-UP12 feeds back a user plane MBS session modification response to the F-CP1. A detailed description of the operation is similar to operation S1508, and details are not described herein again.

Operation S1809. After operation S1804a to operation S1808b are performed for the gNB identified by each RAN ID, the F-CP1 transmits an MBS session start response to the father control plane node of the F-CP1 according to the MBS session start response fed back by the gNB-CU.

Similar to operation S1609, the MBS session start response replied by the F-CP1 to the father control plane node of the F-CP1 includes a UP ID of a user plane node having a same level as the father control plane node of the F-CP1 and may further include a list of F-TEIDfup and multicast enable.

Operation S1801 to operation S1809 are a processing process after the MBS session start request transmitted by the father control plane node of the F-CP1 is received by the F-CP1. In the processing process, the F-CP1 selects two user plane nodes F-UP11 and F-UP12 that have same levels as the F-CP1, and a gNB-CU corresponding to the F-CP1 selects two son user plane nodes gNB-DU11 and gNB-DU12 that have same levels as the gNB-CU for the F-UP11, and selects two son user plane nodes gNB-DU21 and gNB-DU22 that have same levels as the gNB-CU for the F-UP12.

The method further includes the following operations.

Operation S1810. An F-CP2 receives an MBS session start request transmitted by a father control plane node of the F-CP2. A specific process is similar to operation S1501. Details are not described again. An IP multicast transmission address included in an MBS IP multicast distribution in the MBS session start request is denoted as IPx.

Operation S1811. After receiving the MBS session start request transmitted by the father control plane node of the F-CP2, the F-CP2 may determine, according to information (for example, a position and a quantity) about a gNB corresponding to the F-CP2, that one or more F-UPFs are selected from a plurality of F-UPFs as user plane nodes that have same levels as the F-CP2. In this embodiment, it is assumed that only one user plane node F-UP21 is selected, then the F-CP2 transmits a user plane MBS session establishment request to the F-UP21, and the F-UP21 feeds back a user plane MBS session establishment response to the F-CP2.

For a detailed description, reference is made to the related content in operation S1502. Similar to operation S1502, the F-CP2 interacts with the F-UP21 by using the user plane MBS session establishment request and the user plane MBS session establishment response, and the F-UP21 allocates a new IP multicast transmission address (which is denoted as IP4 for ease of distinguishing).

In addition, similarly, if the F-UP21 does not support receiving data transmitted through multicast, the F-UP21 allocates an F-TEID for receiving the MBS data through peer to peer, and carries the allocated F-TEID in the user plane MBS session establishment response.

Operation S1812. The F-UP21 applies to join a multicast transmission group corresponding to an IP multicast transmission address IPx in a case that the F-UP21 supports receiving data transmitted through multicast, to receive MBS data transmitted by a father user plane node of the F-UP21.

Operation S1813a. The F-CP2 transmits an information transfer message (that is, Namf_Communication_NonUeN2 MessageTransfer) to an AMF. A detailed description of the information transfer message is similar to operation S1804a, and details are not described again. Because the F-CP 2 selects the user plane node F-UP21 that has a same level as the F-CP2, the information transfer message includes an F-UP21 ID and an MBS IP multicast distribution corresponding to the F-UP21 ID, and an IP multicast transmission address included in the MBS IP multicast distribution is IP4. When a plurality of RAN IDs are recorded in an MBS session context in the F-CP2, subsequent operation S1813b to operation S1817 are performed for a gNB identified by each RAN ID.

There is no sequential relationship between operation S1813a and operation S1804a, which may be operations performed in parallel by the F-CP2 and the F-CP1 respectively.

Operation S1813b. The AMF transmits an MBS session start request to a corresponding gNB-CU according to a RAN ID included in the information transfer message in operation S1813a, the MBS session start request including the parameters in operation S1813a.

After the gNB-CU receives the MBS session start request transmitted by the AMF, the gNB-CU respectively selects one or more gNB-DUs for the F-UP21 from a plurality of gNB-DUs according to a quantity and positions of registered MBS multicast service UEs (for an MBS multicast service) or an MBS broadcast service area (for an MBS broadcast service). In this embodiment, it is assumed that a gNB-DU31 and a gNB-DU32 are selected for the F-UP21, that is, gNB-DUs selected for the F-UP21 are different from the gNB-DUs selected for the F-UP11 and the F-UP12.

Operation S1814. The gNB-CU respectively transmits user plane MBS session establishment requests (that is, F1 MBS Session Establishment Request) to the selected gNB-DU31 and gNB-DU32, the user plane MBS session establishment request including the IP multicast transmission address IP4 allocated by the F-UP21, and the gNB-DU31 and the gNB-DU32 respectively feed back user plane MBS session establishment responses to the gNB-CU (for saving layout, the gNB-DU31 and the gNB-DU32 are drawn together in FIG. 18). A specific process is similar to operation S1505a. Details are not described again.

Operation S1815. The gNB-DU31 and the gNB-DU32 respectively join a multicast transmission group corresponding to the IP multicast transmission address (that is, the IP4) allocated by the F-UP21 in a case that the gNB-DU31 and the gNB-DU32 support receiving the data transmitted through multicast, to receive MBS data transmitted by the F-UP21.

Similar to the foregoing embodiments, if the gNB-DU does not support receiving data transmitted through multicast, but supports receiving MBS data through peer to peer according to a network configuration, a corresponding F-TEID needs to be allocated. The F-TEID is allocated by the gNB-CU, or is allocated by the gNB-DU.

Operation S1816a. The gNB allocates a radio air interface resource according to the QFIs and the QoS profile included in the information transfer message received in operation S1813a.

Operation S1816b. The gNB-CU transmits an MBS session start response to the AMF. If a gNB-DU does not support receiving the data transmitted through multicast, the MBS session start response includes an F-TEIDgnb-du allocated by the gNB-DU, and the F-TEIDgnb-du corresponds to the F-UP21. For another description, reference may be made to the related content in operation S1507.

Operation S1816c. The AMF transmits an information notification message Namf_Communication_NonUeN2InfoNotify to the F-CP2 according to the MBS session start response received in operation S1816b. The information notification message includes (N2 MBS session container (N2 MBS session start response (F-UP21 ID, list of F-TEIDgnb-du, multicast enable))).

Operation S1817. The F-CP2 transmits a user plane MBS session modification request to the F-UP21 according to the F-UP21 ID and the list of F-TEIDgnb-du included in the received information notification message, and the F-UP21 feeds back a user plane MBS session modification response to the F-CP2. A detailed description of the operation is similar to operation S1508, and details are not described herein again.

Operation S1818. After operation S1813b to operation S1817 are performed for the gNB identified by each RAN ID, the F-CP2 transmits an MBS session start response to the father control plane node of the F-CP2 according to the MBS session start response fed back by the gNB-CU.

Similar to operation S1509, the MBS session start response replied by the F-CP2 to the father control plane node of the F-CP2 includes a UPx ID of a user plane node having a same level as the father control plane node of the F-CP2 and may further include a list of F-TEIDfup.

Operation S1810 to operation S1818 are a processing process after the MBS session start request transmitted by the father control plane node of the F-CP2 is received by the F-CP2. In the processing process, the F-CP2 selects a user plane node F-UP21 having a same level as the F-CP2, and a gNB-DU corresponding to the F-CP2 selects two son user plane nodes gNB-DU31 and gNB-DU32 that have same levels as the gNB-CU.

It can be learned from operation S1801 to operation S1818 that in the embodiments, the gNB-CU has a plurality of father control plane nodes F-CP1 and F-CP2, and the gNB-DU controlled by the gNB-CU has only one father user plane node.

In addition, the message in operation S1801 and the message in operation S1810 may be transmitted in parallel, and therefore, operations S1801 to S1809 and operations S1810 to S1818 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by another control plane node. If one user plane node simultaneously receives user plane MBS session establishment requests transmitted by two control plane nodes (which may be more control plane nodes, herein a description is made by taking two control plane nodes as an example), the user plane node may normally respond to the user plane MBS session establishment request transmitted by one of the control plane nodes in a user plane MBS session establishment response, and reject the other control plane node in another user plane MBS session establishment response, to indicate that the user plane node has been selected. If one user plane node already has a father user plane node by using one control plane node and when receiving a user plane MBS session establishment request transmitted by another control plane node, the user plane node rejects the other control plane node in another user plane MBS session establishment response, to indicate that the user plane node has been selected.

After this MBS session transmission tree is established, the following operations may be performed.

Operation S1819a. The F-UP11 receives downlink MBS data transmitted by the father user plane node of the F-UP11. Subsequently, the received downlink MBS data is transmitted to the gNB-DU11 and the gNB-DU12 in operation S1820a. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Operation S1819b. The F-UP12 receives downlink MBS data transmitted by the father user plane node of the F-UP12. Subsequently, the received downlink MBS data is transmitted to the gNB-DU21 and the gNB-DU22 in operation S1820b. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Operation S1819c. The F-UP21 receives downlink MBS data transmitted by the father user plane node of the F-UP21. Subsequently, the received downlink MBS data is transmitted to the gNB-DU31 and the gNB-DU32 in operation S1820c. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Figure 19:
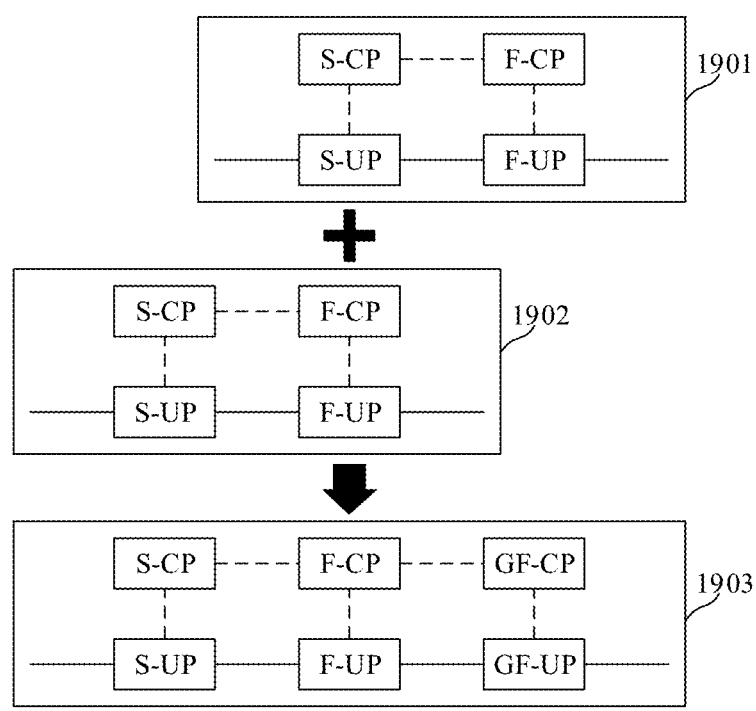
FIG. 19 is a schematic diagram of a cascading manner of a technical solution according to some embodiments.

The technical solution of the embodiment shown in FIG. 18 is mainly a process of establishing a control plane transmission tree and a user plane transmission tree after the NR base station is introduced into the MBS session transmission tree. In the embodiments shown in FIG. 15, FIG. 16, and FIG. 18, only the interaction process between two level nodes in the MBS session transmission tree is introduced, and for an MBS session transmission tree containing three or more level nodes, an interaction process between any two level nodes may be implemented with reference to the embodiment shown in FIG. 15, FIG. 16, or FIG. 18. For example, as shown in FIG. 19, two level nodes shown in 1901 and 1902 may be the two level nodes shown in FIG. 15 or FIG. 16. After a son control plane node S-CP and a son user plane node S-UP in 1901 are respectively superimposed onto a father control plane node F-CP and a father user plane node F-UP in 1902 to form a same entity, as shown in 1903 in FIG. 19, a three-level MBS session transmission tree may be implemented. A GF-CP is a father control plane node of the F-CP, and GF-UP is a father user plane node of the F-UP. In this manner, any level of MBS session transmission tree may be implemented.

For the example embodiment shown in FIG. 18, because the base station can only serve as a last level of a network side, the embodiment shown in FIG. 18 may also be combined with the embodiments shown in FIG. 15 and FIG. 16 to implement the any level of MBS session transmission tree including the base station.

FIG. 15, FIG. 16, and FIG. 18 show establishment processes of an MBS session transmission tree according to some embodiments. A broken branch may also occur in a user plane transmission tree in the establishment process of the MBS session transmission tree. Therefore, an operation of deleting a broken branch may also need to be performed.

Figure 20:
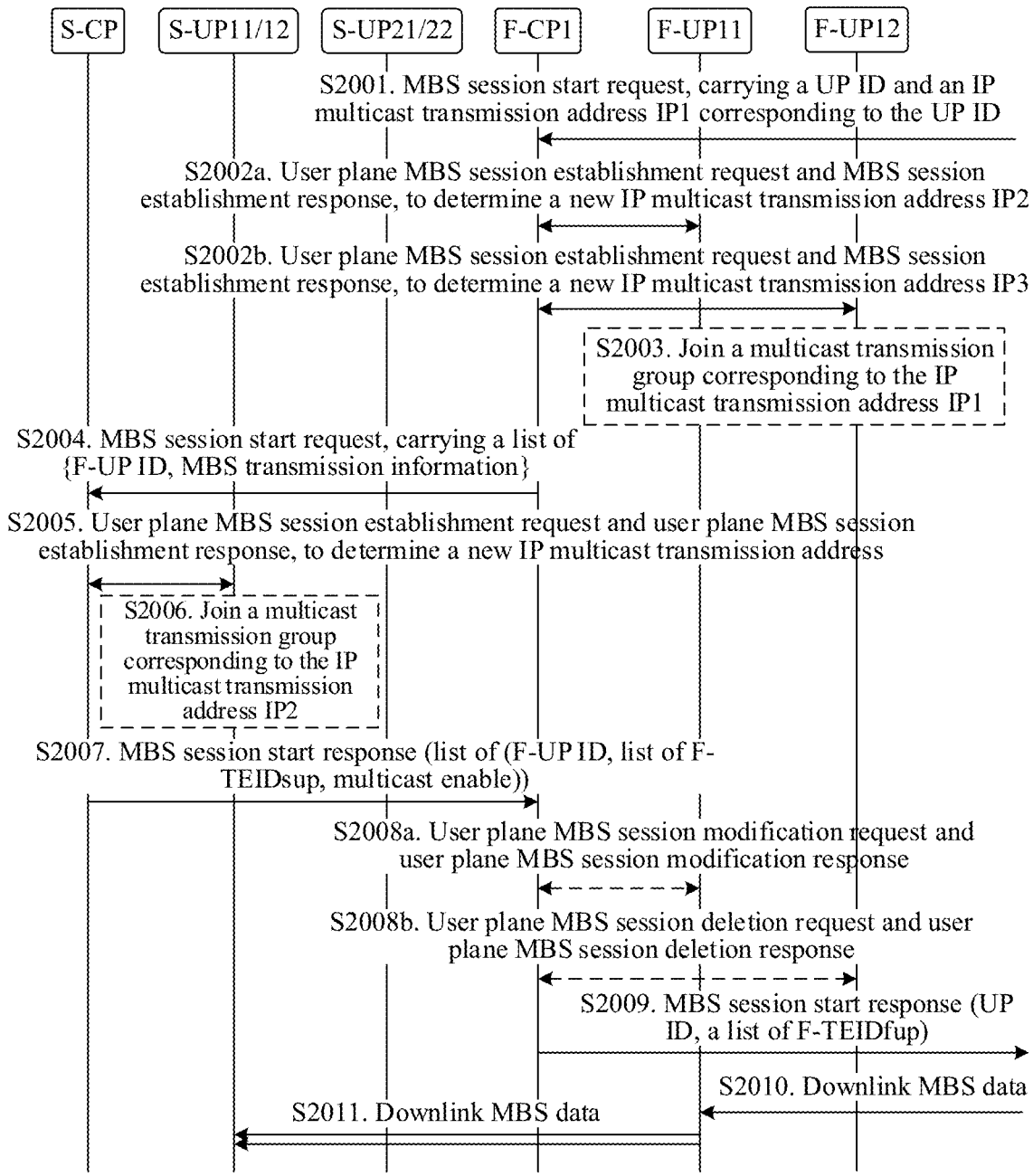
FIG. 20 is a flowchart of an MBS communication method in which a control plane is separated from a user plane according to some embodiments.

As shown in FIG. 20, the following operations may be included.

Operation S2001. An F-CP1 receives an MBS session start request transmitted by a father control plane node of the F-CP1. A specific process is similar to operation S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes F-UP11 and F-UP12 are selected. Then, operation S1602a and operation S1602b are respectively performed.

Operation S2002a. The F-CP1 transmits a user plane MBS session establishment request to an F-UP11, and the F-UP11 feeds back a user plane MBS session establishment response to the F-CP1. The process is similar to the process of operation S1502 in the foregoing embodiment, and details are not described again. An IP multicast transmission address allocated by the F-UP11 in operation S2002a is denoted as IP2.

Operation S2002b. The F-CP1 transmits a user plane MBS session establishment request to an F-UP12, and the F-UP12 feeds back a user plane MBS session establishment response to the F-CP1. The process is similar to the process of operation S1502 in the foregoing embodiment, and details are not described again. An IP multicast transmission address allocated by the F-UP12 in operation S2002b is denoted as IP3.

Operation S2003. The F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

Operation S2004. The F-CP1 transmits the MBS session start request to each son control plane node according to the information about the son control plane node of the F-CP1, that is, operation S2004 to operation S2008 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: a TMGI, an MBS session duration, MBS QFIs, a QoS profile, an MBS time to data transfer, a list of {F-UP ID, MBS transmission information}, and an MBS service area. The MBS transmission information is the MBS IP multicast distribution (IP multicast transmission address, C-TEID). In this embodiment, because the F-CP1 selects two user plane nodes F-UP11 and F-UP12 that have same levels as the F-CP1, the list of {F-UP ID, MBS transmission information} includes an F-UP11 ID, an MBS IP multicast distribution corresponding to the F-UP11 ID, an F-UP12 ID, and an MBS IP multicast distribution corresponding to the F-UP12 ID. The MBS IP multicast distribution corresponding to the F-UP11 ID is allocated by the F-UP11, and the IP multicast transmission address included in the MBS IP multicast distribution is IP2. The MBS IP multicast distribution corresponding to the F-UP12 ID is allocated by the F-UP12, and the IP multicast transmission address included in the MBS IP multicast distribution is IP3.

The IP multicast transmission address IP3 allocated by the F-UP12 cannot be the same as the IP multicast transmission address IP2 allocated by the F-UP11, but the allocated C-TEIDs may be the same.

After receiving the MBS session start request transmitted by the F-CP1, similar to operation S1502, the S-CP selects one or more S-UPs for the F-UP11 from a plurality of S-UPs according to information about a son control plane node of the S-CP, and selects one or more S-UPs for the F-UP12. In this embodiment, it is assumed that an S-UP11 and an S-UP12 are selected for the F-UP11, but no son user plane node is selected for the F-UP12. Then, operation S2005 is performed.

Operation S2005. The S-CP respectively transmits user plane MBS session establishment requests to the selected S-UP11 and S-UP12, the user plane MBS session establishment request including the IP multicast transmission address IP2 allocated by the F-UP11, and the S-UP11 and the S-UP12 respectively feed back user plane MBS session establishment responses to the S-CP (for saving layout, the S-UP11 and the S-UP12 are drawn together in FIG. 20). A specific process is similar to operation S1505a. Details are not described again.

Operation S2006. The S-UP11 and the S-UP12 respectively join a multicast transmission group corresponding to the IP multicast transmission address (that is, the IP2) allocated by the F-UP11 in a case that the S-UP11 and the S-UP12 support receiving the data transmitted through multicast, to receive MBS data transmitted by the F-UP11.

Operation S2007. The S-CP transmits an MBS session start response to the F-CP1. If an S-UP does not support receiving the data transmitted through multicast, the MBS session start response includes an F-TEID allocated by the S-UP, and the F-TEID corresponds to the F-UP, to form a list of {F-UP ID, list of F-TEIDsup, multicast enable}. In this embodiment, the list of {F-UP ID, list of F-TEIDsup, multicast enable} includes the list of F-TEIDsup and the multicast enable for the F-UP11 and the multicast enable (a value is disable) for the F-UP12. Because the F-UP12 does not allocate F-TEID, and corresponding multicast enable is set to disable, it indicates that no son user plane node is selected for the F-UP12.

Similar to operation S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all 5-UPs of one F-UP support receiving the data transmitted through multicast, there is no list of F-TEIDsup corresponding to the F-UP. For another description, reference is made to the related content of operation S1507.

In addition, when the S-CP determines not to allocate any son user plane node to an/some F-UP IDs, in addition to setting multicast enable parameters corresponding to this/these F-UP IDs to Disable, a failed list of {F-UP} may further be used in the MBS session start response to indicate a father user plane node to which a son user plane node is not allocated.

Operation S2008a. The F-CP1 transmits a user plane MBS session modification request to the F-UP11 according to the list of {F-UP ID, list of F-TEIDsup, multicast enable} included in the MBS session start response, and the F-UP11 feeds back a user plane MBS session modification response to the F-CP1. A detailed description of the operation is similar to operation S1508, and details are not described herein again.

If the F-CP1 determines that all the son control plane nodes of the F-CP1 do not allocate son user plane nodes to the F-UP11, the F-CP1 transmits a user plane MBS session deletion request to the F-UP11, the F-UP11 transmits an IGMP leave data packet after receiving the user plane MBS session deletion request, and exits a multicast transmission group indicated by the multicast transmission address IP1 allocated by the father user plane node of the F-UP11, and the F-UP 11 replies a user plane MBS session deletion response to the F-CP1 (this process is not identified in the figure).

Operation S2008b. After receiving MBS session start responses replied by all the son control plane nodes of the F-CP1, the F-CP1 determines that all the son control plane nodes of the F-CP1 do not allocate son user plane nodes to the F-UP12 and transmits a user plane MBS session deletion request (that is, N4 MBSSessionDelete Request) to the F-UP12, after receiving the user plane MBS session deletion request, the F-UP12 transmits an IGMP leave data packet and exits the multicast transmission group indicated by the multicast transmission address (that is, IP1) allocated by the father user plane node of the F-UP12, and the F-UP12 replies a user plane MBS session deletion response to the F-CP1.

Operation S2004 to operation S2008 are separately performed for each son control plane node of the F-CP1. The operation of deleting the MBS session in operation S2008b cannot be started only because an MBS session start response replied by one son control plane node of the F-CP1 in operation S2007 indicates that no son user plane node is allocated to the F-UP12. After receiving replies of all the son control plane nodes, the F-CP1 determines that a son user plane node is not allocated to which user plane node, to decide whether an MBS session with the user plane node needs to be deleted.

Operation S2009. After operation S2004 to operation S2008 are performed for each son control plane node, the F-CP1 transmits an MBS session start response to the father control plane node of the F-CP1 according to MBS session start responses fed back by all the son control plane nodes.

Similar to operation S1509, the MBS session start response replied by the F-CP1 to the father control plane node of the F-CP1 includes a UP ID of a user plane node having a same level as the father control plane node of the F-CP1, and may also include a list of F-TEID (which is denoted as a list of F-TEIDfup for ease of distinguishing). Because the F-CP1 selects two user plane nodes F-UP11 and F-UP12 that have same levels as the F-CP1, but the S-CP does not allocate a son user plane node to the F-UP12, if the MBS session start response replied by the F-CP1 to the father control plane node of the F-CP1 includes the list of F-TEIDfup, the list of F-TEIDfup also includes an F-TEID allocated by the F-UP11.

If the MBS session start response replied by the F-CP1 to the father control plane node of the F-CP1 may not include the F-TEID allocated by the F-UP11, in this case, it indicates that the F-UP11 supports receiving the data transmitted through multicast. In this case, the MBS session start response replied by the F-CP1 to the father control plane node of the F-CP1 does not need to include the multicast enable. If the MBS session start response replied by the F-CP1 to the father control plane node of the F-CP1 includes the F-TEID allocated by the F-UP11, it indicates that the F-UP 11 does not support receiving the data transmitted through multicast but supports receiving the MBS data transmitted through peer to peer. In this case, because the F-CP1 has only one same-level user plane node F-UP11, the MBS session start response replied by the F-CP1 to the father control plane node of the F-CP1 does not need to include the multicast enable.

After this MBS session transmission tree is established, the following operations may be performed.

Operation S2010. The F-UP11 receives downlink MBS data transmitted by the father user plane node of the F-UP11. Subsequently, the received downlink MBS data is transmitted to the S-UP11 and the S-UP12 in operation S2011. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

In the embodiment shown in FIG. 20, although the F-CP1 selects two user plane nodes F-UP11 and F-UP12 that have same levels as the F-CP1, a son control plane node S-CP of the F-CP1 does not allocate a son user plane node to the F-UP12, that is, a broken branch occurs in the user plane transmission tree. Therefore, the broken branch needs to be deleted.

In some embodiments, a UPF of a non protocol data unit (PDU) session anchor (PSA) may further participate in an MBS session. In this case, a user plane MBS transmission tree establishment process may refer to FIG. 21, and the following operations are included.

Operation S2101. An F-CP1 receives an MBS session start request transmitted by a father control plane node of the F-CP1. A specific process is similar to operation S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected and denoted as an F-UP11 and an F-UP12. Then, operation S2102a and operation S2102b are respectively performed.

Operation S2102a. The F-CP1 transmits a user plane MBS session establishment request to an F-UP11, and the F-UP11 feeds back a user plane MBS session establishment response to the F-CP1. The process is similar to the process of operation S1502 in the foregoing embodiment, and details are not described again. An IP multicast transmission address allocated by the F-UP11 in operation S2102a is denoted as IP2.

Operation S2102b. The F-CP1 transmits a user plane MBS session establishment request to an F-UP12, and the F-UP12 feeds back a user plane MBS session establishment response to the F-CP1. The process is similar to the process of operation S1502 in the foregoing embodiment, and details are not described again. An IP multicast transmission address allocated by the F-UP12 in operation S2102b is denoted as IP3.

Operation S2103. The F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

After operation S2102a and operation S2102b are performed, the F-CP1 may choose to perform the following operation S2104a, operation S2104b, and operation S2104c, and select user plane nodes F-UP21, F-UP22, and F-UP23 (the user plane nodes selected by the F-CP1 and a quantity of user plane nodes are merely an example). In this way, the F-UP11 and the F-UP12 perform offloading or optimize transmission through the F-UP21, the F-UP22, and the F-UP23.

For example, when a distance between the F-UP11 and a next level user plane node of the F-UP11 is relatively long and there are a relatively large quantity of next level user plane nodes of the F-UP11, if the F-UP11 directly transmits MBS data to the next user plane nodes of the F-UP11, the transmission efficiency is very low. If the F-UP21, the F-UP22, and the like are introduced between the F-UP11 and the next level user plane nodes of the F-UP11, the F-UP11 transmits the MBS data to the next level user plane nodes by using the F-UP21. In this way, the data transmission efficiency may be effectively improved.

Operation S2104a, operation S2104b, and operation S2104c are described below.

Operation S2104a. The F-CP1 transmits a user plane MBS session establishment request to an F-UP21, and the F-UP21 feeds back a user plane MBS session establishment response to the F-CP1. The process is similar to the process of operation S1502 in the foregoing embodiment, and details are not described again. In operation S2104a, the F-UP21 further allocates a new IP multicast transmission address for transmitting the MBS data to a son user plane node of the F-UP21, and the new IP multicast transmission address is denoted as IP4 in this embodiment. In addition, if the F-UP21 does not support receiving the MBS data transmitted by the F-UP11 through multicast, the F-UP21 allocates an F-TEID to receive the MBS data from the F-UP11 through peer to peer.

Operation S2104b. The F-CP1 transmits a user plane MBS session establishment request to an F-UP22, and the F-UP22 feeds back a user plane MBS session establishment response to the F-CP1. The process is similar to the process of operation S1502 in the foregoing embodiment, and details are not described again. In operation S2104b, the F-UP22 further allocates a new IP multicast transmission address for transmitting the MBS data to a son user plane node of the F-UP22, and the new IP multicast transmission address is denoted as IP5 in this embodiment. In addition, if the F-UP22 does not support receiving the MBS data transmitted by the F-UP11 through multicast, the F-UP22 allocates an F-TEID to receive the MBS data from the F-UP11 through peer to peer.

In some embodiments, a multicast transmission address in an MBS IP multicast distribution included in the user plane MBS session establishment request in operation S2104a and operation S2104b is the multicast transmission address IP2 in operation S2102a.

Operation S2104c. The F-CP1 transmits a user plane MBS session establishment request to an F-UP23, and the F-UP23 feeds back a user plane MBS session establishment response to the F-CP1. In addition, the F-UP23 further allocates a new IP multicast transmission address for transmitting the MBS data to a son user plane node of the F-UP23, and the new IP multicast transmission address is denoted as IP6 in this embodiment. The process is similar to the process of operation S1502 in the foregoing embodiment, and details are not described again.

In some embodiments, a multicast transmission address in an MBS IP multicast distribution included in the user plane MBS session establishment request in operation S2104c is the multicast transmission address IP3 in operation S2102b. The new multicast transmission address determined in operation S2104c is allocated by the F-UP23 to son user plane nodes (that is, the S-UP31 and the S-UP32 in FIG. 21) of the F-UP23. In addition, if the F-UP23 does not support receiving the MBS data transmitted by the F-UP12 through multicast, the F-UP23 allocates an F-TEID to receive the MBS data from the F-UP12 through peer to peer.

Operation S2105a. The F-UP21 and the F-UP22 apply to join a multicast transmission group corresponding to an IP multicast transmission address IP2 in a case that the F-UP21 and the F-UP22 support receiving data transmitted through multicast, to receive MBS data transmitted by the F-UP11.

Operation S2105b. An F-UP23 applies to join a multicast transmission group corresponding to an IP multicast transmission address IP3 in a case that the F-UP23 supports receiving the data transmitted through multicast, to receive MBS data transmitted by the F-UP12.

Operation S2106a. If there is a user plane node that supports receiving the MBS data through peer to peer rather than through multicast transmission in the F-UP21 and the F-UP22, the F-CP1 transmits a user plane MBS session modification request to the F-UP11, and the F-UP11 feeds back a user plane MBS session modification response to the F-CP1. The user plane MBS session modification request includes an F-TEID allocated by the user plane node that supports receiving the MBS data through peer to peer rather than through multicast transmission in the F-UP21 and the F-UP22, to instruct the F-UP11 to transmit, through peer to peer, the MBS data to the user plane node that supports receiving the MBS data through peer to peer rather than through multicast transmission in the F-UP21 and the F-UP22.

Operation S2106b. If the F-UP23 supports receiving the MBS data through peer to peer rather than through multicast transmission, the F-CP1 transmits a user plane MBS session modification request to the F-UP12, and the F-UP12 feeds back a user plane MBS session modification response to the F-CP1. The user plane MBS session modification request includes an F-TEID allocated by the F-UP23, to instruct the F-UP12 to transmit MBS data to the F-UP23 through peer to peer.

Operation S2107. The F-CP1 transmits an MBS session start request to a son control plane node S-CP1 of the F-CP1 according to information about the son control plane node of the F-CP1.

The MBS session start request transmitted by the F-CP1 to the son control plane node S-CP1 of the F-CP1 includes the following parameters: a TMGI, an MBS session duration, MBS QFIs, a QoS profile, an MBS time to data transfer, a list of {F-UP ID, MBS transmission information}, and an MBS service area. The MBS transmission information is the MBS IP multicast distribution (IP multicast transmission address, C-TEID). In this embodiment, the list of {F-UP ID, MBS transmission information} includes an F-UP21 ID, an MBS IP multicast distribution corresponding to the F-UP21 ID, an F-UP22 ID, and an MBS IP multicast distribution corresponding to the F-UP22 ID. The MBS IP multicast distribution corresponding to the F-UP21 ID is allocated by the F-UP21, and the IP multicast transmission address included in the MBS IP multicast distribution is the new IP multicast transmission address IP4 allocated by the F-UP21 in operation S2104a, The MBS IP multicast distribution corresponding to the F-UP22 ID is allocated by the F-UP22, and the IP multicast transmission address included in the MBS IP multicast distribution is the new IP multicast transmission address IP5 allocated by the F-UP22 in operation S2104b. The new IP multicast transmission address IP4 allocated by the F-UP21 in operation S2104a is different from the new IP multicast transmission address IP5 allocated by the F-UP22 in operation S2104b.

Operation S2108. After receiving the MBS session start request transmitted by the F-CP1, the S-CP1 performs a user plane MBS session establishment process. Specifically, the S-CP1 selects one or more S-UPs for the F-UP21 from a plurality of S-UPs according to information about a son control plane node of the S-CP1, and selects one or more S-UPs for the F-UP22. In this embodiment, it is assumed that an S-UP11 and an S-UP 12 are selected for the F-UP21, and an S-UP21 and an S-UP22 are selected for the F-UP22, that is, different son user plane nodes are selected for the F-UP21 and the F-UP22. Then, the S-CP1 respectively transmits user plane MBS session establishment requests to the son user plane nodes (that is, the S-UP11, the S-UP12, the S-UP21, and the S-UP22) selected for the F-UP21 and the F-UP22 and receives user plane MBS session establishment responses fed back by the son user plane nodes. In addition, if the son user plane nodes support multicast transmission, the son user plane nodes may join a corresponding multicast transmission group to receive MBS data (that is, the S-UP11 and the S-UP12 join a multicast transmission group corresponding to the IP4, and the S-UP21 and the S-UP22 join a multicast transmission group corresponding to the IP5). If some of the son user plane nodes do not support receiving the data transmitted through multicast but support receiving the MBS data through peer to peer, the son user plane nodes that do not support receiving the data transmitted through multicast but support receiving the MBS data through peer to peer may allocate F-TEIDs to receive the MBS data through peer to peer. A specific process is similar to operation S1505a and operation S1506, and details are not described again.

Operation S2109. The S-CP1 transmits an MBS session start response to the F-CP1. If an S-UP does not support receiving the data transmitted through multicast but supports receiving the MBS data through peer to peer, the MBS session start response includes an F-TEID allocated by the S-UP, and the F-TEID corresponds to the F-UP, to form a list of {F-UP ID, list of F-TEIDsup, multicast enable}. In this embodiment, the list of {F-UP ID, list of F-TEIDsup, multicast enable} includes the list of F-TEIDsup and the multicast enable for the F-UP21 and the list of F-TEIDsup and the multicast enable for the F-UP22.

Similar to operation S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all 5-UPs of one F-UP support receiving the data transmitted through multicast, there is no list of F-TEIDsup corresponding to the F-UP. For another description, reference is made to the related content of operation S1507.

In addition, when the S-CP1 determines not to allocate any son user plane node to a/some F-UP IDs, the multicast enable corresponding to this/these F-UP IDs may be set to disable. Certainly, a failed list of {F-UP} may alternatively be used in the MBS session start response to indicate an F-UP to which a son user plane node is not allocated.

Operation S2110a. The F-CP1 transmits a user plane MBS session modification request to the F-UP21 according to the list of {F-UP ID, list of F-TEIDsup, multicast enable} included in the MBS session start response fed back by the S-CP1, and the F-UP21 feeds back a user plane MBS session modification response to the F-CP1. A detailed description of the operation is similar to operation S1508, and details are not described herein again.

Operation S2110b. The F-CP1 transmits a user plane MBS session modification request to the F-UP22 according to the list of {F-UP ID, list of F-TEIDsup, multicast enable} included in the MBS session start response fed back by the S-CP1, and the F-UP22 feeds back a user plane MBS session modification response to the F-CP1. A detailed description of the operation is similar to operation S1508, and details are not described herein again.

Operation S2111. The F-CP1 transmits an MBS session start request to a son control plane node S-CP2 of the F-CP1 according to information about the son control plane node of the F-CP1.

The MBS session start request transmitted by the F-CP1 to the son control plane node S-CP2 of the F-CP1 includes the following parameters: a TMGI, an MBS session duration, MBS QFIs, a QoS profile, an MBS time to data transfer, a list of {F-UP ID, MBS transmission information}, and an MBS service area. The MBS transmission information is the MBS IP multicast distribution (IP multicast transmission address, C-TEID). In this embodiment, the list of {F-UP ID, MBS transmission information} includes an F-UP23 ID and an MBS IP multicast distribution corresponding to the F-UP23 ID. The MBS IP multicast distribution corresponding to the F-UP23 ID is allocated by the F-UP23, and the IP multicast transmission address included in the MBS IP multicast distribution is the new IP multicast transmission address IP6 allocated by the F-UP23 in operation S2104c.

There is no sequential relationship between operation S2111 and operation S2107, which may be operations performed in parallel by the F-CP1 respectively.

Operation S2112. After receiving the MBS session start request transmitted by the F-CP1, the S-CP2 performs a user plane MBS session establishment process. Specifically, the S-CP2 selects one or more S-UPs for the F-UP23 from a plurality of S-UPs according to information about a son control plane node of the S-CP2. In this embodiment, it is assumed that an S-UP31 and an S-UP32 are selected for the F-UP23, that is, the son user plane nodes selected for the F-UP23 are different from the son user plane nodes selected for the F-UP21 and the F-UP22. Then, the S-CP2 respectively transmits user plane MBS session establishment requests to the son user plane nodes (that is, the S-UP31 and the S-UP32) selected for the F-UP23 and receives user plane MBS session establishment responses fed back by the S-UP31 and the S-UP32. In addition, if the S-UP31 and the S-UP32 supports multicast transmission, the S-UP31 and the S-UP32 may join a multicast transmission group corresponding to a new IP multicast transmission address IP6 allocated by the F-UP23 in operation S2104c, to receive the MBS data transmitted by the F-UP23. If some son user plane nodes in the S-UP31 and some son user plane nodes in the S-UP32 do not support receiving the data transmitted through multicast but support receiving the MBS data through peer to peer, the son user plane nodes that do not support receiving the data transmitted through multicast but support receiving the MBS data through peer to peer in the S-UP 31 and the S-UP32 may allocate F-TEIDs to receive the MBS data transmitted by the F-UP23 through peer to peer. A specific process is similar to operation S1505a and operation S1506, and details are not described again.

Operation S2113. The S-CP2 transmits an MBS session start response to the F-CP1. If there is an S-UP that does not support receiving the data transmitted through multicast but supports receiving the MBS data through peer to peer in the S-UP31 or the S-UP32, the MBS session start response includes an F-TEID allocated by the S-UP, which corresponds to the F-UP, to form a list of {F-UP ID, list of F-TEIDsup, multicast enable}. In this embodiment, the list of {F-UP ID, list of F-TEIDsup, multicast enable} includes the list of F-TEIDsup and the multicast enable for the F-UP23.

Similar to operation S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all 5-UPs of one F-UP support receiving the data transmitted through multicast, there is no list of F-TEIDsup corresponding to the F-UP. For another description, reference is made to the related content of operation S1507.

In addition, when the S-CP2 determines not to allocate any son user plane node to a/some F-UP IDs, the multicast enable corresponding to this/these F-UP IDs may be set to disable. Certainly, a failed list of {F-UP} may alternatively be used in the MBS session start response to indicate an F-UP to which a son user plane node is not allocated.

Operation S2114. The F-CP1 transmits a user plane MBS session modification request to the F-UP23 according to the list of {F-UP ID, list of F-TEIDsup, multicast enable} included in the MBS session start response fed back by the S-CP2, and the F-UP23 feeds back a user plane MBS session modification response to the F-CP1. A detailed description of the operation is similar to operation S1508, and details are not described herein again.

Operation S2115. After the F-CP1 receives the MBS session start responses fed back by all the S-CPs, the F-CP1 transmits an MBS session start response to the father control plane node of the F-CP1 according to the MBS session start responses fed back by all the S-CPs.

Similar to operation S1609, the MBS session start response replied by the F-CP1 to the father control plane node of the F-CP1 includes a UP ID (the UP ID is an identifier of a user plane node having a same level as the father control plane node of the F-CP1) and may further include a list of F-TEIDfup and multicast enable.

It can be learned through operation S2101 to operation S2115 that in this embodiment, the F-CP1 has two son control plane nodes S-CP1 and S-CP2, the F-CP1 selects next level user plane nodes F-UP21 and F-UP22 for the F-UP11, and the F-CP1 selects a next level user plane node F-UP23 for the F-UP12. In addition, the S-CP1 selects son user plane nodes S-UP11 and S-UP12 for the F-UP21, the S-CP1 selects son user plane nodes S-UP21 and S-UP22 for the F-UP22, and the S-CP2 selects son user plane nodes S-UP31 and S-UP32 for the F-UP23.

In a user plane MBS session establishment process, two control plane nodes may transmit user plane MBS session establishment requests to one user plane node simultaneously, or after being selected by one control plane node, one user plane node receives a user plane MBS session establishment request transmitted by another control plane node. If one user plane node simultaneously receives user plane MBS session establishment requests transmitted by two control plane nodes (which may be more control plane nodes, herein a description is made by taking two control plane nodes as an example), the user plane node may normally respond to the user plane MBS session establishment request transmitted by one of the control plane nodes in a user plane MBS session establishment response, and reject the other control plane node in another user plane MBS session establishment response, to indicate that the user plane node has been selected. If one user plane node already has a father user plane node by using one control plane node and when receiving a user plane MBS session establishment request transmitted by another control plane node, the user plane node rejects the other control plane node in another user plane MBS session establishment response, to indicate that the user plane node has been selected.

After this MBS session transmission tree is established, the following operations may be performed.

Operation S2116a. The F-UP11 receives downlink MBS data transmitted by the father user plane node of the F-UP11. Subsequently, the received downlink MBS data is transmitted to the F-UP21 in operation S2117a, and the received downlink MBS service data is transmitted to the F-UP22 in operation S2117b. The F-UP21 transmits the received downlink MBS service data to the S-UP11 and the S-UP12 in operation S2118a. The F-UP22 transmits the received downlink MBS service data to the S-UP21 and the S-UP22 in operation S2118b. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Operation S2116b. The F-UP12 receives downlink MBS data transmitted by the father user plane node of the F-UP12. Subsequently, the received downlink MBS service data is transmitted to the F-UP23 in operation S2117c, and the F-UP23 transmits the received downlink MBS service data to the S-UP31 and the S-UP32 in operation S2118c. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Figure 21:
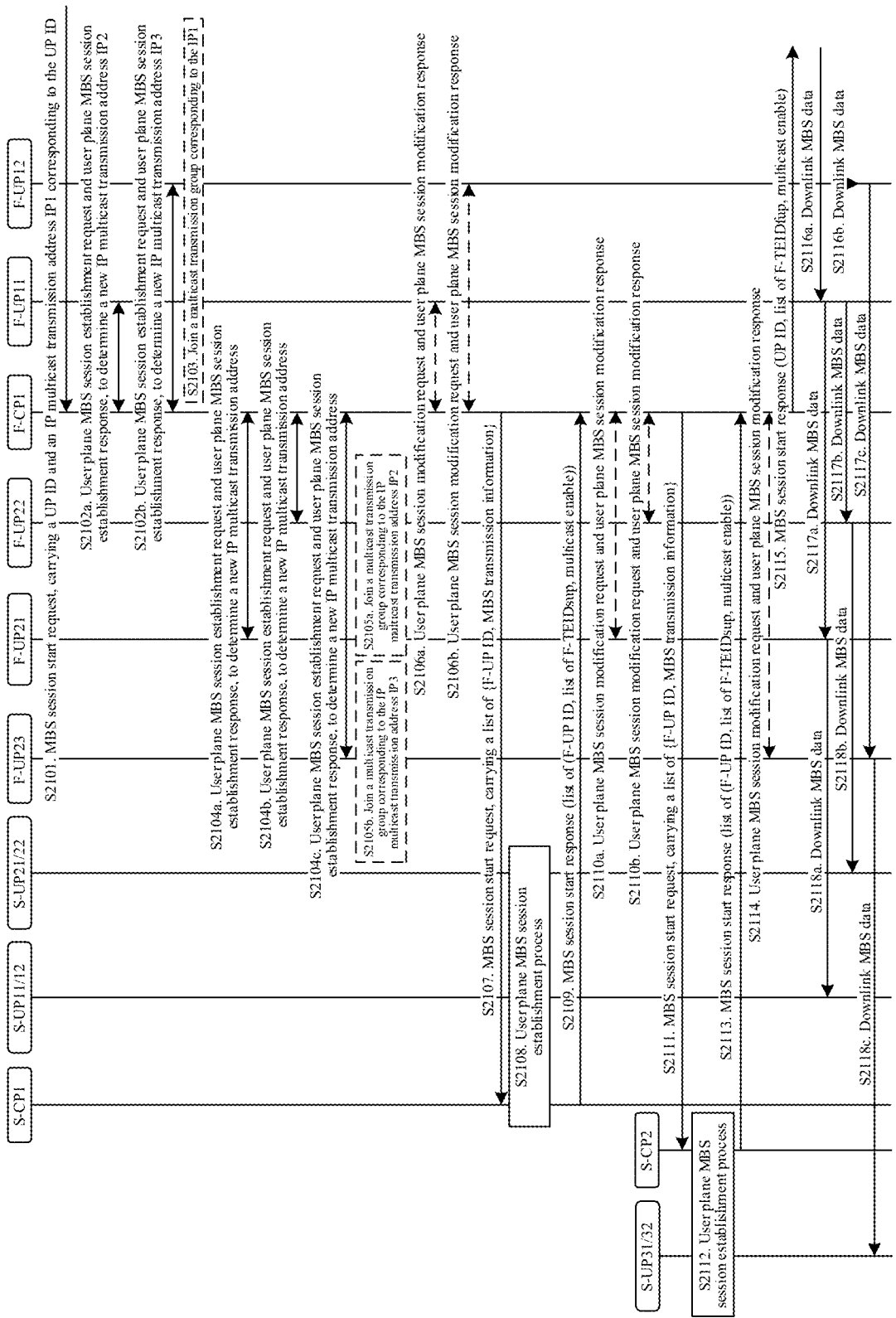
FIG. 21 is a flowchart of an MBS communication method in which a control plane is separated from a user plane according to some embodiments.
Figure 22:
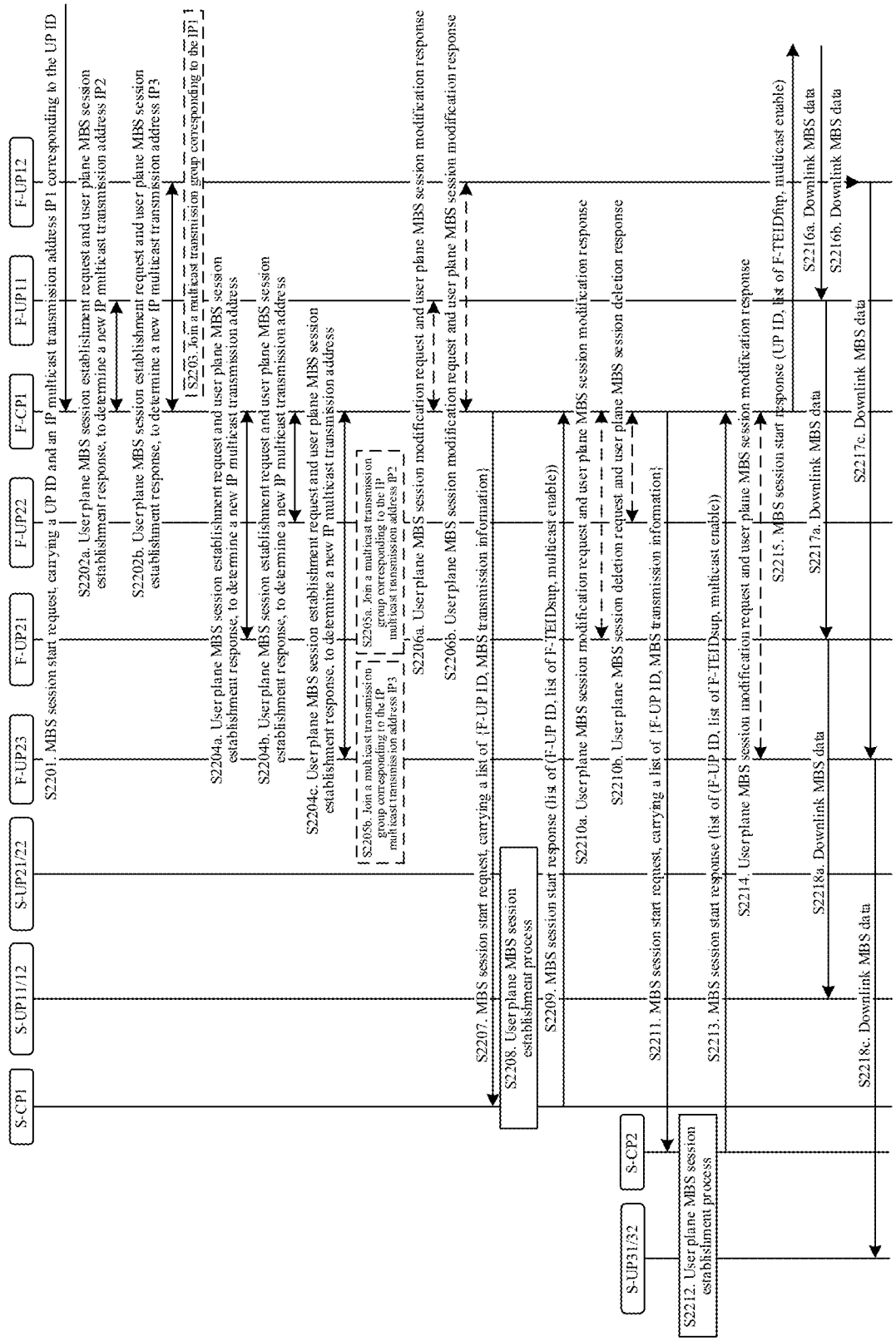
FIG. 22 is a flowchart of an MBS communication method in which a control plane is separated from a user plane according to some embodiments.

For an application scenario shown in FIG. 21 in which a UPF of a non-PSA participates in an MBS session, occurrence of a broken branch also needs to be prevented. For a specific process, reference may be made to FIG. 22, and the method includes the following operations.

Operation S2201. An F-CP1 receives an MBS session start request transmitted by a father control plane node of the F-CP1. A specific process is similar to operation S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected and denoted as an F-UP11 and an F-UP12. Then, operation S2202a and operation S2202b are respectively performed.

Operation S2202a. The F-CP1 transmits a user plane MBS session establishment request to an F-UP11, and the F-UP11 feeds back a user plane MBS session establishment response to the F-CP1. The process is similar to the process of operation S1502 in the foregoing embodiment, and details are not described again. An IP multicast transmission address allocated by the F-UP11 in operation S2202a is denoted as IP2.

Operation S2202b. The F-CP1 transmits a user plane MBS session establishment request to an F-UP12, and the F-UP12 feeds back a user plane MBS session establishment response to the F-CP1. The process is similar to the process of operation S1502 in the foregoing embodiment, and details are not described again. An IP multicast transmission address allocated by the F-UP12 in operation S2202b is denoted as IP3.

Operation S2203. The F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

After operation S2202a and operation S2202b are performed, the F-CP1 may select to perform the following operation S2204a, operation S2204b, and operation S2204c, and select user plane nodes F-UP21, F-UP22, and F-UP23 (the user plane nodes selected by the F-CP1 and a quantity of user plane nodes are merely an example). The purpose of this is to enable the F-UP11 and the F-UP12 to perform offloading or optimize transmission through the F-UP21, the F-UP22, and the F-UP23.

For example, when a distance between the F-UP11 and a next level user plane node of the F-UP11 is relatively long and there are a relatively large quantity of next level user plane nodes of the F-UP11, if the F-UP11 directly transmits MBS data to the next user plane nodes of the F-UP11, the transmission efficiency is very low. If the F-UP21, the F-UP22, and the like are introduced between the F-UP11 and the next level user plane nodes of the F-UP11, the F-UP11 transmits the MBS data to the next level user plane nodes by using the F-UP21. In this way, the data transmission efficiency may be effectively improved.

Operation S2204a, operation S2204b, and operation S2204c are described below.

Operation S2204a. The F-CP1 transmits a user plane MBS session establishment request to an F-UP21, and the F-UP21 feeds back a user plane MBS session establishment response to the F-CP1. The process is similar to the process of operation S1502 in the foregoing embodiment, and details are not described again. In operation S2204a, the F-UP21 further allocates a new IP multicast transmission address for transmitting the MBS data to a son user plane node of the F-UP21, and the new IP multicast transmission address is denoted as IP4 in this embodiment. In addition, if the F-UP21 does not support receiving the MBS data transmitted by the F-UP11 through multicast, the F-UP21 allocates an F-TEID to receive the MBS data from the F-UP11 through peer to peer.

Operation S2204b. The F-CP1 transmits a user plane MBS session establishment request to an F-UP22, and the F-UP22 feeds back a user plane MBS session establishment response to the F-CP1. The process is similar to the process of operation S1502 in the foregoing embodiment, and details are not described again. In operation S2104b, the F-UP22 further allocates a new IP multicast transmission address for transmitting the MBS data to a son user plane node of the F-UP22, and the new IP multicast transmission address is denoted as IP5 in this embodiment. In addition, if the F-UP22 does not support receiving the MBS data transmitted by the F-UP11 through multicast, the F-UP22 allocates an F-TEID to receive the MBS data from the F-UP11 through peer to peer.

In some embodiments, a multicast transmission address in an MBS IP multicast distribution included in the user plane MBS session establishment request in operation S2204a and operation S2204b is the multicast transmission address IP2 in operation S2202a.

Operation S2204c. The F-CP1 transmits a user plane MBS session establishment request to an F-UP23, and the F-UP23 feeds back a user plane MBS session establishment response to the F-CP1. In addition, the F-UP23 further allocates a new IP multicast transmission address for transmitting the MBS data to a son user plane node of the F-UP23, and the new IP multicast transmission address is denoted as IP6 in this embodiment. The process is similar to the process of operation S1502 in the foregoing embodiment, and details are not described again.

In some embodiments, a multicast transmission address in an MBS IP multicast distribution included in the user plane MBS session establishment request in operation S2204c is the multicast transmission address IP3 in operation S2202b. The new multicast transmission address determined in operation S2204c is IP6 allocated by the F-UP23 to son user plane nodes (that is, the S-UP31 and the S-UP32 in FIG. 22) of the F-UP23. In addition, if the F-UP23 does not support receiving the MBS data transmitted by the F-UP12 through multicast, the F-UP23 allocates an F-TEID to receive the MBS data from the F-UP12 through peer to peer.

Operation S2205a. The F-UP21 and the F-UP22 apply to join a multicast transmission group corresponding to an IP multicast transmission address IP2 in a case that the F-UP21 and the F-UP22 support receiving the data transmitted through multicast, to receive MBS data transmitted by the F-UP11.

Operation S2205b. An F-UP23 applies to join a multicast transmission group corresponding to an IP multicast transmission address IP3 in a case that the F-UP23 supports receiving the data transmitted through multicast, to receive MBS data transmitted by the F-UP12.

Operation S2206a. If there is a user plane node that supports receiving the MBS data through peer to peer rather than through multicast transmission in the F-UP21 and the F-UP22, the F-CP1 transmits a user plane MBS session modification request to the F-UP11, and the F-UP11 feeds back a user plane MBS session modification response to the F-CP1. The user plane MBS session modification request includes an F-TEID allocated by the user plane node that supports receiving the MBS data through peer to peer rather than through multicast transmission in the F-UP21 and the F-UP22, to instruct the F-UP11 to transmit, through peer to peer, the MBS data to the user plane node that supports receiving the MBS data through peer to peer rather than through multicast transmission in the F-UP21 and the F-UP22.

If the F-CP1 does not allocate a next level user plane node to the F-UP11, the F-CP1 transmits a user plane MBS session deletion request to the F-UP11, the F-UP11 transmits an IGMP leave data packet after receiving the user plane MBS session deletion request, and the F-UP11 exits a multicast transmission group indicated by the multicast transmission address IP1 allocated by the father user plane node of the F-UP11, and the F-UP 11 replies a user plane MBS session deletion response to the F-CP1 (this process is not identified in the figure).

Operation S2206b. If the F-UP23 supports receiving the MBS data through peer to peer rather than through multicast transmission, the F-CP1 transmits a user plane MBS session modification request to the F-UP12, and the F-UP12 feeds back a user plane MBS session modification response to the F-CP1. The user plane MBS session modification request includes an F-TEID allocated by the F-UP23, to instruct the F-UP12 to transmit MBS data to the F-UP23 through peer to peer.

If the F-CP1 does not allocate a next level user plane node to the F-UP12, the F-CP1 transmits a user plane MBS session deletion request to the F-UP12, the F-UP12 transmits an IGMP leave data packet after receiving the user plane MBS session deletion request, and the F-UP12 exits a multicast transmission group indicated by the multicast transmission address IP1 allocated by the father user plane node of the F-UP12, and the F-UP12 replies a user plane MBS session deletion response to the F-CP1 (this process is not identified in the figure).

Operation S2207. The F-CP1 transmits an MBS session start request to a son control plane node S-CP1 of the F-CP1 according to information about the son control plane node of the F-CP1.

The MBS session start request transmitted by the F-CP1 to the son control plane node S-CP1 of the F-CP1 includes the following parameters: a TMGI, an MBS session duration, MBS QFIs, a QoS profile, an MBS time to data transfer, a list of {F-UP ID, MBS transmission information}, and an MBS service area. The MBS transmission information is the MBS IP multicast distribution (IP multicast transmission address, C-TEID). In this embodiment, the list of {F-UP ID, MBS transmission information} includes an F-UP21 ID, an MBS IP multicast distribution corresponding to the F-UP21 ID, an F-UP22 ID, and an MBS IP multicast distribution corresponding to the F-UP22 ID. The MBS IP multicast distribution corresponding to the F-UP21 ID is allocated by the F-UP21, and the IP multicast transmission address included in the MBS IP multicast distribution is the new IP multicast transmission address IP4 allocated by the F-UP21 in operation S2204a, The MBS IP multicast distribution corresponding to the F-UP22 ID is allocated by the F-UP22, and the IP multicast transmission address included in the MBS IP multicast distribution is the new IP multicast transmission address IP5 allocated by the F-UP22 in operation S2204b. The new IP multicast transmission address IP4 allocated by the F-UP21 in operation S2204a is different from the new IP multicast transmission address IP5 allocated by the F-UP22 in operation S2204b.

Operation S2208. After receiving the MBS session start request transmitted by the F-CP1, the S-CP1 performs a user plane MBS session establishment process. Specifically, the S-CP1 selects one or more S-UPs for the F-UP21 from a plurality of S-UPs according to information about a son control plane node of the S-CP1, and selects a plurality of S-UPs for the F-UP22. In this embodiment, it is assumed that an S-UP11 and an S-UP 12 are selected for the F-UP21, and no son user plane node is selected for the F-UP22. Then, the S-CP1 respectively transmits user plane MBS session establishment requests to the S-UP11 and the S-UP12 and receives user plane MBS session establishment responses respectively fed back by the S-UP11 and the S-UP12. In addition, if the S-UP11 and the S-UP12 supports multicast transmission, the S-UP11 and the S-UP12 may join a multicast transmission group corresponding to a new IP multicast transmission address IP4 allocated in operation S2204a to receive the MBS data transmitted by the F-UP21. if some son user plane nodes in the S-UP11 and some son user plane nodes in the S-UP12 do not support receiving the data transmitted through multicast but support receiving the MBS data through peer to peer, the son user plane nodes that do not support receiving the data transmitted through multicast but support receiving the MBS data through peer to peer in the S-UP 11 and the S-UP12 may allocate F-TEIDs to receive the MBS data transmitted by the F-UP21 through peer to peer. A specific process is similar to operation S1505a and operation S1506, and details are not described again.

Operation S2209. The S-CP1 transmits an MBS session start response to the F-CP1. If an S-UP does not support receiving the data transmitted through multicast but supports receiving the MBS data through peer to peer, the MBS session start response includes an F-TEID allocated by the S-UP, and the F-TEID corresponds to the F-UP, to form a list of {F-UP ID, list of F-TEIDsup, multicast enable}. In this embodiment, the list of {F-UP ID, list of F-TEIDsup, multicast enable} includes the list of F-TEIDsup and the multicast enable for the F-UP21 and the list of F-TEIDsup and the multicast enable for the F-UP22. Because the S-CP1 does not select a son user plane node for the F-UP22, the list of F-TEIDsup for the F-UP22 does not include any F-TEID, and multicast enable for the F-UP22 is disable. Alternatively, there is no list of F-TEIDsup for the F-UP22 in the MBS session start response transmitted by the S-CP1 to the F-CP1, and a value of multicast enable for the F-UP22 is disable. Certainly, the S-CP1 may alternatively return a failure code (for example, a failed list of {F-UP22}) by using the MBS session start response to indicate that no son user plane node is selected for the F-UP22.

Similar to operation S1507, because some S-UPs support receiving the data transmitted through multicast, and some other S-UPs do not support receiving the data transmitted through multicast, the list of F-TEIDsup for the F-UP21 corresponds to only the S-UPs that support receiving the MBS data through peer to peer rather than through multicast transmission. For another description, reference is made to the related content of operation S1507.

Operation S2210a. The F-CP1 transmits a user plane MBS session modification request to the F-UP21 according to the list of {F-UP ID, list of F-TEIDsup, multicast enable} included in the MBS session start response fed back by the S-CP1, and the F-UP21 feeds back a user plane MBS session modification response to the F-CP1. A detailed description of the operation is similar to operation S1508, and details are not described herein again.

If the F-CP1 determines that no next level user plane node is allocated to the F-UP21, the F-CP1 transmits a user plane MBS session deletion request to the F-UP21, the F-UP21 transmits an IGMP leave data packet after receiving the user plane MBS session deletion request, and the F-UP21 exits a multicast transmission group indicated by the multicast transmission address IP2 allocated by the F-UP11, and the F-UP21 replies a user plane MBS session deletion response to the F-CP1 (this process is not identified in the figure).

Operation S2210b. After receiving MBS session start responses replied by all son control plane nodes of the F-CP1, the F-CP1 determines that all the son control plane nodes of the F-CP1 do not select son user plane nodes for the F-UP22 and transmits a user plane MBS session deletion request to the F-UP22, after receiving the user plane MBS session deletion request, the F-UP22 transmits an IGMP leave data packet, and exits the multicast transmission group indicated by the multicast transmission address IP2 allocated by the F-UP11, and the F-UP22 replies a user plane MBS session deletion response to the F-CP1.

Operation S2211. The F-CP1 transmits an MBS session start request to a son control plane node S-CP2 of the F-CP1 according to information about the son control plane node of the F-CP1.

The MBS session start request transmitted by the F-CP1 to the son control plane node S-CP2 of the F-CP1 includes the following parameters: a TMGI, an MBS session duration, MBS QFIs, a QoS profile, an MBS time to data transfer, a list of {F-UP ID, MBS transmission information}, and an MBS service area. The MBS transmission information is the MBS IP multicast distribution (IP multicast transmission address, C-TEID). In this embodiment, the list of {F-UP ID, MBS transmission information} includes an F-UP23 ID and an MBS IP multicast distribution corresponding to the F-UP23 ID. The MBS IP multicast distribution corresponding to the F-UP23 ID is allocated by the F-UP23, and the IP multicast transmission address included in the MBS IP multicast distribution is the new IP multicast transmission address IP6 allocated by the F-UP23 in operation S2204c.

There is no sequential relationship between operation S2211 and operation S2207, which may be operations performed in parallel by the F-CP1 respectively.

Operation S2212. After receiving the MBS session start request transmitted by the F-CP1, the S-CP2 performs a user plane MBS session establishment process. Specifically, the S-CP2 selects one or more S-UPs for the F-UP23 from a plurality of S-UPs according to information about a son control plane node of the S-CP2. In this embodiment, it is assumed that an S-UP31 and an S-UP 32 are selected for the F-UP23, that is, the son user plane nodes selected for the F-UP23 are different from the son user plane nodes selected for the F-UP21 and the F-UP22. Then, the S-CP2 respectively transmits user plane MBS session establishment requests to the son user plane nodes (that is, the S-UP31 and the S-UP32) selected for the F-UP23 and receives user plane MBS session establishment responses fed back by the S-UP31 and the S-UP32. In addition, if the S-UP31 and the S-UP32 supports receiving the MBS data through multicast transmission, the S-UP31 and the 5-UP32 may join a multicast transmission group corresponding to the new IP multicast transmission address IP6 allocated by the F-UP23 in operation S2204c to receive the MBS data transmitted by the F-UP23. If some son user plane nodes in the S-UP31 and some son user plane nodes in the 5-UP32 do not support receiving the data transmitted through multicast but support receiving the MBS data through peer to peer, the son user plane nodes that do not support receiving the data transmitted through multicast but support receiving the MBS data through peer to peer in the S-UP 31 and the S-UP32 may allocate F-TEIDs to receive the MBS data transmitted by the F-UP23 through peer to peer. A specific process is similar to operation S1505a and operation S1506, and details are not described again.

Operation S2213. The S-CP2 transmits an MBS session start response to the F-CP1. If there is an S-UP that does not support receiving the data transmitted through multicast but supports receiving the MBS data through peer to peer in the S-UP31 or the S-UP32, the MBS session start response includes an F-TEID allocated by the S-UP, and the F-TEID corresponds to the F-UP, to form a list of {F-UP ID, list of F-TEIDsup, multicast enable}. In this embodiment, the list of {F-UP ID, list of F-TEIDsup, multicast enable} includes the list of F-TEIDsup and the multicast enable for the F-UP23.

Similar to operation S1507, because some S-UPs support receiving the data transmitted through multicast, and some other S-UPs do not support receiving the data transmitted through multicast, the list of F-TEIDsup corresponds to only the S-UPs that support receiving MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of operation S1507.

In addition, when the S-CP2 determines not to allocate any son user plane node to a/some F-UP IDs, the multicast enable corresponding to this/these F-UP IDs may be set to disable. Certainly, a failed list of {F-UP} may alternatively be used in the MBS session start response to indicate an F-UP to which a son user plane node is not allocated.

Operation S2214. The F-CP1 transmits a user plane MBS session modification request to the F-UP23 according to the list of {F-UP ID, list of F-TEIDsup, multicast enable} included in the MBS session start response fed back by the S-CP2, and the F-UP23 feeds back a user plane MBS session modification response to the F-CP1. A detailed description of the operation is similar to operation S1508, and details are not described herein again.

If the F-CP1 determines that no next level user plane node is allocated to the F-UP23, the F-CP1 transmits a user plane MBS session deletion request to the F-UP23, the F-UP23 transmits an IGMP leave data packet after receiving the user plane MBS session deletion request, and the F-UP23 exits a multicast transmission group indicated by the multicast transmission address IP3 allocated by the F-UP12, and the F-UP23 replies a user plane MBS session deletion response to the F-CP1 (this process is not identified in the figure).

Operation S2215. After the F-CP1 receives the MBS session start responses fed back by all the S-CPs, the F-CP1 transmits an MBS session start response to the father control plane node of the F-CP1 according to the MBS session start responses fed back by all the S-CPs.

Similar to operation S1609, the MBS session start response replied by the F-CP1 to the father control plane node of the F-CP1 includes a UP ID (the UP ID is an identifier of a user plane node having a same level as the father control plane node of the F-CP1) and may further include a list of F-TEIDfup and multicast enable.

It can be learned through operation S2201 to operation S2215 that in the embodiments, the F-CP1 has two son control plane nodes S-CP1 and S-CP2, the F-CP1 selects next level user plane nodes F-UP21 and F-UP22 for the F-UP11, and the F-CP1 selects a next level user plane node F-UP23 for the F-UP12. In addition, the S-CP1 selects son user plane nodes S-UP11 and S-UP12 for the F-UP21, and the S-CP2 selects son user plane nodes S-UP31 and S-UP32 for the F-UP23. In addition, because the S-CP1 does not select a son user plane node for the F-UP22, the F-UP22 needs to be deleted from the user plane MBS transmission tree.

In a user plane MBS session establishment process, two control plane nodes may transmit user plane MBS session establishment requests to one user plane node simultaneously, or after being selected by one control plane node, one user plane node receives a user plane MBS session establishment request transmitted by another control plane node. If one user plane node simultaneously receives user plane MBS session establishment requests transmitted by two control plane nodes (which may be more control plane nodes, herein a description is made by taking two control plane nodes as an example), the user plane node may normally respond to the user plane MBS session establishment request transmitted by one of the control plane nodes in a user plane MBS session establishment response, and reject the other control plane node in another user plane MBS session establishment response, to indicate that the user plane node has been selected. If one user plane node already has a father user plane node by using one control plane node and then receives a user plane MBS session establishment request transmitted by another control plane node, the user plane node rejects the other control plane node in another user plane MBS session establishment response, to indicate that the user plane node has been selected.

After this MBS session transmission tree is established, the following operations may be performed.

Operation S2216a. The F-UP11 receives downlink MBS data transmitted by the father user plane node of the F-UP11. Subsequently, the received downlink MBS service data is transmitted to the F-UP21 in operation S2217a. The F-UP21 transmits the downlink MBS service data received in operation S2218a to the S-UP11 and the S-UP12. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

Operation S2216b. The F-UP12 receives downlink MBS data transmitted by the father user plane node of the F-UP12. Subsequently, the received downlink MBS service data is transmitted to the F-UP23 in operation S2217c, and the F-UP23 transmits the received downlink MBS service data to the S-UP31 and the S-UP32 in operation S2218c. Each user plane node transmits the MBS data in the multicast transmission manner or the peer-to-peer transmission manner determined in the foregoing operations, and each user plane node receives the MBS data in the multicast transmission manner or the peer-to-peer transmission manner determined in the foregoing operations.

In the technical solution of the foregoing embodiments F-CP represents a father control plane node, F-UP represents a father user plane node, S-CP represents a son control plane node, and S-UP represents a son user plane node. In the system architecture shown in FIG. 10, the SMF may be replaced by the F-CP, and the UPF may be replaced by the F-UP. In this case, the S-CP and the S-UP are combined to replace an access network node.

In the system architecture shown in FIG. 11, the MBSF may be replaced by the F-CP, and the MBSU may be replaced by the F-UP. In this case, the MB-SMF may be replaced by the S-CP, and the MB-UPF may be replaced by the S-UP. Alternatively, the MB-SMF may be replaced by the F-CP, and the MB-UPF may be replaced by the F-UP. In this case, the S-CP and the S-UP are combined to replace the NG-RAN.

FIG. 10 and FIG. 11 show two 5G MBS basic architectural diagrams. In the basic architectural diagrams, enhancement processing may be performed. For example, for the architecture shown in FIG. 10, there may be a plurality of UPFs and a plurality of SMFs. For the architecture shown in FIG. 11, there may be a plurality of MB-SMFs and a plurality of MB-UPFs respectively. When there is an additional UPF or MB-UPF, the user plane MBS session tree may be established by using the technical solution shown in FIG. 21 and FIG. 22.

The user plane MBS session establishment process is implemented in the technical solution of the foregoing embodiments, the occurrence of a transmission ring in the user plane MBS session may be avoided, and a problem of a broken branch in the user plane MBS session transmission tree may be avoided. In addition, a problem that when the control plane is separated from the user plane in the user plane MBS session establishment process, a same father control plane provides a plurality of father user plane nodes simultaneously may be resolved. In addition, transmission between father and son may be formed by a same control plane node by managing different user plane nodes, to optimize the user plane transmission resource.

The following describes apparatus embodiments, and the apparatus embodiments may be used for performing the communication method for a multicast broadcast service in the foregoing embodiments. For details that are not disclosed in the apparatus embodiments, reference may be made to the above embodiments of the communication method for a multicast broadcast service.

Figure 23:
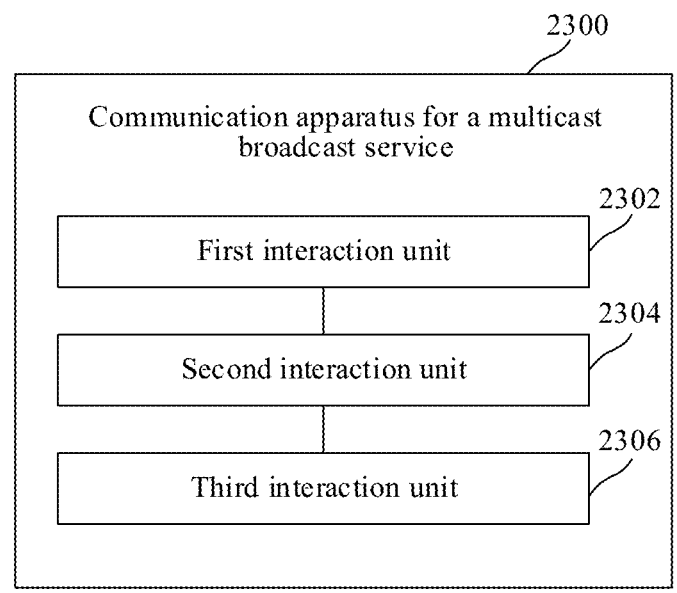
FIG. 23 is a block diagram of a communication apparatus for a multicast broadcast service according to some embodiments.

FIG. 23 is a block diagram of a communication apparatus for a multicast broadcast service according to some embodiments. The communication apparatus for a multicast broadcast service may be disposed in an $i^{th}$ level control plane node.

Referring to FIG. 23, a communication apparatus 2300 for a multicast broadcast service according to some embodiments includes a first interaction unit 2302, a second interaction unit 2304, and a third interaction unit 2306.

The first interaction unit 2302 is configured to transmit a first user plane MBS session establishment request to a first user plane node corresponding to an $i^{th}$ level control plane node, and receive a first user plane MBS session establishment response fed back by the first user plane node, the $i^{th}$ level control plane node being any level control plane node other than a last level control plane node in an MBS session transmission tree, i=1, . . . , N, N being a positive integer. The second interaction unit 2304 is configured to transmit a second user plane MBS session establishment request to a second user plane node corresponding to the $i^{th}$ level control plane node, and receive a second user plane MBS session establishment response fed back by the second user plane node, the second user plane MBS session establishment request including a first MBS IP multicast transmission address and a first C-TEID used for transmitting MBS data through multicast that are allocated by the first user plane node, the first MBS IP multicast transmission address being used for instructing the second user plane node to join a multicast transmission group corresponding to the first MBS IP multicast transmission address to receive MBS data transmitted by the first user plane node through multicast. The third interaction unit 2306 is configured to transmit a first MBS session start request to a son control plane node of the $i^{th}$ level control plane node, so that the son control plane node allocates son user plane nodes to the second user plane node, the first MBS session start request including identification information of the second user plane node, and a second MBS IP multicast transmission address and a second C-TEID that are allocated by the second user plane node, and the second MBS IP multicast transmission address being used for instructing the son user plane nodes to join a multicast transmission group corresponding to the second MBS IP multicast transmission address to receive MBS data transmitted by the second user plane node through multicast.

In some embodiments, based on the foregoing solution, in a case that the $i^{th}$ level control plane node is not a first level control plane node in the MBS session transmission tree, and the first user plane node supports receiving MBS data of a father user plane node of the first user plane node through multicast, the first user plane MBS session establishment request includes MBS IP multicast distribution information. The MBS IP multicast distribution information includes a third MBS IP multicast transmission address and a third C-TEID that are allocated by the father user plane node of the first user plane node. The third MBS IP multicast transmission address is used for instructing the first user plane node to join a multicast transmission group corresponding to the third MBS IP multicast transmission address to receive the MBS data transmitted by the father user plane node of the first user plane node through multicast.

In some embodiments, based on the foregoing solution, in a case that the first user plane node supports receiving the MBS data of the father user plane node of the first user plane node through peer to peer rather than through multicast, the first user plane MBS session establishment request includes indication information for requesting to allocate a full qualified tunnel endpoint identifier (F-TEID) to the first user plane node, the first user plane MBS session establishment response includes the F-TEID allocated to the first user plane node, and the F-TEID is used for causing the first user plane node to receive, through peer to peer, the MBS data transmitted by the father user plane node of the first user plane node; or the first user plane MBS session establishment response indicates that the first user plane node supports receiving the MBS data of the father user plane node of the first user plane node through peer to peer rather than through multicast and includes an F-TEID allocated to the first user plane node.

In some embodiments, based on the foregoing solution, the first interaction unit 2302 may be further configured to receive a second MBS session start request transmitted by a father control plane node of the $i^{th}$ level control plane node before transmitting the first user plane MBS session establishment request to the first user plane node corresponding to the $i^{th}$ level control plane node, and obtain the MBS IP multicast distribution information from the second MBS session start request transmitted by the father control plane node.

In some embodiments, based on the foregoing solution, the first user plane MBS session establishment request includes indication information used for instructing the first user plane node to allocate new MBS IP multicast distribution information; and the first user plane node MBS session establishment response includes a first MBS IP multicast transmission address and a first C-TEID that are allocated by the first user plane node.

In some embodiments, based on the foregoing solution, the second user plane MBS session establishment request includes indication information used for instructing the second user plane node to allocate new MBS IP multicast distribution information; and the second user plane node MBS session establishment response includes a second MBS IP multicast transmission address and a second C-TEID that are allocated by the second user plane node.

In some embodiments, based on the foregoing solution, in a case that the second user plane node supports receiving the MBS data of the first user plane node through peer to peer rather than through multicast, the second user plane MBS session establishment request includes indication information for requesting to allocate an F-TEID to the second user plane node, the second user plane MBS session establishment response includes the F-TEID allocated to the second user plane node, and the F-TEID is used for causing the second user plane node to receive, through peer to peer, the MBS data transmitted by the first user plane node; or
  the second user plane MBS session establishment response indicates that the second user plane node supports receiving the MBS data of the first user plane node through peer to peer rather than through multicast and includes an F-TEID allocated to the second user plane node.

In some embodiments, based on the foregoing solution, the first interaction unit 2302 may be further configured to transmit a user plane MBS session modification request to the first user plane node in a case that there is a second user plane node that supports receiving, through peer to peer rather than through multicast, the MBS data transmitted by the first user plane node after the second interaction unit 2304 receives the second user plane MBS session establishment response fed back by the second user plane node, the user plane MBS session modification request including an F-TEID allocated to the second user plane node that does not support receiving, through multicast, the MBS data transmitted by the first user plane node, so that the first user plane node transmits, through peer to peer, the MBS data to the second user plane node that does not support receiving, through multicast, the MBS data transmitted by the first user plane node.

In a case that there is also a second user plane node that supports receiving, through multicast, the MBS data transmitted by the first user plane node, the user plane MBS session modification request further includes a field for starting multicast transmission, to indicate that the first user plane node transmits the MBS data to the second user plane node through multicast transmission simultaneously.

In some embodiments, based on the foregoing solution, the third interaction unit 2306 may be further configured to receive a first MBS session start response fed back by the son control plane node of the $i^{th}$ level control plane node after transmitting the first MBS session start request to the son control plane node of the $i^{th}$ level control plane node, the first MBS session start response including indication information.

The indication information includes the identification information of the second user plane node, first F-TEID list information, and first field information used for indicating that multicast transmission is started, the first field information indicating that a son user plane node that supports receiving, through multicast, the MBS data transmitted by the second user plane node exists in the son user plane nodes allocated by the son control plane node to the second user plane node, and the first F-TEID list information including an F-TEID allocated by a son user plane node that supports receiving, through peer to peer rather than through multicast, the MBS data transmitted by the second user plane node; or
  in a case that the indication information includes the identification information of the second user plane node and does not include first F-TEID list information and first field information, the indication information being used for indicating that all the son user plane nodes allocated by the son control plane node to the second user plane node support receiving, through multicast, the MBS data transmitted by the second user plane node; or
  in a case that the indication information includes the identification information of the second user plane node and first F-TEID list information and does not include first field information, the indication information is used for indicating that all the son user plane nodes allocated by the son control plane node to the second user plane node support receiving, through peer to peer rather than through multicast, the MBS data transmitted by the second user plane node; or
  in a case that the indication information includes the identification information of the second user plane node and field information indicating that multicast transmission is stopped and does not include first F-TEID list information, the indication information is used for indicating that the son control plane node does not allocate the son user plane nodes to the second user plane node.

In some embodiments, based on the foregoing solution, in a case that at least two second user plane nodes are selected, the first MBS session start response includes an indication information list, and the indication information list includes the indication information respectively corresponding to all the selected second user plane nodes.

In some embodiments, based on the foregoing solution, the first MBS session start response further includes a failed identification information list, and the failed identification information list is used for indicating a target second user plane node to which son user plane nodes are not allocated.

In some embodiments, based on the foregoing solution, the second interaction unit 2304 may be further configured to transmit a user plane MBS session deletion request to the target second user plane node in a case that it is determined, according to the first MBS session start response, that a target second user plane node to which son user plane nodes are not allocated exists.

In some embodiments, based on the foregoing solution, the second interaction unit 2304 may be further configured to receive a user plane MBS session deletion response fed back by the target second user plane node, the user plane MBS session deletion response being transmitted by the target second user plane node after receiving the user plane MBS session deletion request, and in a case that the target second user plane node has joined the multicast transmission group corresponding to the first MBS IP multicast transmission address, the target second user plane node exits the multicast transmission group corresponding to the first MBS IP multicast transmission address after receiving the user plane MBS session deletion request.

In some embodiments, based on the foregoing solution, in a case that the $i^{th}$ level control plane node includes at least two son control plane nodes, the second interaction unit 2304 is further configured to determine, after first MBS session start responses respectively fed back by all the son control plane nodes of the $i^{th}$ level control plane node are received, whether the target second user plane node to which the son user plane nodes are not allocated exists.

In some embodiments, based on the foregoing solution, the second interaction unit 2304 may be further configured to transmit, in a case that the indication information includes the first F-TEID list information, a user plane MBS session modification request to the second user plane node according to the identification information of the second user plane node included in the indication information after the third interaction unit 2306 receives the first MBS session start response fed back by the son control plane node of the $i^{th}$ level control plane node, to instruct the second user plane node to respectively transmit, through peer to peer, the MBS data to son user plane nodes corresponding to F-TEIDs included in the first F-TEID list information.

In a case that the indication information further includes the first field information, the user plane MBS session modification request is further used for instructing the second user plane node to transmit the MBS data to the son user plane node of the second user plane node through multicast transmission simultaneously.

In a case that the indication information does not include the first field information, the user plane MBS session modification request is further used for instructing the second user plane node to transmit the MBS data to the son user plane node of the second user plane node without using multicast transmission.

In some embodiments, based on the foregoing solution, the second interaction unit 2304 may be further configured to transmit, in a case that at least two second user plane nodes are selected and according to indication information corresponding to each of the second user plane nodes included in the first MBS session start response, the user plane MBS session modification request to a second user plane node to which the user plane MBS session modification request needs to be transmitted.

In some embodiments, based on the foregoing solution, in a case that the $i^{th}$ level control plane node is not the first level control plane node in the MBS session transmission tree, the third interaction unit 2306 is further configured to feed back a second MBS session start response to a father control plane node of the $i^{th}$ level control plane node according to the first MBS session start response fed back by the son control plane node after receiving the first MBS session start response fed back by the son control plane node of the $i^{th}$ level control plane node, the second MBS session start response fed back to the father control plane node of the $i^{th}$ level control plane node including identification information of the father user plane node of the first user plane node.

In some embodiments, based on the foregoing solution, in a case that the $i^{th}$ level control plane node includes at least two son control plane nodes, after first MBS session start responses respectively fed back by all the son control plane nodes of the $i^{th}$ level control plane node are received, the second MBS session start response is fed back to the father control plane node of the $i^{th}$ level control plane node.

In some embodiments, based on the foregoing solution, the second MBS session start response fed back to the father control plane node of the $i^{th}$ level control plane node further includes second F-TEID list information and second field information used for indicating that multicast transmission is started, the second field information indicating that a user plane node that supports receiving the MBS data of the father user plane node of the first user plane node through multicast exists in the first user plane node, and the second F-TEID list information including F-TEIDs of user plane nodes that support receiving the MBS data of the father user plane node of the first user plane node through peer to peer rather than through multicast in the first user plane node; or in a case that the second MBS session start response fed back to the father control plane node of the $i^{th}$ level control plane node does not include second F-TEID list information and second field information, the second MBS session start response fed back to the father control plane node of the $i^{th}$ level control plane node is used for indicating that the first user plane node supports receiving the MBS data of the father user plane node of the first user plane node through multicast; or in a case that the second MBS session start response fed back to the father control plane node of the $i^{th}$ level control plane node further includes second F-TEID list information and does not include second field information, the second MBS session start response fed back to the father control plane node of the $i^{th}$ level control plane node is used for indicating that the first user plane node supports receiving the MBS data of the father user plane node of the first user plane node through peer to peer rather than through multicast; or in a case that the second MBS session start response fed back to the father control plane node of the $i^{th}$ level control plane node does not include second F-TEID list information and includes field information indicating that multicast transmission is stopped, the second MBS session start response fed back to the father control plane node of the $i^{th}$ level control plane node is used for indicating that the first user plane node is not allocated.

In some embodiments, based on the foregoing solution, in a case that at least two first user plane nodes and at least two second user plane nodes are selected, the second interaction unit 2304 is configured to transmit a second user plane MBS session establishment request to each selected second user plane node, the second user plane MBS session establishment request transmitted to each second user plane node including a first MBS IP multicast transmission address and a first C-TEID that are allocated by a corresponding first user plane node. First MBS IP multicast transmission addresses allocated by different first user plane nodes are different.

In some embodiments, based on the foregoing solution, in a case that at least two second user plane nodes are selected, the first MBS session start request transmitted to the son control plane node of the $i^{th}$ level control plane node includes identification information of each of the selected second user plane nodes and a second MBS IP multicast transmission address and a second C-TEID that are allocated by each of the second user plane node. Second MBS IP multicast transmission addresses allocated by different second user plane nodes are different.

In some embodiments, based on the foregoing solution, in a case that at least two second user plane nodes are selected, son user plane nodes respectively allocated by the son control plane node to the at least two second user plane nodes are different, and each son user plane node allocated to the second user plane nodes is not allocated as a son node of another user plane node.

Figure 24:
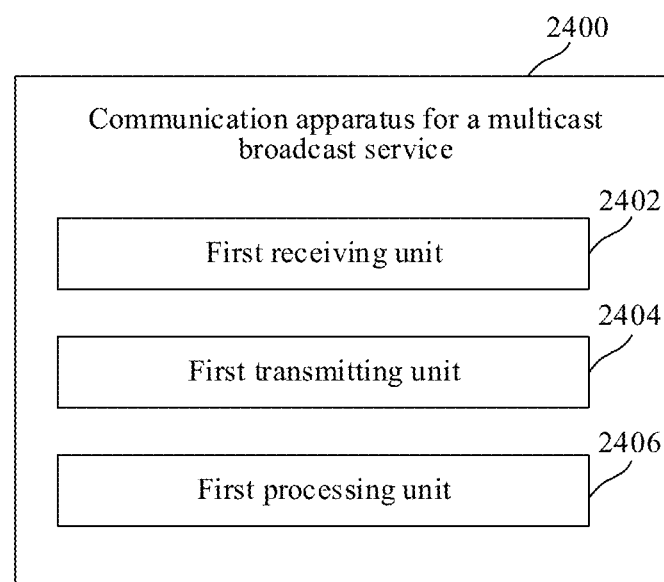
FIG. 24 is a block diagram of a communication apparatus for a multicast broadcast service according to some embodiments.

FIG. 24 is a block diagram of a communication apparatus for a multicast broadcast service according to some embodiments. The communication apparatus for a multicast broadcast service may be disposed in a first user plane node selected by an $i^{th}$ level control plane node.

Referring to FIG. 24, a communication apparatus 2400 for a multicast broadcast service according to some embodiments includes a first receiving unit 2402, a first transmitting unit 2404, and a first processing unit 2406.

The first receiving unit 2402 is configured to receive a first user plane MBS session establishment request transmitted by an $i^{th}$ level control plane node in an MBS session transmission tree, the $i^{th}$ level control plane node being any level control plane node other than a last level control plane node in the MBS session transmission tree, i=1, . . . , N, N being a positive integer, the first user plane MBS session establishment request including MBS IP multicast distribution information, the MBS IP multicast distribution information being from a father control plane node of the $i^{th}$ level control plane node, and the MBS IP multicast distribution information including a third MBS IP multicast transmission address and a third C-TEID that are allocated by a father user plane node of a first user plane node. The first transmitting unit 2404 is configured to feed back a first user plane MBS session establishment response to the $i^{th}$ level control plane node, the first user plane MBS session establishment response including a first MBS IP multicast transmission address and a first C-TEID that are allocated by the first user plane node, and the first MBS IP multicast transmission address being used for instructing a second user plane node corresponding to the $i^{th}$ level control plane node to join a multicast transmission group corresponding to the first MBS IP multicast transmission address to receive MBS data transmitted by the first user plane node through multicast. The first processing unit 2406 is configured to join a multicast transmission group corresponding to the third MBS IP multicast transmission address in a case that the first user plane node supports receiving MBS data of the father user plane node of the first user plane node through multicast, to receive the MBS data transmitted by the father user plane node of the first user plane node through multicast.

In some embodiments, based on the foregoing solution, the first processing unit 2406 may be further configured to allocate an F-TEID for receiving, through peer to peer, the MBS service data transmitted by the father user plane node of the first user plane node in a case that the first user plane node supports receiving, through peer to peer rather than through multicast, the MBS data transmitted by the father user plane node of the first user plane node.

In some embodiments, based on the foregoing solution, the first receiving unit 2402 may be further configured to receive a user plane MBS session modification request transmitted by the $i^{th}$ level control plane node after the first transmitting unit feeds back the first user plane MBS session establishment response to the $i^{th}$ level control plane node, the user plane MBS session modification request including an F-TEID of a second user plane node that supports receiving the MBS data transmitted by the first user plane node through peer to peer rather than through multicast.

The communication apparatus 2400 for a multicast broadcast service further includes: a first transmission unit, configured to transmit, through peer to peer based on the F-TEID of the second user plane node that supports receiving the MBS data transmitted by the first user plane node through peer to peer rather than through multicast, the MBS data to the second user plane node that supports receiving the MBS data transmitted by the first user plane node through peer to peer rather than through multicast, and determine, according to the user plane MBS session modification request, whether the MBS data is transmitted to another second user plane node through multicast transmission.

In some embodiments, based on the foregoing solution, the first processing unit 2406 may be further configured to: transmit, in a case that the user plane MBS session deletion request transmitted by the $i^{th}$ level control plane node is received, the user plane MBS session deletion response to the $i^{th}$ level control plane node. In a case that the first user plane node has joined the multicast transmission group corresponding to the third MBS IP multicast transmission address, the first user plane node exits the multicast transmission group corresponding to the third MBS IP multicast transmission address after receiving the user plane MBS session deletion request.

In some embodiments, based on the foregoing solution, the first processing unit 2406 may be further configured to: select, in a case that user plane MBS session establishment requests transmitted by a plurality of control plane nodes are received, one control plane node from the plurality of control plane nodes, feed back a user plane MBS session establishment response to the one control plane node, and feed back a rejection message to other control plane nodes in the plurality of control plane nodes, to indicate to the other control plane nodes that the user plane node has been selected; or after the first user plane MBS session establishment response is fed back to the $i^{th}$ level control plane node, feed back, in a case that a user plane MBS session establishment request transmitted by another control plane node is received, a rejection message to the another control plane node, to indicate to the another control plane node that the user plane node has been selected.

Figure 25:
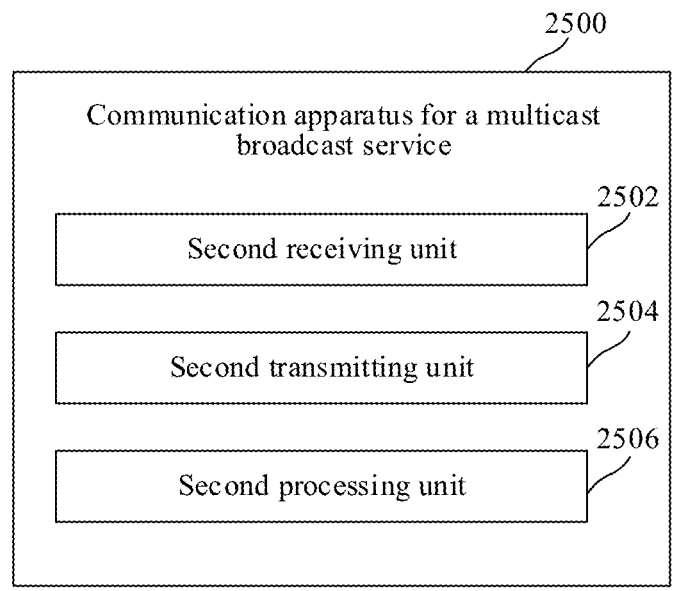
FIG. 25 is a block diagram of a communication apparatus for a multicast broadcast service according to some embodiments.

FIG. 25 is a block diagram of a communication apparatus for a multicast broadcast service according to some embodiments. The communication apparatus for a multicast broadcast service may be disposed in a second user plane node selected by an $i^{th}$ level control plane node.

Referring to FIG. 25, a communication apparatus 2500 for a multicast broadcast service according to some embodiments includes a second receiving unit 2502, a second transmitting unit 2504, and a second processing unit 2506.

The second receiving unit 2502 is configured to receive a second user plane MBS session establishment request transmitted by an $i^{th}$ level control plane node in an MBS session transmission tree, the $i^{th}$ level control plane node being any control plane node other than a last level control plane node in the MBS session transmission tree, i=1, . . . , N, N being a positive integer, and the second user plane MBS session establishment request including a first MBS IP multicast transmission address and a first C-TEID that are allocated by a first user plane node. The second transmitting unit 2504 is configured to feed back a second user plane MBS session establishment response to the $i^{th}$ level control plane node, the second user plane MBS session establishment response including a second MBS IP multicast transmission address and a second C-TEID that are allocated by a second user plane node, and the second MBS IP multicast transmission address being used for instructing a son user plane node of the second user plane node to join a multicast transmission group corresponding to the second MBS IP multicast transmission address to receive MBS data transmitted by the second user plane node through multicast. The second processing unit 2506 is configured to join a multicast transmission group corresponding to the first MBS IP multicast transmission address in a case that the second user plane node supports receiving MBS data of the first user plane node through multicast, to receive the MBS data transmitted by the first user plane node through multicast.

In some embodiments, based on the foregoing solution, the second processing unit 2506 may be further configured to allocate, in a case that the second user plane node supports receiving, through peer to peer rather than through multicast, the MBS data transmitted by the first user plane node, an F-TEID for receiving, through peer to peer, the MBS data transmitted by the first user plane node.

In some embodiments, based on the foregoing solution, the second receiving unit 2502 may be further configured to receive a user plane MBS session modification request transmitted by the $i^{th}$ level control plane node after feeding back the second user plane MBS session establishment response to the $i^{th}$ level control plane node, the user plane MBS session modification request including first F-TEID list information, and the first F-TEID list information including F-TEIDs of son user plane nodes that support receiving MBS data transmitted by the second user plane node through peer to peer rather than through multicast.

The communication apparatus 2500 for a multicast broadcast service may further include a second transmission unit, configured to respectively transmit, through peer to peer based on the first F-TEID list information, MBS data to son user plane nodes corresponding to the F-TEIDs comprised in the first F-TEID list information, and determine, according to the user plane MBS session modification request, whether the MBS data is transmitted to the son user plane node of the second user plane node through multicast transmission.

In some embodiments, based on the foregoing solution, the second processing unit 2506 may be further configured to transmit the user plane MBS session deletion response to the $i^{th}$ level control plane node in a case that the user plane MBS session deletion request transmitted by the $i^{th}$ level control plane node is received. In a case that the second user plane node has joined the multicast transmission group corresponding to the first MBS IP multicast transmission address, the second user plane node exits the multicast transmission group corresponding to the first MBS IP multicast transmission address after receiving the user plane MBS session deletion request.

In some embodiments, based on the foregoing solution, the second processing unit 2506 may be further configured to select, in a case that user plane MBS session establishment requests transmitted by a plurality of control plane nodes are received, one control plane node from the plurality of control plane nodes, feed back a user plane MBS session establishment response to the one control plane node, and feed back a rejection message to other control plane nodes in the plurality of control plane nodes, to indicate to the other control plane nodes that the user plane node has been selected; or after the second user plane MBS session establishment response is fed back to the $i^{th}$ level control plane node, feed back, in a case that a user plane MBS session establishment request transmitted by another control plane node is received, a rejection message to the another control plane node, to indicate to the another control plane node that the user plane node has been selected.

Figure 26:
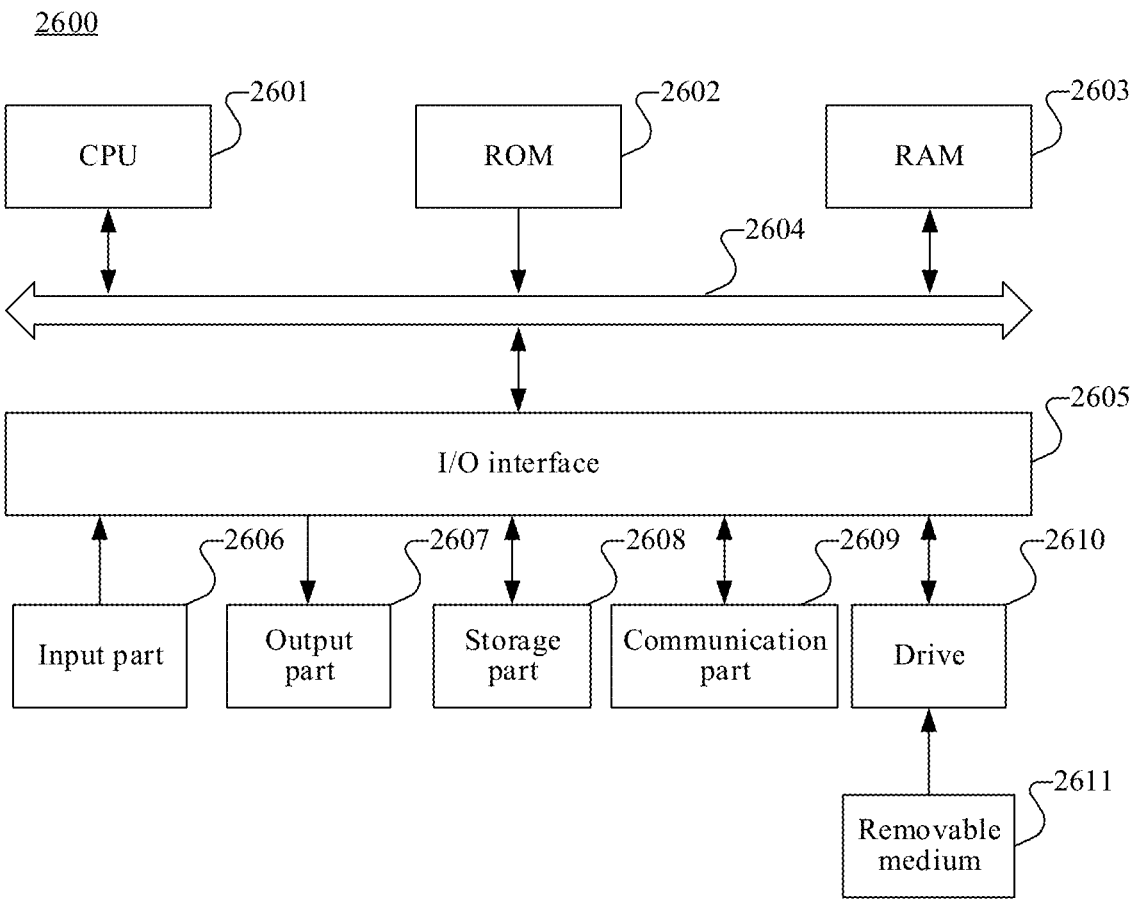
FIG. 26 is a schematic structural diagram of a computer system adapted to implement an electronic device according to some embodiments.

FIG. 26 is a schematic structural diagram of a computer system adapted to implement an electronic device according to some embodiments.

The computer system 2600 of the electronic device shown in FIG. 26 is merely an example, and does not constitute any limitation on functions and use ranges of the embodiments.

As shown in FIG. 26, the computer system 2600 includes a central processing unit (CPU) 2601, which may perform various suitable actions and processing based on a program stored in a read-only memory (ROM) 2602 or a program loaded from a storage part 2608 into a random access memory (RAM) 2603, for example, perform the method described in the foregoing embodiments. The RAM 2603 further stores various programs and data required for system operations. The CPU 2601, the ROM 2602, and the RAM 2603 are connected to each other through a bus 2604. An input/output (I/O) interface 2605 is also connected to the bus 2604.

The following components are connected to the I/O interface 2605: an input part 2606 including a keyboard, a mouse, or the like; an output part 2607 including a cathode ray tube (CRT), a liquid crystal display (LCD), a speaker, or the like; a storage part 2608 including hard disk, etc.; and a communication part 2609 including a network interface card such as a local area network (LAN) card, a modem, or the like. The communication part 2609 performs communication processing by using a network such as the Internet. A driver 2610 is also connected to the I/O interface 2605 as required. A removable medium 2611, such as a disk, an optical disc, a magneto-optical disc, or a semiconductor memory, is installed on the drive 2610 as required, so that a computer program read from the removable medium is installed in the storage portion 2608 as required.

Particularly, according to some embodiments, the processes described above by referring to the flowcharts may be implemented as computer software programs. For example, an embodiment includes a computer program product. The computer program product includes a computer program stored in a computer-readable medium. The computer program includes a computer program used for performing a method shown in the flowchart. In such an embodiment, the computer program may be downloaded and installed from the network through the communication portion 2609, and/or installed from the removable medium 2611. When the computer program is executed by the CPU 2601, the various functions defined in the system are executed.

The computer-readable medium shown in some embodiments may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. The computer-readable storage medium may be any tangible medium containing or storing a program, and the program may be used by or used in combination with an instruction execution system, apparatus, or device. The computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments may be implemented in a software manner, or may be implemented in a hardware manner, and the unit described can also be set in a processor. Names of the units do not constitute a limitation on the units in a specific case.

Another aspect of the embodiments further provides a non-transitory computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the foregoing implementations, the features and functions of two or more modules, units or code described above may be specifically implemented in one module, unit or code. On the contrary, the features and functions of one module, unit or code described above may be further divided to be embodied by a plurality of modules, units or code.

According to the foregoing descriptions of the implementations, a person skilled in the art may readily understand that the exemplary implementations described herein may be implemented by using software, or may be implemented by combining software and necessary hardware. Therefore, the technical solutions of the foregoing implementations may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the embodiments of the disclosure.

After considering the specification and practicing the disclosed implementations, a person skilled in the art may easily conceive of other implementations. The disclosure is intended to cover any variations, uses, or adaptive changes of this application following the general principles the disclosure, and includes well-known knowledge and conventional technical means in the art and undisclosed in the disclosure.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A communication method for a multicast broadcast service, performed by a computer device, comprising:

transmitting a first user plane multicast broadcast service (MBS) session establishment request to a first user plane node corresponding to an $i^{th}$ level control plane node, and receiving a first user plane MBS session establishment response fed back by the first user plane node, the $i^{th}$ level control plane node being a level control plane node other than a last level control plane node in an MBS session transmission tree, i=1, ..., N, N being a positive integer;

transmitting a second user plane MBS session establishment request to a second user plane node corresponding to the $i^{th}$ level control plane node, and receiving a second user plane MBS session establishment response fed back by the second user plane node, the second user plane MBS session establishment request comprising a first MBS Internet Protocol (IP) multicast transmission address and a first common-tunnel endpoint identifier (C-TEID) used for transmitting MBS data through multicast that are allocated by the first user plane node, the first MBS IP multicast transmission address being used for instructing the second user plane node to join a multicast transmission group corresponding to the first MBS IP multicast transmission address to receive the MBS data transmitted by the first user plane node through multicast; and transmitting a first MBS session start request to a child control plane node of the $i^{th}$ level control plane node so that the child control plane node allocates child user plane nodes to the second user plane node, the first MBS session start request comprising identification information of the second user plane node and a second MBS IP multicast transmission address and a second C-TEID that are allocated by the second user plane node, and the second MBS IP multicast transmission address being used for instructing the child user plane nodes to join a multicast transmission group corresponding to the second MBS IP multicast transmission address to receive MBS data transmitted by the second user plane node through multicast.

2. The communication method according to claim 1, wherein in a case that the $i^{th}$ level control plane node is not a first level control plane node in the MBS session transmission tree and the first user plane node supports receiving MBS data of a parent user plane node of the first user plane node through multicast, the first user plane MBS session establishment request comprises MBS IP multicast distribution information, the MBS IP multicast distribution information comprises a third MBS IP multicast transmission address and a third C-TEID that are allocated by the parent user plane node of the first user plane node, and the third MBS IP multicast transmission address is used for instructing the first user plane node to join a multicast transmission group corresponding to the third MBS IP multicast transmission address to receive the MBS data transmitted by the parent user plane node of the first user plane node through multicast.

3. The communication method according to claim 2, wherein
in a case that the first user plane node supports receiving the MBS data of the parent user plane node of the first user plane node through peer to peer rather than through multicast, the first user plane MBS session establishment request comprises indication information for requesting to allocate a full qualified tunnel endpoint identifier (F-TEID) to the first user plane node, the first user plane MBS session establishment response comprises the F-TEID allocated to the first user plane node, and the F-TEID is used for causing the first user plane node to receive, through peer to peer, the MBS data transmitted by the parent user plane node of the first user plane node; or
the first user plane MBS session establishment response indicates that the first user plane node supports receiving the MBS data of the parent user plane node of the first user plane node through peer to peer rather than through multicast and comprises an F-TEID allocated to the first user plane node.

4. The communication method according to claim 2, wherein before the transmitting a first user plane MBS session establishment request to a first user plane node corresponding to an $i^{th}$ level control plane node, the communication method for a multicast broadcast service further comprises:
receiving a second MBS session start request transmitted by a parent control plane node of the $i^{th}$ level control plane node, and obtaining the MBS IP multicast distribution information from the second MBS session start request transmitted by the parent control plane node.

5. The communication method according to claim 1, wherein the first user plane MBS session establishment request comprises indication information used for instructing the first user plane node to allocate new MBS IP multicast distribution information; and
the first user plane node MBS session establishment response comprises the first MBS IP multicast transmission address and the first C-TEID that are allocated by the first user plane node.

6. The communication method for a multicast broadcast service according to claim 1, wherein the second user plane MBS session establishment request comprises indication information used for instructing the second user plane node to allocate new MBS IP multicast distribution information; and
the second user plane node MBS session establishment response comprises the second MBS IP multicast transmission address and the second C-TEID that are allocated by the second user plane node.

7. The communication method according to claim 1, wherein
in a case that the second user plane node supports receiving the MBS data of the first user plane node through peer to peer rather than through multicast, the second user plane MBS session establishment request comprises indication information for requesting to allocate an F-TEID to the second user plane node, the second user plane MBS session establishment response comprises the F-TEID allocated to the second user plane node, and the F-TEID is used for causing the second user plane node to receive, through peer to peer, the MBS data transmitted by the first user plane node; or
the second user plane MBS session establishment response indicates that the second user plane node supports receiving the MBS data of the first user plane node through peer to peer rather than through multicast and comprises an F-TEID allocated to the second user plane node.

8. The communication method according to claim 7, wherein after the receiving a second user plane MBS session establishment response fed back by the second user plane node, the communication method for a multicast broadcast service further comprises:
transmitting a user plane MBS session modification request to the first user plane node in a case that there is a second user plane node that supports receiving, through peer to peer rather than through multicast, the MBS data transmitted by the first user plane node, the user plane MBS session modification request comprising the F-TEID allocated to the second user plane node that does not support receiving, through multicast, the MBS data transmitted by the first user plane node, so that the first user plane node transmits, through peer to peer, the MBS data to the second user plane node that does not support receiving, through multicast, the MBS data transmitted by the first user plane node, and
in a case that there is also a second user plane node that supports receiving, through multicast, the MBS data transmitted by the first user plane node, the user plane MBS session modification request further comprising a field for starting multicast transmission, to indicate that the first user plane node transmits the MBS data to the second user plane node through multicast transmission simultaneously.

9. The communication method according to claim 1, wherein after the transmitting a first MBS session start request to a child control plane node of the $i^{th}$ level control plane node, the communication method for a multicast broadcast service further comprises: receiving a first MBS session start response fed back by the child control plane node of the $i^{th}$ level control plane node, the first MBS session start response comprising indication information,
the indication information comprising the identification information of the second user plane node, first F-TEID list information, and first field information used for indicating that multicast transmission is started, the first field information indicating that a child user plane node that supports receiving, through multicast, the MBS data transmitted by the second user plane node exists in the child user plane nodes allocated by the child control plane node to the second user plane node, and the first F-TEID list information comprising F-TEIDs allocated to child user plane nodes that support receiving, through peer to peer rather than through multicast, the MBS data transmitted by the second user plane node; or
in a case that the indication information comprises the identification information of the second user plane node and does not comprise first F-TEID list information and first field information, the indication information being used for indicating that all the child user plane nodes allocated by the child control plane node to the second user plane node support receiving, through multicast, the MBS data transmitted by the second user plane node; or
in a case that the indication information comprises the identification information of the second user plane node and first F-TEID list information and does not comprise first field information, the indication information being used for indicating that all the child user plane nodes allocated by the child control plane node to the second user plane node support receiving, through peer to peer rather than through multicast, the MBS data transmitted by the second user plane node; or in a case that the indication information comprises the identification information of the second user plane node and field information indicating that multicast transmission is stopped and does not comprise first F-TEID list information, the indication information being used for indicating that the child control plane node does not allocate the child user plane nodes to the second user plane node.

10. The communication method according to claim 9, wherein in a case that at least two second user plane nodes are selected, the first MBS session start response comprises an indication information list, and the indication information list comprises the indication information respectively corresponding to all the selected second user plane nodes.

11. The communication method according to claim 10, wherein the first MBS session start response further comprises a failed identification information list, and the failed identification information list is used for indicating a target second user plane node to which child user plane nodes are not allocated.

12. The communication method according to claim 10, further comprising: in a case that it is determined, according to the first MBS session start response, that a target second user plane node to which child user plane nodes are not allocated exists, transmitting a user plane MBS session deletion request to the target second user plane node.

13. The communication method according to claim 12, further comprising:
receiving a user plane MBS session deletion response fed back by the target second user plane node, the user plane MBS session deletion response being transmitted by the target second user plane node after receiving the user plane MBS session deletion request, and in a case that the target second user plane node has joined the multicast transmission group corresponding to the first MBS IP multicast transmission address, the target second user plane node exiting the multicast transmission group corresponding to the first MBS IP multicast transmission address after receiving the user plane MBS session deletion request.

14. The communication method according to claim 12, wherein in a case that the $i^{th}$ level control plane node comprises at least two child control plane nodes, the communication method for a multicast broadcast service further comprises:
determining, after first MBS session start responses respectively fed back by all the child control plane nodes of the $i^{th}$ level control plane node are received, whether the target second user plane node to which the child user plane nodes are not allocated exists.

15. The communication method according to claim 9, wherein after the receiving a first MBS session start response fed back by a child control plane node of the $i^{th}$ level control plane node, the communication method for a multicast broadcast service further comprises:
transmitting, in a case that the indication information comprises the first F-TEID list information, a user plane MBS session modification request to the second user plane node according to the identification information of the second user plane node comprised in the indication information, to instruct the second user plane node to respectively transmit, through peer to peer, the MBS data to child user plane nodes corresponding to the F-TEIDs comprised in the first F-TEID list information, in a case that the indication information further comprises the first field information, the user plane MBS session modification request being further used for instructing the second user plane node to transmit the MBS data to the child user plane node of the second user plane node through multicast transmission simultaneously; and in a case that the indication information does not comprise the first field information, the user plane MBS session modification request being further used for instructing the second user plane node to transmit the MBS data to the child user plane node of the second user plane node without using multicast transmission.

16. The communication method according to claim 15, further comprising:
in a case that at least two second user plane nodes are selected, transmitting, according to indication information corresponding to each of the second user plane nodes comprised in the first MBS session start response, the user plane MBS session modification request to a second user plane node to which the user plane MBS session modification request needs to be transmitted.

17. The communication method according to claim 9, wherein in a case that the $i^{th}$ level control plane node is not a first level control plane node in the MBS session transmission tree, after the receiving a first MBS session start response fed back by a child control plane node of the $i^{th}$ level control plane node, the communication method for a multicast broadcast service further comprises:
feeding back a second MBS session start response to a parent control plane node of the $i^{th}$ level control plane node according to the first MBS session start response fed back by the child control plane node, the second MBS session start response fed back to the parent control plane node of the $i^{th}$ level control plane node comprising identification information of a parent user plane node of the first user plane node.

18. The communication method according to claim 17, wherein in a case that the $i^{th}$ level control plane node comprises at least two child control plane nodes, after first MBS session start responses respectively fed back by all the child control plane nodes of the $i^{th}$ level control plane node are received, the second MBS session start response is fed back to the parent control plane node of the $i^{th}$ level control plane node.

19. A communication apparatus for a multicast broadcast service, comprising:
at least one memory configured to store computer program code;
at least one processor configured to operate as instructed by the computer program code, the computer program code including:
first interaction code configured to cause the at least one processor to transmit a first user plane multicast broadcast service (MBS) session establishment request to a first user plane node corresponding to an $i^{th}$ level control plane node, and receive a first user plane MBS session establishment response fed back by the first user plane node, the $i^{th}$ level control plane node being a level control plane node other than a last level control plane node in an MBS session transmission tree, i=1, ..., N, N being a positive integer;

second interaction code configured to cause the at least one processor transmit a second user plane MBS session establishment request to a second user plane node corresponding to the $i^{th}$ level control plane node, and receive a second user plane MBS session establishment response fed back by the second user plane node, the second user plane MBS session establishment request comprising a first MBS Internet Protocol (IP) multicast transmission address and a first common-tunnel endpoint identifier (C-TEID) used for transmitting MBS data through multicast that are allocated by the first user plane node, the first MBS IP multicast transmission address being used for instructing the second user plane node to join a multicast transmission group corresponding to the first MBS IP multicast transmission address to receive MBS data transmitted by the first user plane node through multicast; and third interaction code configured to cause the at least one processor to transmit a first MBS session start request to a child control plane node of the $i^{th}$ level control plane node, so that the child control plane node allocates child user plane nodes to the second user plane node, the first MBS session start request comprising identification information of the second user plane node and a second MBS IP multicast transmission address and a second C-TEID that are allocated by the second user plane node, and the second MBS IP multicast transmission address being used for instructing the child user plane nodes to join a multicast transmission group corresponding to the second MBS IP multicast transmission address to receive MBS data transmitted by the second user plane node through multicast.

20. A non-transitory computer readable medium, storing computer code that when executed by at least one processor causes the at least one processor to:

transmit a first user plane multicast broadcast service (MBS) session establishment request to a first user plane node corresponding to an $i^{th}$ level control plane node, and receive a first user plane MBS session establishment response fed back by the first user plane node, the $i^{th}$ level control plane node being a level control plane node other than a last level control plane node in an MBS session transmission tree, i=1, ..., N, N being a positive integer;

transmit a second user plane MBS session establishment request to a second user plane node corresponding to the $i^{th}$ level control plane node, and receive a second user plane MBS session establishment response fed back by the second user plane node, the second user plane MBS session establishment request comprising a first MBS Internet Protocol (IP) multicast transmission address and a first common-tunnel endpoint identifier (C-TEID) used for transmitting MBS data through multicast that are allocated by the first user plane node, the first MBS IP multicast transmission address being used for instructing the second user plane node to join a multicast transmission group corresponding to the first MBS IP multicast transmission address to receive the MBS data transmitted by the first user plane node through multicast; and transmit a first MBS session start request to a child control plane node of the $i^{th}$ level control plane node so that the child control plane node allocates child user plane nodes to the second user plane node, the first MBS session start request comprising identification information of the second user plane node and a second MBS IP multicast transmission address and a second C-TEID that are allocated by the second user plane node, and the second MBS IP multicast transmission address being used for instructing the child user plane nodes to join a multicast transmission group corresponding to the second MBS IP multicast transmission address to receive MBS data transmitted by the second user plane node through multicast.

* * * * *